(12) United States Patent
Raleigh

(10) Patent No.: US 12,389,217 B2
(45) Date of Patent: Aug. 12, 2025

(54) DEVICE ASSISTED SERVICES INSTALL

(71) Applicant: Headwater Research LLC, Tyler, TX (US)

(72) Inventor: Gregory G. Raleigh, Incline Village, NV (US)

(73) Assignee: Headwater Research LLC, Tyler, TX (US)

( * ) Notice: Subject to any disclaimer, the term of this patent is extended or adjusted under 35 U.S.C. 154(b) by 535 days.

(21) Appl. No.: 17/742,190

(22) Filed: May 11, 2022

(65) Prior Publication Data

US 2022/0272523 A1 Aug. 25, 2022

Related U.S. Application Data

(60) Continuation of application No. 16/804,983, filed on Feb. 28, 2020, now Pat. No. 11,337,059, which is a
(Continued)

(51) Int. Cl.
*H04W 8/22* (2009.01)
*H04L 41/0806* (2022.01)
(Continued)

(52) U.S. Cl.
CPC ........... *H04W 8/22* (2013.01); *H04L 41/0806* (2013.01); *H04L 41/082* (2013.01); *H04L 67/34* (2013.01);
(Continued)

(58) Field of Classification Search
CPC ......... H04W 8/22; H04W 4/24; H04W 8/183; H04W 28/18; H04L 41/0806; H04L 41/082; H04L 67/34; H04M 15/61
See application file for complete search history.

(56) References Cited

U.S. PATENT DOCUMENTS 5,131,020 A 7/1992 Liebesny et al.
5,283,904 A 2/1994 Carson et al.
(Continued)

FOREIGN PATENT DOCUMENTS

CA 2688553 A1 12/2008
CN 1310401 A 8/2001
(Continued)

OTHER PUBLICATIONS

Rivadeneyra et al., "A communication architecture to access data services through GSM," San Sebastian, Spain, 1998.
(Continued)

*Primary Examiner* — Brandon J Miller
(74) *Attorney, Agent, or Firm* — Farjami & Farjami LLP

(57) ABSTRACT

Device assisted services (DAS) install techniques are provided in accordance with some embodiments. In some embodiments, DAS install techniques for providing service processors for mobile devices are provided. In some embodiments, DAS install techniques for downloading/installing new and/or updated service processors for mobile devices are provided. In some embodiments, DAS install techniques for providing verified service processors for mobile devices are provided. In some embodiments, DAS install techniques for providing secured service processors for mobile devices are provided. In some embodiments, DAS install techniques include determining if a communications device in communication with a wireless network includes a service processor for assisting control of the communications device use of a service on the wireless network, in which the service processor includes a service profile that includes a plurality of service policy settings, and in which the service profile is associated with a service plan that provides for access to the service; and verifying the service processor. In some embodiments, DAS install tech-
(Continued)

niques include providing a generic first version service processor for downloading and installing a second version service processor.

20 Claims, 10 Drawing Sheets

Related U.S. Application Data continuation of application No. 16/118,374, filed on Aug. 30, 2018, now Pat. No. 10,582,375, which is a continuation of application No. 15/210,619, filed on Jul. 14, 2016, now Pat. No. 10,070,305, which is a continuation of application No. 14/158,206, filed on Jan. 17, 2014, now abandoned, which is a division of application No. 13/674,808, filed on Nov. 12, 2012, now Pat. No. 8,634,821, which is a continuation of application No. 12/694,455, filed on Jan. 27, 2010, now Pat. No. 8,402,111, which is a continuation-in-part of application No. 12/380,780, filed on Mar. 2, 2009, now Pat. No. 8,839,388.

(60) Provisional application No. 61/264,120, filed on Nov. 24, 2009, provisional application No. 61/207,739, filed on Feb. 13, 2009, provisional application No. 61/207,393, filed on Feb. 10, 2009, provisional application No. 61/206,944, filed on Feb. 4, 2009, provisional application No. 61/206,354, filed on Jan. 28, 2009.

(51) Int. Cl.
*H04L 41/082* (2022.01)
*H04L 67/00* (2022.01)
*H04M 15/00* (2024.01)
*H04W 4/24* (2024.01)
*H04W 8/18* (2009.01)
*H04W 28/18* (2009.01)

(52) U.S. Cl.
CPC ....... *H04M 15/61* (2013.01); *H04M 15/8094* (2013.01); *H04W 4/24* (2013.01); *H04W 8/183* (2013.01); *H04W 28/18* (2013.01)

(56) References Cited

U.S. PATENT DOCUMENTS

| | | |
|---|---|---|
| 5,325,532 A | 6/1994 | Crosswy et al. |
| 5,572,528 A | 11/1996 | Shuen |
| 5,577,100 A | 11/1996 | McGregor et al. |
| 5,594,777 A | 1/1997 | Makkonen et al. |
| 5,617,539 A | 4/1997 | Ludwig et al. |
| 5,630,159 A | 5/1997 | Zancho |
| 5,633,484 A | 5/1997 | Zancho et al. |
| 5,633,868 A | 5/1997 | Baldwin et al. |
| 5,754,953 A | 5/1998 | Briancon et al. |
| 5,764,693 A | 6/1998 | Taylor et al. |
| 5,774,532 A | 6/1998 | Gottlieb et al. |
| 5,794,142 A | 8/1998 | Vanttila et al. |
| 5,814,798 A | 9/1998 | Zancho |
| 5,889,477 A | 3/1999 | Fastenrath |
| 5,892,900 A | 4/1999 | Ginter et al. |
| 5,903,845 A | 5/1999 | Buhrmann et al. |
| 5,915,008 A | 6/1999 | Dulman |
| 5,915,226 A | 6/1999 | Martineau |
| 5,933,778 A | 8/1999 | Buhrmann et al. |
| 5,940,472 A | 8/1999 | Newman et al. |
| 5,974,439 A | 10/1999 | Bollella |
| 5,983,270 A | 11/1999 | Abraham et al. |
| 6,035,281 A | 3/2000 | Crosskey et al. |
| 6,038,452 A | 3/2000 | Strawczynski et al. |
| 6,038,540 A | 3/2000 | Krist et al. |
| 6,047,268 A | 4/2000 | Bartoli et al. |
| 6,058,434 A | 5/2000 | Wilt et al. |
| 6,061,571 A | 5/2000 | Tamura |
| 6,064,878 A | 5/2000 | Denker et al. |
| 6,078,953 A | 6/2000 | Vaid et al. |
| 6,081,591 A | 6/2000 | Skoog |
| 6,098,878 A | 8/2000 | Dent et al. |
| 6,104,700 A | 8/2000 | Haddock et al. |
| 6,115,823 A | 9/2000 | Velasco et al. |
| 6,119,933 A | 9/2000 | Wong et al. |
| 6,125,391 A | 9/2000 | Meltzer et al. |
| 6,141,565 A | 10/2000 | Feuerstein et al. |
| 6,141,686 A | 10/2000 | Jackowski et al. |
| 6,148,336 A | 11/2000 | Thomas et al. |
| 6,154,738 A | 11/2000 | Call |
| 6,157,636 A | 12/2000 | Voit et al. |
| 6,185,576 B1 | 2/2001 | Mcintosh |
| 6,198,915 B1 | 3/2001 | McGregor et al. |
| 6,219,786 B1 | 4/2001 | Cunningham et al. |
| 6,226,277 B1 | 5/2001 | Chuah |
| 6,246,870 B1 | 6/2001 | Dent et al. |
| 6,263,055 B1 | 7/2001 | Garland et al. |
| 6,292,828 B1 | 9/2001 | Williams |
| 6,317,584 B1 | 11/2001 | Abu-Amara et al. |
| 6,370,139 B2 | 4/2002 | Redmond |
| 6,381,316 B2 | 4/2002 | Joyce et al. |
| 6,393,014 B1 | 5/2002 | Daly et al. |
| 6,397,259 B1 | 5/2002 | Lincke et al. |
| 6,401,113 B2 | 6/2002 | Lazaridis et al. |
| 6,418,147 B1 | 7/2002 | Wiedeman |
| 6,421,722 B1 | 7/2002 | Bauer et al. |
| 6,438,575 B1 | 8/2002 | Khan et al. |
| 6,445,777 B1 | 9/2002 | Clark |
| 6,449,479 B1 | 9/2002 | Sanchez |
| 6,466,984 B1 | 10/2002 | Naveh et al. |
| 6,470,182 B1 | 10/2002 | Nelson |
| 6,477,670 B1 | 11/2002 | Ahmadvand |
| 6,502,131 B1 | 12/2002 | Vaid et al. |
| 6,505,114 B2 | 1/2003 | Luciani |
| 6,510,152 B1 | 1/2003 | Gerszberg et al. |
| 6,522,629 B1 | 2/2003 | Anderson, Sr. |
| 6,532,235 B1 | 3/2003 | Benson et al. |
| 6,532,579 B2 | 3/2003 | Sato et al. |
| 6,535,855 B1 | 3/2003 | Cahill et al. |
| 6,535,949 B1 | 3/2003 | Parker |
| 6,539,082 B1 | 3/2003 | Lowe et al. |
| 6,542,500 B1 | 4/2003 | Gerszberg et al. |
| 6,542,992 B1 | 4/2003 | Peirce et al. |
| 6,546,016 B1 | 4/2003 | Gerszberg et al. |
| 6,556,823 B2 | 4/2003 | Clapton et al. |
| 6,563,806 B1 | 5/2003 | Yano et al. |
| 6,570,974 B1 | 5/2003 | Gerszberg et al. |
| 6,574,321 B1 | 6/2003 | Cox et al. |
| 6,574,465 B2 | 6/2003 | Marsh et al. |
| 6,578,076 B1 | 6/2003 | Putzolu |
| 6,581,092 B1 | 6/2003 | Motoyama |
| 6,591,098 B1 | 7/2003 | Shieh et al. |
| 6,598,034 B1 | 7/2003 | Kloth |
| 6,601,040 B1 | 7/2003 | Kolls |
| 6,603,969 B1 | 8/2003 | Vuoristo et al. |
| 6,603,975 B1 | 8/2003 | Inouchi et al. |
| 6,606,744 B1 | 8/2003 | Mikurak |
| 6,615,034 B1 | 9/2003 | Alloune et al. |
| 6,628,934 B2 | 9/2003 | Rosenberg et al. |
| 6,631,122 B1 | 10/2003 | Arunachalam et al. |
| 6,636,721 B2 | 10/2003 | Threadgill et al. |
| 6,639,975 B1 | 10/2003 | O'Neal et al. |
| 6,640,097 B2 | 10/2003 | Corrigan et al. |
| 6,640,334 B1 | 10/2003 | Rasmussen |
| 6,650,887 B2 | 11/2003 | McGregor et al. |
| 6,651,101 B1 | 11/2003 | Gai et al. |
| 6,654,786 B1 | 11/2003 | Fox et al. |
| 6,654,814 B1 | 11/2003 | Britton et al. |
| 6,658,254 B1 | 12/2003 | Purdy et al. |
| 6,662,014 B1 | 12/2003 | Walsh |
| 6,678,516 B2 | 1/2004 | Nordman et al. |
| 6,683,853 B1 | 1/2004 | Kannas et al. |
| 6,684,244 B1 | 1/2004 | Goldman et al. |

(56) References Cited

U.S. PATENT DOCUMENTS

| | | |
|---|---|---|
| 6,690,918 B2 | 2/2004 | Evans et al. |
| 6,694,362 B1 | 2/2004 | Secor et al. |
| 6,697,821 B2 | 2/2004 | Ziff et al. |
| 6,725,031 B2 | 4/2004 | Watler et al. |
| 6,725,256 B1 | 4/2004 | Albal et al. |
| 6,732,176 B1 | 5/2004 | Stewart et al. |
| 6,735,206 B1 | 5/2004 | Oki et al. |
| 6,748,195 B1 | 6/2004 | Phillips |
| 6,748,437 B1 | 6/2004 | Mankude et al. |
| 6,751,296 B1 | 6/2004 | Albal et al. |
| 6,754,470 B2 | 6/2004 | Hendrickson et al. |
| 6,757,717 B1 | 6/2004 | Goldstein |
| 6,760,417 B1 | 7/2004 | Wallenius |
| 6,763,000 B1 | 7/2004 | Walsh |
| 6,763,226 B1 | 7/2004 | McZeal, Jr. |
| 6,765,864 B1 | 7/2004 | Natarajan et al. |
| 6,765,925 B1 | 7/2004 | Sawyer et al. |
| 6,782,412 B2 | 8/2004 | Brophy et al. |
| 6,785,889 B1 | 8/2004 | Williams |
| 6,792,461 B1 | 9/2004 | Hericourt |
| 6,829,596 B1 | 12/2004 | Frazee |
| 6,829,696 B1 | 12/2004 | Balmer et al. |
| 6,839,340 B1 | 1/2005 | Voit et al. |
| 6,842,628 B1 | 1/2005 | Arnold et al. |
| 6,873,988 B2 | 3/2005 | Herrmann et al. |
| 6,876,653 B2 | 4/2005 | Ambe et al. |
| 6,879,825 B1 | 4/2005 | Daly |
| 6,882,718 B1 | 4/2005 | Smith |
| 6,885,997 B1 | 4/2005 | Roberts |
| 6,901,440 B1 | 5/2005 | Bimm et al. |
| 6,920,455 B1 | 7/2005 | Weschler |
| 6,922,562 B2 | 7/2005 | Ward et al. |
| 6,928,280 B1 | 8/2005 | Xanthos et al. |
| 6,934,249 B1 | 8/2005 | Bertin et al. |
| 6,934,751 B2 | 8/2005 | Jayapalan et al. |
| 6,947,723 B1 | 9/2005 | Gurnani et al. |
| 6,947,985 B2 | 9/2005 | Hegli et al. |
| 6,952,428 B1 | 10/2005 | Necka et al. |
| 6,957,067 B1 | 10/2005 | Iyer et al. |
| 6,959,202 B2 | 10/2005 | Heinonen et al. |
| 6,959,393 B2 | 10/2005 | Hollis et al. |
| 6,965,667 B2 | 11/2005 | Trabandt et al. |
| 6,965,872 B1 | 11/2005 | Grdina |
| 6,967,958 B2 | 11/2005 | Ono et al. |
| 6,970,692 B2 | 11/2005 | Tysor |
| 6,970,927 B1 | 11/2005 | Stewart et al. |
| 6,982,733 B1 | 1/2006 | McNally et al. |
| 6,983,370 B2 | 1/2006 | Eaton et al. |
| 6,996,062 B1 | 2/2006 | Freed et al. |
| 6,996,076 B1 | 2/2006 | Forbes et al. |
| 6,996,393 B2 | 2/2006 | Pyhalammi et al. |
| 6,998,985 B2 | 2/2006 | Reisman et al. |
| 7,002,920 B1 | 2/2006 | Ayyagari et al. |
| 7,007,295 B1 | 2/2006 | Rose et al. |
| 7,013,469 B2 | 3/2006 | Smith et al. |
| 7,017,189 B1 | 3/2006 | DeMello et al. |
| 7,024,200 B2 | 4/2006 | McKenna et al. |
| 7,024,460 B2 | 4/2006 | Koopmas et al. |
| 7,027,055 B2 | 4/2006 | Anderson et al. |
| 7,027,408 B2 | 4/2006 | Nabkel et al. |
| 7,031,733 B2 | 4/2006 | Alminana et al. |
| 7,032,072 B1 | 4/2006 | Quinn et al. |
| 7,039,027 B2 | 5/2006 | Bridgelall |
| 7,039,037 B2 | 5/2006 | Wang et al. |
| 7,039,403 B2 | 5/2006 | Wong |
| 7,039,713 B1 | 5/2006 | Van Gunter et al. |
| 7,042,988 B2 | 5/2006 | Juitt et al. |
| 7,043,225 B1 | 5/2006 | Patel et al. |
| 7,043,226 B2 | 5/2006 | Yamauchi |
| 7,043,268 B2 | 5/2006 | Yukie et al. |
| 7,047,276 B2 | 5/2006 | Liu et al. |
| 7,058,022 B1 | 6/2006 | Carolan et al. |
| 7,058,968 B2 | 6/2006 | Rowland et al. |
| 7,068,600 B2 | 6/2006 | Cain |
| 7,069,248 B2 | 6/2006 | Huber |
| 7,082,422 B1 | 7/2006 | Zirngibi et al. |
| 7,084,775 B1 | 8/2006 | Smith |
| 7,092,696 B1 | 8/2006 | Hosain et al. |
| 7,095,754 B2 | 8/2006 | Benveniste |
| 7,102,620 B2 | 9/2006 | Harries et al. |
| 7,110,753 B2 | 9/2006 | Campen |
| 7,113,780 B2 | 9/2006 | McKenna et al. |
| 7,113,997 B2 | 9/2006 | Jayapalan et al. |
| 7,120,133 B1 | 10/2006 | Joo et al. |
| 7,133,386 B2 | 11/2006 | Holur et al. |
| 7,133,695 B2 | 11/2006 | Beyda |
| 7,136,361 B2 | 11/2006 | Benveniste |
| 7,139,569 B2 | 11/2006 | Kato |
| 7,142,876 B2 | 11/2006 | Trossen et al. |
| 7,149,229 B1 | 12/2006 | Leung |
| 7,149,521 B2 | 12/2006 | Sundar et al. |
| 7,151,764 B1 | 12/2006 | Heinonen et al. |
| 7,158,792 B1 | 1/2007 | Cook et al. |
| 7,162,237 B1 | 1/2007 | Silver et al. |
| 7,165,040 B2 | 1/2007 | Ehrman et al. |
| 7,167,078 B2 | 1/2007 | Pourchot |
| 7,174,156 B1 | 2/2007 | Mangal |
| 7,174,174 B2 | 2/2007 | Boris et al. |
| 7,177,919 B1 | 2/2007 | Truong et al. |
| 7,180,855 B1 | 2/2007 | Lin |
| 7,181,017 B1 | 2/2007 | Nagel et al. |
| 7,191,248 B2 | 3/2007 | Chattopadhyay et al. |
| 7,197,321 B2 | 3/2007 | Erskine et al. |
| 7,200,112 B2 | 4/2007 | Sundar et al. |
| 7,200,551 B1 | 4/2007 | Senez |
| 7,203,169 B1 | 4/2007 | Okholm et al. |
| 7,203,721 B1 | 4/2007 | Ben-Efraim et al. |
| 7,203,752 B2 | 4/2007 | Rice et al. |
| 7,212,491 B2 | 5/2007 | Koga |
| 7,219,123 B1 | 5/2007 | Flechter et al. |
| 7,222,190 B2 | 5/2007 | Klinker et al. |
| 7,222,304 B2 | 5/2007 | Beaton et al. |
| 7,224,968 B2 | 5/2007 | Dobson et al. |
| 7,228,354 B2 | 6/2007 | Chambliss et al. |
| 7,236,780 B2 | 6/2007 | Benco |
| 7,242,668 B2 | 7/2007 | Kan et al. |
| 7,242,920 B2 | 7/2007 | Morris |
| 7,245,901 B2 | 7/2007 | McGregor et al. |
| 7,248,570 B2 | 7/2007 | Bahl et al. |
| 7,251,218 B2 | 7/2007 | Jorgensen |
| 7,260,382 B1 | 8/2007 | Lamb et al. |
| 7,266,371 B1 | 9/2007 | Amin et al. |
| 7,269,157 B2 | 9/2007 | Klinker et al. |
| 7,271,765 B2 | 9/2007 | Stilp et al. |
| 7,272,660 B1 | 9/2007 | Powers et al. |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,286,834 B2 | 10/2007 | Walter |
| 7,286,848 B2 | 10/2007 | Vireday et al. |
| 7,289,489 B1 | 10/2007 | Kung et al. |
| 7,290,283 B2 | 10/2007 | Copeland, III |
| 7,310,424 B2 | 12/2007 | Gehring et al. |
| 7,313,237 B2 | 12/2007 | Bahl et al. |
| 7,315,892 B2 | 1/2008 | Freimuth et al. |
| 7,317,699 B2 | 1/2008 | Godfrey et al. |
| 7,318,050 B1 | 1/2008 | Musgrave |
| 7,318,111 B2 | 1/2008 | Zhao |
| 7,320,029 B2 | 1/2008 | Rinne et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,340,772 B2 | 3/2008 | Panasyuk et al. |
| 7,346,410 B2 | 3/2008 | Uchiyama |
| 7,349,695 B2 | 3/2008 | Oommen et al. |
| 7,353,533 B2 | 4/2008 | Wright et al. |
| 7,356,011 B1 | 4/2008 | Waters et al. |
| 7,356,337 B2 | 4/2008 | Florence |
| 7,366,497 B2 | 4/2008 | Nagata |
| 7,366,654 B2 | 4/2008 | Moore |
| 7,366,934 B1 | 4/2008 | Narayan et al. |
| 7,369,848 B2 | 5/2008 | Jiang |

(56) References Cited

U.S. PATENT DOCUMENTS

| | | |
|---|---|---|
| 7,369,856 B2 | 5/2008 | Ovadia |
| 7,373,136 B2 | 5/2008 | Watler et al. |
| 7,373,179 B2 | 5/2008 | Stine et al. |
| 7,379,731 B2 | 5/2008 | Natsuno et al. |
| 7,388,950 B2 | 6/2008 | Elsey et al. |
| 7,389,412 B2 | 6/2008 | Sharma et al. |
| 7,391,724 B2 | 6/2008 | Alakoski et al. |
| 7,395,056 B2 | 7/2008 | Petermann |
| 7,395,244 B1 | 7/2008 | Kingsford |
| 7,401,338 B1 | 7/2008 | Bowen et al. |
| 7,403,763 B2 | 7/2008 | Maes |
| 7,409,447 B1 | 8/2008 | Assadzadeh |
| 7,409,569 B2 | 8/2008 | Illowsky et al. |
| 7,411,930 B2 | 8/2008 | Montojo et al. |
| 7,418,253 B2 | 8/2008 | Kavanah |
| 7,418,257 B2 | 8/2008 | Kim |
| 7,421,004 B2 | 9/2008 | Feher |
| 7,423,971 B1 | 9/2008 | Mohaban et al. |
| 7,428,750 B1 | 9/2008 | Dunn et al. |
| 7,433,362 B2 | 10/2008 | Mallya et al. |
| 7,436,816 B2 | 10/2008 | Mehta et al. |
| 7,440,433 B2 | 10/2008 | Rink et al. |
| 7,444,669 B1 | 10/2008 | Bahl et al. |
| 7,450,591 B2 | 11/2008 | Korling et al. |
| 7,450,927 B1 | 11/2008 | Creswell et al. |
| 7,454,191 B2 | 11/2008 | Dawson et al. |
| 7,457,265 B2 | 11/2008 | Julka et al. |
| 7,457,870 B1 | 11/2008 | Lownsbrough et al. |
| 7,460,837 B2 | 12/2008 | Diener |
| 7,466,652 B2 | 12/2008 | Lau et al. |
| 7,467,160 B2 | 12/2008 | McIntyre |
| 7,472,189 B2 | 12/2008 | Mallya et al. |
| 7,478,420 B2 | 1/2009 | Wright et al. |
| 7,486,185 B2 | 2/2009 | Culpepper et al. |
| 7,486,658 B2 | 2/2009 | Kumar |
| 7,493,659 B1 | 2/2009 | Wu et al. |
| 7,496,652 B2 | 2/2009 | Pezzutti |
| 7,499,438 B2 | 3/2009 | Hinman et al. |
| 7,499,537 B2 | 3/2009 | Elsey et al. |
| 7,502,672 B1 | 3/2009 | Kolls |
| 7,505,756 B2 | 3/2009 | Bahl |
| 7,505,795 B1 | 3/2009 | Lim et al. |
| 7,508,799 B2 | 3/2009 | Sumner et al. |
| 7,512,128 B2 | 3/2009 | DiMambro et al. |
| 7,512,131 B2 | 3/2009 | Svensson et al. |
| 7,515,608 B2 | 4/2009 | Yuan et al. |
| 7,515,926 B2 | 4/2009 | Bu et al. |
| 7,516,219 B2 | 4/2009 | Moghaddam et al. |
| 7,522,549 B2 | 4/2009 | Karaoguz et al. |
| 7,522,576 B2 | 4/2009 | Du et al. |
| 7,526,541 B2 | 4/2009 | Roese et al. |
| 7,529,204 B2 | 5/2009 | Bourlas et al. |
| 7,535,880 B1 | 5/2009 | Hinman et al. |
| 7,536,695 B2 | 5/2009 | Alam et al. |
| 7,539,132 B2 | 5/2009 | Werner et al. |
| 7,539,862 B2 | 5/2009 | Edgett et al. |
| 7,540,408 B2 | 6/2009 | Levine et al. |
| 7,545,782 B2 | 6/2009 | Rayment et al. |
| 7,546,460 B2 | 6/2009 | Maes |
| 7,546,629 B2 | 6/2009 | Albert et al. |
| 7,548,875 B2 | 6/2009 | Mikkelsen et al. |
| 7,548,976 B2 | 6/2009 | Bahl et al. |
| 7,551,921 B2 | 6/2009 | Petermann |
| 7,551,922 B2 | 6/2009 | Roskowski et al. |
| 7,554,983 B1 | 6/2009 | Muppala |
| 7,555,757 B2 | 6/2009 | Smith et al. |
| 7,561,899 B2 | 7/2009 | Lee |
| 7,562,213 B1 | 7/2009 | Timms |
| 7,564,799 B2 | 7/2009 | Holland et al. |
| 7,565,141 B2 | 7/2009 | Macaluso |
| 7,574,509 B2 | 8/2009 | Nixon et al. |
| 7,574,731 B2 | 8/2009 | Fascenda |
| 7,577,431 B2 | 8/2009 | Jiang |
| 7,580,356 B1 | 8/2009 | Mishra et al. |
| 7,580,857 B2 | 8/2009 | VanFleet et al. |
| 7,583,964 B2 | 9/2009 | Wong |
| 7,584,298 B2 | 9/2009 | Klinker et al. |
| 7,585,217 B2 | 9/2009 | Lutnick et al. |
| 7,586,871 B2 | 9/2009 | Hamilton et al. |
| 7,593,417 B2 | 9/2009 | Wang et al. |
| 7,593,730 B2 | 9/2009 | Khandelwal et al. |
| 7,596,373 B2 | 9/2009 | Mcgregor et al. |
| 7,599,288 B2 | 10/2009 | Cole et al. |
| 7,599,714 B2 | 10/2009 | Kuzminskiy |
| 7,602,746 B2 | 10/2009 | Calhoun et al. |
| 7,606,918 B2 | 10/2009 | Holzman et al. |
| 7,607,041 B2 | 10/2009 | Kraemer et al. |
| 7,609,650 B2 | 10/2009 | Roskowski et al. |
| 7,609,700 B1 | 10/2009 | Ying et al. |
| 7,610,047 B2 | 10/2009 | Hicks, III et al. |
| 7,610,057 B2 | 10/2009 | Bahl et al. |
| 7,610,328 B2 | 10/2009 | Haase et al. |
| 7,610,396 B2 | 10/2009 | Taglienti et al. |
| 7,614,051 B2 | 11/2009 | Glaum et al. |
| 7,616,962 B2 | 11/2009 | Oswal et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,620,383 B2 | 11/2009 | Taglienti et al. |
| 7,627,314 B2 | 12/2009 | Carlson et al. |
| 7,627,600 B2 | 12/2009 | Citron et al. |
| 7,627,767 B2 | 12/2009 | Sherman et al. |
| 7,627,872 B2 | 12/2009 | Hebeler et al. |
| 7,633,438 B2 | 12/2009 | Tysowski |
| 7,634,388 B2 | 12/2009 | Archer et al. |
| 7,636,574 B2 | 12/2009 | Poosala |
| 7,636,626 B2 | 12/2009 | Oesterling et al. |
| 7,643,411 B2 | 1/2010 | Andreasen et al. |
| 7,644,151 B2 | 1/2010 | Jerrim et al. |
| 7,644,267 B2 | 1/2010 | Ylikoski et al. |
| 7,644,414 B2 | 1/2010 | Smith et al. |
| 7,647,047 B2 | 1/2010 | Moghaddam et al. |
| 7,650,137 B2 | 1/2010 | Jobs et al. |
| 7,653,394 B2 | 1/2010 | McMillin |
| 7,656,271 B2 | 2/2010 | Ehrman et al. |
| 7,657,920 B2 | 2/2010 | Arseneau et al. |
| 7,660,419 B1 | 2/2010 | Ho |
| 7,661,124 B2 | 2/2010 | Ramanathan et al. |
| 7,664,494 B2 | 2/2010 | Jiang |
| 7,668,176 B2 | 2/2010 | Chuah |
| 7,668,612 B1 | 2/2010 | Okkonen |
| 7,668,903 B2 | 2/2010 | Edwards et al. |
| 7,668,966 B2 | 2/2010 | Klinker et al. |
| 7,672,695 B1 | 3/2010 | Rainnie et al. |
| 7,676,673 B2 | 3/2010 | Weller et al. |
| 7,680,086 B2 | 3/2010 | Eglin |
| 7,681,226 B2 | 3/2010 | Kraemer et al. |
| 7,684,370 B2 | 3/2010 | Kezys |
| 7,685,131 B2 | 3/2010 | Batra et al. |
| 7,685,254 B2 | 3/2010 | Pandya |
| 7,685,530 B2 | 3/2010 | Sherrard et al. |
| 7,688,792 B2 | 3/2010 | Babbar et al. |
| 7,693,107 B2 | 4/2010 | De Froment |
| 7,693,720 B2 | 4/2010 | Kennewick et al. |
| 7,697,540 B2 | 4/2010 | Haddad et al. |
| 7,710,932 B2 | 5/2010 | Muthuswamy et al. |
| 7,711,848 B2 | 5/2010 | Maes |
| 7,719,966 B2 | 5/2010 | Luft et al. |
| 7,720,206 B2 | 5/2010 | Devolites et al. |
| 7,720,464 B2 | 5/2010 | Batta |
| 7,720,505 B2 | 5/2010 | Gopi et al. |
| 7,720,960 B2 | 5/2010 | Pruss et al. |
| 7,721,296 B2 | 5/2010 | Ricagni |
| 7,724,716 B2 | 5/2010 | Fadell |
| 7,725,570 B1 | 5/2010 | Lewis |
| 7,729,326 B2 | 6/2010 | Sekhar |
| 7,730,123 B1 | 6/2010 | Erickson et al. |
| 7,734,784 B1 | 6/2010 | Araujo et al. |
| 7,742,406 B1 | 6/2010 | Muppala |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |

(56) References Cited

U.S. PATENT DOCUMENTS

| | | |
|---|---|---|
| 7,752,330 B2 | 7/2010 | Olsen et al. |
| 7,756,056 B2 | 7/2010 | Kim et al. |
| 7,756,534 B2 | 7/2010 | Anupam et al. |
| 7,756,757 B1 | 7/2010 | Oakes, III |
| 7,760,137 B2 | 7/2010 | Martucci et al. |
| 7,760,711 B1 | 7/2010 | Kung et al. |
| 7,760,861 B1 | 7/2010 | Croak et al. |
| 7,765,294 B2 | 7/2010 | Edwards et al. |
| 7,769,397 B2 | 8/2010 | Funato et al. |
| 7,770,785 B2 | 8/2010 | Jha et al. |
| 7,774,323 B2 | 8/2010 | Helfman |
| 7,774,412 B1 | 8/2010 | Schnepel |
| 7,774,456 B1 | 8/2010 | Lownsbrough et al. |
| 7,778,176 B2 | 8/2010 | Morford |
| 7,778,643 B2 | 8/2010 | Laroia et al. |
| 7,792,257 B1 | 9/2010 | Vanier et al. |
| 7,792,538 B2 | 9/2010 | Kozisek |
| 7,792,708 B2 | 9/2010 | Alva |
| 7,797,019 B2 | 9/2010 | Friedmann |
| 7,797,060 B2 | 9/2010 | Grgic et al. |
| 7,797,204 B2 | 9/2010 | Balent |
| 7,797,401 B2 | 9/2010 | Stewart et al. |
| 7,801,523 B1 | 9/2010 | Kenderov |
| 7,801,783 B2 | 9/2010 | Kende et al. |
| 7,801,985 B1 | 9/2010 | Pitkow et al. |
| 7,802,724 B1 | 9/2010 | Nohr |
| 7,805,140 B2 | 9/2010 | Friday et al. |
| 7,805,522 B2 | 9/2010 | Schlüter et al. |
| 7,805,606 B2 | 9/2010 | Birger et al. |
| 7,809,351 B1 | 10/2010 | Panda et al. |
| 7,809,372 B2 | 10/2010 | Rajaniemi |
| 7,813,746 B2 | 10/2010 | Rajkotia |
| 7,817,615 B1 | 10/2010 | Breau et al. |
| 7,817,983 B2 | 10/2010 | Cassett et al. |
| 7,822,837 B1 | 10/2010 | Urban et al. |
| 7,822,849 B2 | 10/2010 | Titus |
| 7,826,427 B2 | 11/2010 | Sood et al. |
| 7,826,607 B1 | 11/2010 | De Carvalho Resende et al. |
| 7,835,275 B1 | 11/2010 | Swan et al. |
| 7,843,831 B2 | 11/2010 | Morrill et al. |
| 7,843,843 B2 | 11/2010 | Papp, III et al. |
| 7,844,034 B1 | 11/2010 | Oh et al. |
| 7,844,728 B2 | 11/2010 | Anderson et al. |
| 7,848,768 B2 | 12/2010 | Omori et al. |
| 7,849,161 B2 | 12/2010 | Koch et al. |
| 7,849,170 B1 | 12/2010 | Hargens et al. |
| 7,849,310 B2 | 12/2010 | Watt et al. |
| 7,849,477 B2 | 12/2010 | Cristofalo et al. |
| 7,853,255 B2 | 12/2010 | Karaoguz et al. |
| 7,853,656 B2 | 12/2010 | Yach et al. |
| 7,856,226 B2 | 12/2010 | Wong et al. |
| 7,860,088 B2 | 12/2010 | Lioy |
| 7,865,182 B2 | 1/2011 | Macaluso |
| 7,865,187 B2 | 1/2011 | Ramer et al. |
| 7,868,778 B2 | 1/2011 | Kenwright |
| 7,873,001 B2 | 1/2011 | Silver |
| 7,873,344 B2 | 1/2011 | Bowser et al. |
| 7,873,346 B2 | 1/2011 | Petersson et al. |
| 7,873,540 B2 | 1/2011 | Arumugam |
| 7,873,705 B2 | 1/2011 | Kalish |
| 7,877,090 B2 | 1/2011 | Maes |
| 7,881,199 B2 | 2/2011 | Krstulich |
| 7,881,267 B2 | 2/2011 | Crosswy et al. |
| 7,881,697 B2 | 2/2011 | Baker et al. |
| 7,882,029 B2 | 2/2011 | White |
| 7,882,247 B2 | 2/2011 | Sturniolo et al. |
| 7,882,560 B2 | 2/2011 | Kraemer et al. |
| 7,886,047 B1 | 2/2011 | Potluri |
| 7,889,384 B2 | 2/2011 | Armentrout et al. |
| 7,890,084 B1 | 2/2011 | Dudziak et al. |
| 7,890,111 B2 | 2/2011 | Bugenhagen |
| 7,894,431 B2 | 2/2011 | Goring et al. |
| 7,899,039 B2 | 3/2011 | Andreasen et al. |
| 7,899,438 B2 | 3/2011 | Baker et al. |
| 7,903,553 B2 | 3/2011 | Liu |
| 7,907,970 B2 | 3/2011 | Park et al. |
| 7,908,358 B1 | 3/2011 | Prasad et al. |
| 7,911,975 B2 | 3/2011 | Droz et al. |
| 7,912,025 B2 | 3/2011 | Pattenden et al. |
| 7,912,056 B1 | 3/2011 | Brassem |
| 7,920,529 B1 | 4/2011 | Mahler et al. |
| 7,921,463 B2 | 4/2011 | Sood et al. |
| 7,925,740 B2 | 4/2011 | Nath et al. |
| 7,925,778 B1 | 4/2011 | Wijnands et al. |
| 7,929,959 B2 | 4/2011 | DeAtley et al. |
| 7,929,960 B2 | 4/2011 | Martin et al. |
| 7,929,973 B2 | 4/2011 | Zavalkovsky et al. |
| 7,930,327 B2 | 4/2011 | Craft et al. |
| 7,930,446 B2 | 4/2011 | Kesselman et al. |
| 7,930,553 B2 | 4/2011 | Satarasinghe et al. |
| 7,933,274 B2 | 4/2011 | Verma et al. |
| 7,936,736 B2 | 5/2011 | Proctor, Jr. et al. |
| 7,937,069 B2 | 5/2011 | Rassam |
| 7,937,450 B2 | 5/2011 | Janik |
| 7,940,685 B1 | 5/2011 | Breslau et al. |
| 7,940,751 B2 | 5/2011 | Hansen |
| 7,941,184 B2 | 5/2011 | Prendergast et al. |
| 7,944,948 B2 | 5/2011 | Chow et al. |
| 7,945,238 B2 | 5/2011 | Baker et al. |
| 7,945,240 B1 | 5/2011 | Klock et al. |
| 7,945,945 B2 | 5/2011 | Graham et al. |
| 7,948,952 B2 | 5/2011 | Hurtta et al. |
| 7,948,953 B2 | 5/2011 | Melkote et al. |
| 7,948,968 B2 | 5/2011 | Voit et al. |
| 7,949,529 B2 | 5/2011 | Weider et al. |
| 7,953,808 B2 | 5/2011 | Sharp et al. |
| 7,953,877 B2 | 5/2011 | Vemula et al. |
| 7,957,020 B2 | 6/2011 | Mine et al. |
| 7,957,381 B2 | 6/2011 | Clermidy et al. |
| 7,957,511 B2 | 6/2011 | Drudis et al. |
| 7,958,029 B1 | 6/2011 | Bobich et al. |
| 7,962,622 B2 | 6/2011 | Friend et al. |
| 7,965,983 B1 | 6/2011 | Swan et al. |
| 7,966,405 B2 | 6/2011 | Sundaresan et al. |
| 7,969,950 B2 | 6/2011 | Iyer et al. |
| 7,970,350 B2 | 6/2011 | Sheynman |
| 7,970,426 B2 | 6/2011 | Poe et al. |
| 7,974,624 B2 | 7/2011 | Gallagher et al. |
| 7,975,184 B2 | 7/2011 | Goff et al. |
| 7,978,627 B2 | 7/2011 | Taylor et al. |
| 7,978,686 B2 | 7/2011 | Goyal et al. |
| 7,979,069 B2 | 7/2011 | Hupp et al. |
| 7,979,889 B2 | 7/2011 | Gladstone et al. |
| 7,979,896 B2 | 7/2011 | McMurtry et al. |
| 7,984,130 B2 | 7/2011 | Bogineni et al. |
| 7,984,511 B2 | 7/2011 | Kocher et al. |
| 7,986,935 B1 | 7/2011 | D'Souza et al. |
| 7,987,496 B2 | 7/2011 | Bryce et al. |
| 7,987,510 B2 | 7/2011 | Kocher et al. |
| 7,990,049 B2 | 8/2011 | Shioya |
| 8,000,276 B2 | 8/2011 | Scherzer et al. |
| 8,000,318 B2 | 8/2011 | Wiley et al. |
| 8,005,009 B2 | 8/2011 | McKee et al. |
| 8,005,459 B2 | 8/2011 | Balsillie |
| 8,005,726 B1 | 8/2011 | Bao |
| 8,005,913 B1 | 8/2011 | Carlander |
| 8,005,988 B2 | 8/2011 | Maes |
| 8,010,080 B1 | 8/2011 | Thenthiruperai et al. |
| 8,010,081 B1 | 8/2011 | Roskowski |
| 8,010,082 B2 | 8/2011 | Sutaria et al. |
| 8,010,990 B2 | 8/2011 | Ferguson et al. |
| 8,015,133 B1 | 9/2011 | Wu et al. |
| 8,015,234 B2 | 9/2011 | Lum et al. |
| 8,015,249 B2 | 9/2011 | Nayak et al. |
| 8,019,687 B2 | 9/2011 | Wang et al. |
| 8,019,820 B2 | 9/2011 | Son et al. |
| 8,019,846 B2 | 9/2011 | Roelens et al. |
| 8,019,868 B2 | 9/2011 | Rao et al. |
| 8,019,886 B2 | 9/2011 | Harrang et al. |
| 8,023,425 B2 | 9/2011 | Raleigh |
| 8,024,397 B1 | 9/2011 | Erickson et al. |
| 8,024,424 B2 | 9/2011 | Freimuth et al. |
| 8,027,339 B2 | 9/2011 | Short et al. |
| 8,031,601 B2 | 10/2011 | Feroz et al. |

(56) References Cited

U.S. PATENT DOCUMENTS

| | | |
|---|---|---|
| 8,032,168 B2 | 10/2011 | Ikaheimo |
| 8,032,409 B1 | 10/2011 | Mikurak |
| 8,032,899 B2 | 10/2011 | Archer et al. |
| 8,036,387 B2 | 10/2011 | Kudelski et al. |
| 8,036,600 B2 | 10/2011 | Garrett et al. |
| 8,044,792 B2 | 10/2011 | Orr et al. |
| 8,045,973 B2 | 10/2011 | Chambers |
| 8,046,449 B2 | 10/2011 | Yoshiuchi |
| 8,050,275 B1 | 11/2011 | Iyer |
| 8,050,690 B2 | 11/2011 | Neeraj |
| 8,050,705 B2 | 11/2011 | Sicher et al. |
| 8,059,530 B1 | 11/2011 | Cole |
| 8,060,017 B2 | 11/2011 | Schlicht et al. |
| 8,060,463 B1 | 11/2011 | Spiegel |
| 8,060,603 B2 | 11/2011 | Caunter et al. |
| 8,060,748 B2 | 11/2011 | Johansson et al. |
| 8,064,417 B2 | 11/2011 | Maki |
| 8,064,418 B2 | 11/2011 | Maki |
| 8,064,896 B2 | 11/2011 | Bell et al. |
| 8,065,365 B2 | 11/2011 | Saxena et al. |
| 8,068,824 B2 | 11/2011 | Shan et al. |
| 8,068,829 B2 | 11/2011 | Lemond et al. |
| 8,073,427 B2 | 12/2011 | Koch et al. |
| 8,073,721 B1 | 12/2011 | Lewis |
| 8,078,140 B2 | 12/2011 | Baker et al. |
| 8,078,163 B2 | 12/2011 | Lemond et al. |
| 8,085,808 B2 | 12/2011 | Brusca et al. |
| 8,086,398 B2 | 12/2011 | Sanchez et al. |
| 8,086,497 B1 | 12/2011 | Oakes, III |
| 8,086,791 B2 | 12/2011 | Caulkins |
| 8,090,359 B2 | 1/2012 | Proctor, Jr. et al. |
| 8,090,361 B2 | 1/2012 | Hagan |
| 8,090,616 B2 | 1/2012 | Proctor, Jr. et al. |
| 8,091,087 B2 | 1/2012 | Ali et al. |
| 8,094,551 B2 | 1/2012 | Huber et al. |
| 8,095,112 B2 | 1/2012 | Chow et al. |
| 8,095,124 B2 | 1/2012 | Balia |
| 8,095,640 B2 | 1/2012 | Guingo et al. |
| 8,095,666 B2 | 1/2012 | Schmidt et al. |
| 8,098,579 B2 | 1/2012 | Ray et al. |
| 8,099,077 B2 | 1/2012 | Chowdhury et al. |
| 8,099,517 B2 | 1/2012 | Jia et al. |
| 8,102,814 B2 | 1/2012 | Rahman et al. |
| 8,103,285 B2 | 1/2012 | Kalhan |
| 8,104,080 B2 | 1/2012 | Burns et al. |
| 8,107,953 B2 | 1/2012 | Zimmerman et al. |
| 8,108,520 B2 | 1/2012 | Ruutu et al. |
| 8,108,680 B2 | 1/2012 | Murray |
| 8,112,435 B2 | 2/2012 | Epstein et al. |
| 8,116,223 B2 | 2/2012 | Tian et al. |
| 8,116,749 B2 | 2/2012 | Proctor, Jr. et al. |
| 8,116,781 B2 | 2/2012 | Chen et al. |
| 8,122,128 B2 | 2/2012 | Burke, II et al. |
| 8,122,249 B2 | 2/2012 | Falk et al. |
| 8,125,897 B2 | 2/2012 | Ray et al. |
| 8,126,123 B2 | 2/2012 | Cai et al. |
| 8,126,396 B2 | 2/2012 | Bennett |
| 8,126,476 B2 | 2/2012 | Vardi et al. |
| 8,126,722 B2 | 2/2012 | Robb et al. |
| 8,130,793 B2 | 3/2012 | Edwards et al. |
| 8,131,256 B2 | 3/2012 | Martti et al. |
| 8,131,281 B1 | 3/2012 | Hildner et al. |
| 8,131,840 B1 | 3/2012 | Denker |
| 8,131,858 B2 | 3/2012 | Agulnik et al. |
| 8,132,256 B2 | 3/2012 | Bari |
| 8,134,954 B2 | 3/2012 | Godfrey et al. |
| 8,135,388 B1 | 3/2012 | Gailloux et al. |
| 8,135,392 B2 | 3/2012 | Marcellino et al. |
| 8,135,657 B2 | 3/2012 | Kapoor et al. |
| 8,140,690 B2 | 3/2012 | Ly et al. |
| 8,144,591 B2 | 3/2012 | Ghai et al. |
| 8,145,194 B2 | 3/2012 | Yoshikawa et al. |
| 8,146,142 B2 | 3/2012 | Lortz et al. |
| 8,149,748 B2 | 4/2012 | Bata et al. |
| 8,149,823 B2 | 4/2012 | Turcan et al. |
| 8,150,394 B2 | 4/2012 | Bianconi et al. |
| 8,150,431 B2 | 4/2012 | Wolovitz et al. |
| 8,151,205 B2 | 4/2012 | Follmann et al. |
| 8,155,155 B1 | 4/2012 | Chow et al. |
| 8,155,620 B2 | 4/2012 | Wang et al. |
| 8,155,666 B2 | 4/2012 | Alizadeh-Shabdiz |
| 8,155,670 B2 | 4/2012 | Fullam et al. |
| 8,156,206 B2 | 4/2012 | Kiley et al. |
| 8,159,520 B1 | 4/2012 | Dhanoa et al. |
| 8,160,015 B2 | 4/2012 | Rashid et al. |
| 8,160,056 B2 | 4/2012 | Van der Merwe et al. |
| 8,160,598 B2 | 4/2012 | Savoor |
| 8,165,576 B2 | 4/2012 | Raju et al. |
| 8,166,040 B2 | 4/2012 | Brindisi et al. |
| 8,166,554 B2 | 4/2012 | John |
| 8,170,553 B2 | 5/2012 | Bennett |
| 8,174,378 B2 | 5/2012 | Richman et al. |
| 8,174,970 B2 | 5/2012 | Adamczyk et al. |
| 8,175,574 B1 | 5/2012 | Panda et al. |
| 8,180,333 B1 | 5/2012 | Wells et al. |
| 8,180,881 B2 | 5/2012 | Seo et al. |
| 8,180,886 B2 | 5/2012 | Overcash et al. |
| 8,184,530 B1 | 5/2012 | Swan et al. |
| 8,184,590 B2 | 5/2012 | Rosenblatt |
| 8,185,088 B2 | 5/2012 | Klein et al. |
| 8,185,093 B2 | 5/2012 | Jheng et al. |
| 8,185,127 B1 | 5/2012 | Cai et al. |
| 8,185,152 B1 | 5/2012 | Goldner |
| 8,185,158 B2 | 5/2012 | Tamura et al. |
| 8,190,087 B2 | 5/2012 | Fisher et al. |
| 8,190,122 B1 | 5/2012 | Alexander et al. |
| 8,190,675 B2 | 5/2012 | Tribbett |
| 8,191,106 B2 | 5/2012 | Choyi et al. |
| 8,191,116 B1 | 5/2012 | Gazzard |
| 8,191,124 B2 | 5/2012 | Wynn et al. |
| 8,194,549 B2 | 6/2012 | Huber et al. |
| 8,194,553 B2 | 6/2012 | Liang et al. |
| 8,194,572 B2 | 6/2012 | Horvath et al. |
| 8,194,581 B1 | 6/2012 | Schroeder et al. |
| 8,195,093 B2 | 6/2012 | Garrett et al. |
| 8,195,153 B1 | 6/2012 | Frencel et al. |
| 8,195,163 B2 | 6/2012 | Gisby et al. |
| 8,195,661 B2 | 6/2012 | Kalavade |
| 8,196,199 B2 | 6/2012 | Hrastar et al. |
| 8,200,163 B2 | 6/2012 | Hoffman |
| 8,200,200 B1 | 6/2012 | Belser et al. |
| 8,200,509 B2 | 6/2012 | Kenedy et al. |
| 8,200,775 B2 | 6/2012 | Moore |
| 8,200,818 B2 | 6/2012 | Freund et al. |
| 8,204,190 B2 | 6/2012 | Bang et al. |
| 8,204,505 B2 | 6/2012 | Jin et al. |
| 8,208,788 B2 | 6/2012 | Ando et al. |
| 8,208,919 B2 | 6/2012 | Kotecha |
| 8,213,296 B2 | 7/2012 | Shannon et al. |
| 8,213,363 B2 | 7/2012 | Ying et al. |
| 8,214,536 B2 | 7/2012 | Zhao |
| 8,214,890 B2 | 7/2012 | Kirovski et al. |
| 8,219,134 B2 | 7/2012 | Maharajh et al. |
| 8,223,655 B2 | 7/2012 | Heinz et al. |
| 8,223,741 B1 | 7/2012 | Bartlett et al. |
| 8,224,382 B2 | 7/2012 | Bultman |
| 8,224,773 B2 | 7/2012 | Spiegel |
| 8,228,818 B2 | 7/2012 | Chase et al. |
| 8,229,394 B2 | 7/2012 | Karlberg |
| 8,229,914 B2 | 7/2012 | Ramer et al. |
| 8,233,433 B2 | 7/2012 | Kalhan |
| 8,233,883 B2 | 7/2012 | De Froment |
| 8,233,895 B2 | 7/2012 | Tysowski |
| 8,234,583 B2 | 7/2012 | Sloo et al. |
| 8,238,287 B1 | 8/2012 | Gopi et al. |
| 8,238,913 B1 | 8/2012 | Bhattacharyya et al. |
| 8,239,520 B2 | 8/2012 | Grah |
| 8,242,959 B2 | 8/2012 | Mia et al. |
| 8,244,241 B2 | 8/2012 | Montemurro |
| 8,249,601 B2 | 8/2012 | Emberson et al. |
| 8,254,880 B2 | 8/2012 | Aaltonen et al. |
| 8,254,915 B2 | 8/2012 | Kozisek |
| 8,255,515 B1 | 8/2012 | Melman et al. |
| 8,255,534 B2 | 8/2012 | Assadzadeh |

(56) References Cited

U.S. PATENT DOCUMENTS

| | | |
|---|---|---|
| 8,255,669 B2 | 8/2012 | Kim et al. |
| 8,259,692 B2 | 9/2012 | Bajko |
| 8,260,252 B2 | 9/2012 | Agarwal |
| 8,264,965 B2 | 9/2012 | Dolganow et al. |
| 8,265,004 B2 | 9/2012 | Toutonghi |
| 8,266,249 B2 | 9/2012 | Hu |
| 8,266,681 B2 | 9/2012 | Deshpande et al. |
| 8,270,955 B2 | 9/2012 | Ramer et al. |
| 8,270,972 B2 | 9/2012 | Otting et al. |
| 8,271,025 B2 | 9/2012 | Brisebois et al. |
| 8,271,045 B2 | 9/2012 | Parolkar et al. |
| 8,271,049 B2 | 9/2012 | Silver et al. |
| 8,271,992 B2 | 9/2012 | Chatley et al. |
| 8,275,415 B2 | 9/2012 | Huslak |
| 8,275,830 B2 | 9/2012 | Raleigh |
| 8,279,067 B2 | 10/2012 | Berger et al. |
| 8,279,864 B2 | 10/2012 | Wood |
| 8,280,354 B2 | 10/2012 | Smith et al. |
| 8,284,740 B2 | 10/2012 | O'Connor |
| 8,285,249 B2 | 10/2012 | Baker et al. |
| 8,285,992 B2 | 10/2012 | Mathur et al. |
| 8,290,820 B2 | 10/2012 | Plastina et al. |
| 8,291,238 B2 | 10/2012 | Ginter et al. |
| 8,291,439 B2 | 10/2012 | Jethi et al. |
| 8,296,404 B2 | 10/2012 | McDysan et al. |
| 8,300,575 B2 | 10/2012 | Willars |
| 8,306,518 B1 | 11/2012 | Gailloux |
| 8,306,741 B2 | 11/2012 | Tu |
| 8,307,067 B2 | 11/2012 | Ryan |
| 8,310,943 B2 | 11/2012 | Mehta et al. |
| 8,315,198 B2 | 11/2012 | Corneille et al. |
| 8,315,593 B2 | 11/2012 | Gallant et al. |
| 8,315,594 B1 | 11/2012 | Mauser et al. |
| 8,315,718 B2 | 11/2012 | Caffrey et al. |
| 8,315,999 B2 | 11/2012 | Chatley et al. |
| 8,320,244 B2 | 11/2012 | Muqattash et al. |
| 8,320,949 B2 | 11/2012 | Matta |
| 8,325,638 B2 | 12/2012 | Jin et al. |
| 8,325,906 B2 | 12/2012 | Fullarton et al. |
| 8,326,319 B2 | 12/2012 | Davis |
| 8,326,828 B2 | 12/2012 | Zhou et al. |
| 8,331,223 B2 | 12/2012 | Hill et al. |
| 8,331,293 B2 | 12/2012 | Sood |
| 8,332,375 B2 | 12/2012 | Chatley et al. |
| 8,339,991 B2 | 12/2012 | Biswas et al. |
| 8,340,625 B1 | 12/2012 | Johnson et al. |
| 8,340,628 B2 | 12/2012 | Taylor et al. |
| 8,340,678 B1 | 12/2012 | Pandey |
| 8,340,718 B2 | 12/2012 | Colonna et al. |
| 8,346,210 B2 | 1/2013 | Balsan et al. |
| 8,346,225 B2 | 1/2013 | Raleigh |
| 8,346,923 B2 | 1/2013 | Rowles et al. |
| 8,347,104 B2 | 1/2013 | Pathiyal |
| 8,347,362 B2 | 1/2013 | Cai et al. |
| 8,347,378 B2 | 1/2013 | Merkin et al. |
| 8,350,700 B2 | 1/2013 | Fast et al. |
| 8,351,592 B2 | 1/2013 | Freeny, Jr. et al. |
| 8,351,898 B2 | 1/2013 | Raleigh |
| 8,352,360 B2 | 1/2013 | De Judicibus et al. |
| 8,352,980 B2 | 1/2013 | Howcroft |
| 8,353,001 B2 | 1/2013 | Herrod |
| 8,355,570 B2 | 1/2013 | Karsanbhai et al. |
| 8,355,696 B1 | 1/2013 | Olding et al. |
| 8,356,336 B2 | 1/2013 | Johnston et al. |
| 8,358,638 B2 | 1/2013 | Scherzer et al. |
| 8,358,975 B2 | 1/2013 | Bahl et al. |
| 8,363,658 B1 | 1/2013 | Delker et al. |
| 8,363,799 B2 | 1/2013 | Gruchala et al. |
| 8,364,089 B2 | 1/2013 | Phillips |
| 8,364,806 B2 | 1/2013 | Short et al. |
| 8,369,274 B2 | 2/2013 | Sawai |
| 8,370,477 B2 | 2/2013 | Short et al. |
| 8,370,483 B2 | 2/2013 | Choong et al. |
| 8,374,090 B2 | 2/2013 | Morrill et al. |
| 8,374,592 B2 | 2/2013 | Proctor, Jr. et al. |
| 8,375,128 B2 | 2/2013 | Tofighbakhsh et al. |
| 8,375,136 B2 | 2/2013 | Roman et al. |
| 8,380,247 B2 | 2/2013 | Engstrom |
| 8,385,199 B1 | 2/2013 | Coward et al. |
| 8,385,896 B2 | 2/2013 | Proctor, Jr. et al. |
| 8,385,964 B2 | 2/2013 | Haney |
| 8,385,975 B2 | 2/2013 | Forutanpour et al. |
| 8,386,386 B1 | 2/2013 | Zhu |
| 8,391,262 B2 | 3/2013 | Maki et al. |
| 8,391,834 B2 * | 3/2013 | Raleigh ............... H04L 41/5054 455/414.1 |
| 8,392,982 B2 | 3/2013 | Harris et al. |
| 8,396,458 B2 | 3/2013 | Raleigh |
| 8,396,929 B2 | 3/2013 | Helfman et al. |
| 8,401,968 B1 | 3/2013 | Schattauer et al. |
| 8,402,111 B2 * | 3/2013 | Raleigh ................. H04L 67/34 709/224 |
| 8,402,165 B2 | 3/2013 | Deu-Ngoc et al. |
| 8,402,540 B2 | 3/2013 | Kapoor et al. |
| 8,406,427 B2 | 3/2013 | Chand et al. |
| 8,406,736 B2 | 3/2013 | Das et al. |
| 8,407,763 B2 | 3/2013 | Weller et al. |
| 8,411,587 B2 | 4/2013 | Curtis et al. |
| 8,411,691 B2 | 4/2013 | Aggarwal |
| 8,412,798 B1 | 4/2013 | Wang |
| 8,413,245 B2 | 4/2013 | Kraemer et al. |
| 8,418,168 B2 | 4/2013 | Tyhurst et al. |
| 8,422,988 B1 | 4/2013 | Keshav |
| 8,423,016 B2 | 4/2013 | Buckley et al. |
| 8,429,403 B2 | 4/2013 | Moret et al. |
| 8,437,734 B2 | 5/2013 | Ray et al. |
| 8,442,015 B2 | 5/2013 | Behzad et al. |
| 8,446,831 B2 | 5/2013 | Kwan et al. |
| 8,447,324 B2 | 5/2013 | Shuman et al. |
| 8,447,607 B2 | 5/2013 | Weider et al. |
| 8,447,980 B2 | 5/2013 | Godfrey et al. |
| 8,448,015 B2 | 5/2013 | Gerhart |
| 8,452,858 B2 | 5/2013 | Wu et al. |
| 8,457,603 B2 | 6/2013 | El-Kadri et al. |
| 8,461,958 B2 | 6/2013 | Saenz et al. |
| 8,463,194 B2 | 6/2013 | Erlenback et al. |
| 8,463,232 B2 | 6/2013 | Tuli et al. |
| 8,468,337 B2 | 6/2013 | Gaur et al. |
| 8,472,371 B1 | 6/2013 | Bari et al. |
| 8,477,778 B2 | 7/2013 | Lehmann, Jr. et al. |
| 8,478,840 B2 | 7/2013 | Skutela et al. |
| 8,483,057 B2 | 7/2013 | Cuervo |
| 8,483,135 B2 | 7/2013 | Cai et al. |
| 8,483,694 B2 | 7/2013 | Lewis et al. |
| 8,484,327 B2 | 7/2013 | Werner et al. |
| 8,488,597 B2 | 7/2013 | Nie et al. |
| 8,489,110 B2 | 7/2013 | Frank et al. |
| 8,489,720 B1 | 7/2013 | Morford et al. |
| 8,494,559 B1 | 7/2013 | Malmi |
| 8,495,181 B2 | 7/2013 | Venkatraman et al. |
| 8,495,207 B2 | 7/2013 | Lee |
| 8,495,227 B2 | 7/2013 | Kaminsky et al. |
| 8,495,360 B2 | 7/2013 | Falk et al. |
| 8,495,700 B2 | 7/2013 | Shahbazi |
| 8,495,743 B2 | 7/2013 | Kraemer et al. |
| 8,499,087 B2 | 7/2013 | Hu |
| RE44,412 E | 8/2013 | Naqvi et al. |
| 8,500,533 B2 | 8/2013 | Lutnick et al. |
| 8,503,358 B2 | 8/2013 | Hanson et al. |
| 8,503,455 B2 | 8/2013 | Heikens |
| 8,504,032 B2 | 8/2013 | Lott et al. |
| 8,504,574 B2 | 8/2013 | Dvorak et al. |
| 8,504,687 B2 | 8/2013 | Maffione et al. |
| 8,504,690 B2 | 8/2013 | Shah et al. |
| 8,504,729 B2 | 8/2013 | Pezzutti |
| 8,505,073 B2 | 8/2013 | Taglienti et al. |
| 8,509,082 B2 | 8/2013 | Heinz et al. |
| 8,514,927 B2 | 8/2013 | Sundararajan et al. |
| 8,516,552 B2 | 8/2013 | Raleigh |
| 8,520,589 B2 | 8/2013 | Bhatt et al. |
| 8,520,595 B2 | 8/2013 | Yadav et al. |
| 8,521,110 B2 | 8/2013 | Rofougaran |
| 8,521,775 B1 | 8/2013 | Poh et al. |
| 8,522,039 B2 | 8/2013 | Hyndman et al. |

(56) References Cited

U.S. PATENT DOCUMENTS

| | | |
|---|---|---|
| 8,522,249 B2 | 8/2013 | Beaule |
| 8,522,337 B2 | 8/2013 | Adusumilli et al. |
| 8,523,547 B2 | 9/2013 | Pekrul |
| 8,526,329 B2 | 9/2013 | Mahany et al. |
| 8,526,350 B2 | 9/2013 | Xue et al. |
| 8,527,013 B2 | 9/2013 | Guba et al. |
| 8,527,410 B2 | 9/2013 | Markki et al. |
| 8,527,662 B2 | 9/2013 | Biswas et al. |
| 8,528,068 B1 | 9/2013 | Weglein et al. |
| 8,531,954 B2 | 9/2013 | McNaughton et al. |
| 8,531,995 B2 | 9/2013 | Khan et al. |
| 8,532,610 B2 | 9/2013 | Manning Cassett et al. |
| 8,533,775 B2 | 9/2013 | Alcorn et al. |
| 8,535,160 B2 | 9/2013 | Lutnick et al. |
| 8,538,394 B2 | 9/2013 | Zimmerman et al. |
| 8,538,421 B2 | 9/2013 | Brisebois et al. |
| 8,538,458 B2 | 9/2013 | Haney |
| 8,539,544 B2 | 9/2013 | Garimella et al. |
| 8,543,265 B2 | 9/2013 | Ekhaguere et al. |
| 8,543,814 B2 | 9/2013 | Laitinen et al. |
| 8,544,105 B2 | 9/2013 | Mclean et al. |
| 8,548,427 B2 | 10/2013 | Chow et al. |
| 8,549,173 B1 | 10/2013 | Wu et al. |
| 8,554,876 B2 | 10/2013 | Winsor |
| 8,559,369 B2 | 10/2013 | Barkan |
| 8,561,138 B2 | 10/2013 | Rothman et al. |
| 8,565,746 B2 | 10/2013 | Hoffman |
| 8,566,236 B2 | 10/2013 | Busch |
| 8,571,474 B2 | 10/2013 | Chavez et al. |
| 8,571,501 B2 | 10/2013 | Miller et al. |
| 8,571,598 B2 | 10/2013 | Valavi |
| 8,571,993 B2 | 10/2013 | Kocher et al. |
| 8,572,117 B2 | 10/2013 | Rappaport |
| 8,572,256 B2 | 10/2013 | Babbar |
| 8,583,499 B2 | 11/2013 | De Judicibus et al. |
| 8,588,240 B2 | 11/2013 | Ramankutty et al. |
| 8,589,955 B2 | 11/2013 | Roundtree et al. |
| 8,594,665 B2 | 11/2013 | Anschutz |
| 8,595,186 B1 | 11/2013 | Mandyam et al. |
| 8,600,895 B2 | 12/2013 | Felsher |
| 8,601,125 B2 | 12/2013 | Huang et al. |
| 8,605,691 B2 | 12/2013 | Soomro et al. |
| 8,612,967 B1 * | 12/2013 | Delker .................. G06F 8/61 717/169 |
| 8,615,507 B2 | 12/2013 | Varadarajulu et al. |
| 8,619,735 B2 | 12/2013 | Montemurro et al. |
| 8,620,257 B2 | 12/2013 | Qiu et al. |
| 8,630,630 B2 | 1/2014 | Raleigh |
| 8,630,925 B2 | 1/2014 | Bystrom et al. |
| 8,631,428 B2 | 1/2014 | Scott et al. |
| 8,634,425 B2 | 1/2014 | Gorti et al. |
| 8,635,164 B2 | 1/2014 | Rosenhaft et al. |
| 8,639,215 B2 | 1/2014 | McGregor et al. |
| 8,644,702 B1 | 2/2014 | Kalajan |
| 8,644,813 B1 | 2/2014 | Gailloux et al. |
| 8,645,518 B2 | 2/2014 | David |
| 8,655,357 B1 | 2/2014 | Gazzard et al. |
| 8,656,472 B2 | 2/2014 | McMurtry et al. |
| 8,660,853 B2 | 2/2014 | Robb et al. |
| 8,666,395 B2 | 3/2014 | Silver |
| 8,667,542 B1 | 3/2014 | Bertz et al. |
| 8,670,334 B2 | 3/2014 | Keohane et al. |
| 8,675,852 B2 | 3/2014 | Maes |
| 8,676,682 B2 | 3/2014 | Kalliola |
| 8,676,925 B1 | 3/2014 | Liu et al. |
| 8,693,323 B1 | 4/2014 | McDysan |
| 8,694,772 B2 | 4/2014 | Kao et al. |
| 8,700,729 B2 | 4/2014 | Dua |
| 8,701,015 B2 | 4/2014 | Bonnat |
| 8,705,361 B2 | 4/2014 | Venkataraman et al. |
| 8,706,863 B2 | 4/2014 | Fadell |
| 8,713,535 B2 | 4/2014 | Malhotra et al. |
| 8,713,641 B1 | 4/2014 | Pagan et al. |
| 8,719,397 B2 | 5/2014 | Levi et al. |
| 8,719,423 B2 | 5/2014 | Wyld |
| 8,724,486 B2 | 5/2014 | Seto et al. |
| 8,725,899 B2 | 5/2014 | Short et al. |
| 8,730,842 B2 | 5/2014 | Collins et al. |
| 8,731,519 B2 | 5/2014 | Flynn et al. |
| 8,732,808 B2 | 5/2014 | Sewall et al. |
| 8,739,035 B2 | 5/2014 | Trethewey |
| 8,744,339 B2 | 6/2014 | Halfmann et al. |
| 8,761,711 B2 | 6/2014 | Grignani et al. |
| 8,780,857 B2 | 7/2014 | Balasubramanian et al. |
| 8,787,249 B2 | 7/2014 | Giaretta et al. |
| 8,792,857 B2 | 7/2014 | Cai et al. |
| 8,793,304 B2 | 7/2014 | Lu et al. |
| 8,798,610 B2 | 8/2014 | Prakash et al. |
| 8,799,440 B2 | 8/2014 | Zhou et al. |
| 8,804,695 B2 | 8/2014 | Branam |
| 8,811,338 B2 | 8/2014 | Jin et al. |
| 8,811,991 B2 | 8/2014 | Jain et al. |
| 8,818,394 B2 | 8/2014 | Bienas et al. |
| 8,819,253 B2 | 8/2014 | Simeloff et al. |
| 8,825,109 B2 | 9/2014 | Montemurro et al. |
| 8,826,411 B2 | 9/2014 | Moen et al. |
| 8,831,561 B2 | 9/2014 | Sutaria et al. |
| 8,838,752 B2 | 9/2014 | Lor et al. |
| 8,843,849 B2 | 9/2014 | Neil et al. |
| 8,845,415 B2 | 9/2014 | Lutnick et al. |
| 8,849,297 B2 | 9/2014 | Balasubramanian |
| 8,855,620 B2 | 10/2014 | Sievers et al. |
| 8,862,751 B2 | 10/2014 | Faccin et al. |
| 8,863,111 B2 | 10/2014 | Selitser et al. |
| 8,875,042 B2 | 10/2014 | LeJeune et al. |
| 8,880,047 B2 | 11/2014 | Konicek et al. |
| 8,891,483 B2 | 11/2014 | Connelly et al. |
| 8,898,748 B2 | 11/2014 | Burks et al. |
| 8,908,516 B2 | 12/2014 | Tzamaloukas et al. |
| 8,923,824 B1 | 12/2014 | Masterman |
| 8,929,374 B2 | 1/2015 | Tönsing et al. |
| 8,930,238 B2 | 1/2015 | Coffman et al. |
| 8,930,551 B2 | 1/2015 | Pandya et al. |
| 8,943,551 B2 | 1/2015 | Ganapathy et al. |
| 8,948,726 B2 | 2/2015 | Smith et al. |
| 8,949,382 B2 | 2/2015 | Cornett et al. |
| 8,949,597 B1 | 2/2015 | Reeves et al. |
| 8,955,038 B2 | 2/2015 | Nicodemus et al. |
| 8,966,018 B2 | 2/2015 | Bugwadia et al. |
| 8,971,912 B2 | 3/2015 | Chou et al. |
| 8,977,284 B2 | 3/2015 | Reed |
| 8,995,952 B1 | 3/2015 | Baker et al. |
| 9,002,342 B2 | 4/2015 | Tenhunen et al. |
| 9,014,973 B2 | 4/2015 | Ruckart |
| 9,015,331 B2 | 4/2015 | Lai et al. |
| 9,026,100 B2 | 5/2015 | Castro et al. |
| 9,030,934 B2 | 5/2015 | Shah et al. |
| 9,049,010 B2 | 6/2015 | Jueneman et al. |
| 9,064,275 B1 | 6/2015 | Lu et al. |
| 9,105,031 B2 | 8/2015 | Shen et al. |
| 9,111,088 B2 | 8/2015 | Ghai et al. |
| 9,137,286 B1 | 9/2015 | Yuan |
| 9,172,553 B2 | 10/2015 | Dawes et al. |
| 9,177,455 B2 | 11/2015 | Remer |
| 9,191,394 B2 | 11/2015 | Novak et al. |
| 9,204,282 B2 | 12/2015 | Raleigh |
| 9,282,460 B2 | 3/2016 | Souissi |
| 9,286,469 B2 | 3/2016 | Kraemer et al. |
| 9,286,604 B2 | 3/2016 | Aabye et al. |
| 9,313,708 B2 | 4/2016 | Nam et al. |
| 9,325,737 B2 | 4/2016 | Gutowski et al. |
| 9,326,173 B2 | 4/2016 | Luft |
| 9,344,557 B2 | 5/2016 | Gruchala et al. |
| 9,363,285 B2 | 6/2016 | Kitamura |
| 9,367,680 B2 | 6/2016 | Mahaffey et al. |
| 9,413,546 B2 | 8/2016 | Meier et al. |
| 9,418,381 B2 | 8/2016 | Ahuja et al. |
| 9,459,767 B2 | 10/2016 | Cockcroft et al. |
| 9,501,803 B2 | 11/2016 | Bilac et al. |
| 9,544,397 B2 | 1/2017 | Raleigh et al. |
| 9,589,117 B2 | 3/2017 | Ali et al. |
| 9,609,459 B2 | 3/2017 | Raleigh |
| 9,712,476 B2 | 7/2017 | Boynton et al. |
| 9,942,796 B2 | 4/2018 | Raleigh |

(56) References Cited

U.S. PATENT DOCUMENTS

| | | | |
|---|---|---|---|
| 9,986,413 | B2 | 5/2018 | Raleigh |
| 10,021,251 | B2 | 7/2018 | Aaron et al. |
| 10,285,025 | B1 | 5/2019 | Baker et al. |
| 10,326,800 | B2 | 6/2019 | Raleigh et al. |
| 10,492,102 | B2 | 11/2019 | Raleigh et al. |
| 10,582,375 | B2* | 3/2020 | Raleigh ............... H04L 41/082 |
| 10,694,385 | B2* | 6/2020 | Raleigh ............ G06Q 10/06375 |
| 10,779,177 | B2 | 9/2020 | Raleigh |
| 10,855,559 | B2* | 12/2020 | Raleigh ............... H04L 47/824 |
| 11,337,059 | B2* | 5/2022 | Raleigh ............... H04M 15/61 |
| 2001/0048738 | A1 | 12/2001 | Baniak et al. |
| 2001/0053694 | A1 | 12/2001 | Igarashi et al. |
| 2002/0013844 | A1 | 1/2002 | Garrett et al. |
| 2002/0022472 | A1 | 2/2002 | Watler et al. |
| 2002/0022483 | A1 | 2/2002 | Thompson et al. |
| 2002/0049074 | A1 | 4/2002 | Eisinger et al. |
| 2002/0099848 | A1 | 7/2002 | Lee |
| 2002/0116338 | A1 | 8/2002 | Gonthier et al. |
| 2002/0120370 | A1 | 8/2002 | Parupudi et al. |
| 2002/0120540 | A1 | 8/2002 | Kende et al. |
| 2002/0131404 | A1 | 9/2002 | Mehta et al. |
| 2002/0138599 | A1 | 9/2002 | Dilman et al. |
| 2002/0138601 | A1 | 9/2002 | Piponius et al. |
| 2002/0154751 | A1 | 10/2002 | Thompson et al. |
| 2002/0161601 | A1 | 10/2002 | Nauer et al. |
| 2002/0164983 | A1 | 11/2002 | Raviv et al. |
| 2002/0176377 | A1 | 11/2002 | Hamilton |
| 2002/0188732 | A1 | 12/2002 | Buckman et al. |
| 2002/0191573 | A1 | 12/2002 | Whitehill et al. |
| 2002/0199001 | A1 | 12/2002 | Wenocur et al. |
| 2003/0004937 | A1 | 1/2003 | Salmenkaita et al. |
| 2003/0005112 | A1 | 1/2003 | Krautkremer |
| 2003/0013434 | A1 | 1/2003 | Rosenberg et al. |
| 2003/0018524 | A1 | 1/2003 | Fishman et al. |
| 2003/0028623 | A1 | 2/2003 | Hennessey et al. |
| 2003/0046396 | A1 | 3/2003 | Richter et al. |
| 2003/0050070 | A1 | 3/2003 | Mashinsky et al. |
| 2003/0050837 | A1 | 3/2003 | Kim |
| 2003/0084321 | A1 | 5/2003 | Tarquini et al. |
| 2003/0088671 | A1 | 5/2003 | Klinker et al. |
| 2003/0133408 | A1 | 7/2003 | Cheng et al. |
| 2003/0134650 | A1 | 7/2003 | Sundar et al. |
| 2003/0159030 | A1 | 8/2003 | Evans |
| 2003/0161265 | A1 | 8/2003 | Cao et al. |
| 2003/0171112 | A1 | 9/2003 | Lupper et al. |
| 2003/0182420 | A1 | 9/2003 | Jones et al. |
| 2003/0182435 | A1 | 9/2003 | Redlich et al. |
| 2003/0184793 | A1 | 10/2003 | Pineau |
| 2003/0188006 | A1 | 10/2003 | Bard |
| 2003/0188117 | A1 | 10/2003 | Yoshino et al. |
| 2003/0220984 | A1 | 11/2003 | Jones et al. |
| 2003/0224781 | A1 | 12/2003 | Milford et al. |
| 2003/0229900 | A1 | 12/2003 | Reisman |
| 2003/0233332 | A1 | 12/2003 | Keeler et al. |
| 2003/0236745 | A1 | 12/2003 | Hartsell et al. |
| 2004/0019539 | A1 | 1/2004 | Raman et al. |
| 2004/0019564 | A1 | 1/2004 | Goldthwaite et al. |
| 2004/0021697 | A1 | 2/2004 | Beaton et al. |
| 2004/0024756 | A1 | 2/2004 | Rickard |
| 2004/0030705 | A1 | 2/2004 | Bowman-Amuah |
| 2004/0039792 | A1 | 2/2004 | Nakanishi |
| 2004/0044623 | A1 | 3/2004 | Wake et al. |
| 2004/0047358 | A1 | 3/2004 | Chen et al. |
| 2004/0054779 | A1 | 3/2004 | Takeshima et al. |
| 2004/0073672 | A1 | 4/2004 | Fascenda |
| 2004/0082346 | A1 | 4/2004 | Skytt et al. |
| 2004/0098715 | A1 | 5/2004 | Aghera et al. |
| 2004/0102182 | A1 | 5/2004 | Reith et al. |
| 2004/0103193 | A1 | 5/2004 | Pandya et al. |
| 2004/0107360 | A1 | 6/2004 | Herrmann et al. |
| 2004/0116140 | A1 | 6/2004 | Babbar et al. |
| 2004/0123153 | A1 | 6/2004 | Wright et al. |
| 2004/0127200 | A1 | 7/2004 | Shaw et al. |
| 2004/0127208 | A1 | 7/2004 | Nair et al. |
| 2004/0127256 | A1 | 7/2004 | Goldthwaite et al. |
| 2004/0132427 | A1 | 7/2004 | Lee et al. |
| 2004/0133668 | A1 | 7/2004 | Nicholas, III |
| 2004/0137890 | A1 | 7/2004 | Kalke |
| 2004/0148237 | A1 | 7/2004 | Bittmann et al. |
| 2004/0165596 | A1 | 8/2004 | Garcia et al. |
| 2004/0167958 | A1 | 8/2004 | Stewart et al. |
| 2004/0168052 | A1 | 8/2004 | Clisham et al. |
| 2004/0170191 | A1 | 9/2004 | Guo et al. |
| 2004/0176104 | A1 | 9/2004 | Arcens |
| 2004/0198331 | A1 | 10/2004 | Coward et al. |
| 2004/0203755 | A1 | 10/2004 | Brunet et al. |
| 2004/0203833 | A1 | 10/2004 | Rathunde et al. |
| 2004/0225561 | A1 | 11/2004 | Hertzberg et al. |
| 2004/0225898 | A1 | 11/2004 | Frost et al. |
| 2004/0236547 | A1 | 11/2004 | Rappaport et al. |
| 2004/0243680 | A1 | 12/2004 | Mayer |
| 2004/0243992 | A1 | 12/2004 | Gustafson et al. |
| 2004/0249918 | A1 | 12/2004 | Sunshine |
| 2004/0255145 | A1 | 12/2004 | Chow |
| 2004/0259534 | A1 | 12/2004 | Chaudhari et al. |
| 2004/0260766 | A1 | 12/2004 | Barros et al. |
| 2004/0267872 | A1 | 12/2004 | Serdy et al. |
| 2005/0007993 | A1 | 1/2005 | Chambers et al. |
| 2005/0009499 | A1 | 1/2005 | Koster |
| 2005/0021995 | A1 | 1/2005 | Lal et al. |
| 2005/0041617 | A1 | 2/2005 | Huotari et al. |
| 2005/0048950 | A1 | 3/2005 | Morper |
| 2005/0055291 | A1 | 3/2005 | Bevente et al. |
| 2005/0055309 | A1 | 3/2005 | Williams et al. |
| 2005/0055595 | A1 | 3/2005 | Frazer et al. |
| 2005/0060266 | A1 | 3/2005 | Demello et al. |
| 2005/0060525 | A1 | 3/2005 | Schwartz et al. |
| 2005/0075115 | A1 | 4/2005 | Corneille et al. |
| 2005/0079863 | A1 | 4/2005 | Macaluso |
| 2005/0091505 | A1 | 4/2005 | Riley et al. |
| 2005/0096024 | A1 | 5/2005 | Bicker et al. |
| 2005/0097516 | A1 | 5/2005 | Donnelly et al. |
| 2005/0101323 | A1 | 5/2005 | De Beer |
| 2005/0107091 | A1 | 5/2005 | Vannithamby et al. |
| 2005/0108075 | A1 | 5/2005 | Douglis et al. |
| 2005/0108534 | A1 | 5/2005 | Bajikar et al. |
| 2005/0111463 | A1 | 5/2005 | Leung et al. |
| 2005/0128967 | A1 | 6/2005 | Scobbie |
| 2005/0135264 | A1 | 6/2005 | Popoff et al. |
| 2005/0163320 | A1 | 7/2005 | Brown et al. |
| 2005/0166043 | A1 | 7/2005 | Zhang et al. |
| 2005/0183143 | A1 | 8/2005 | Anderholm et al. |
| 2005/0186948 | A1 | 8/2005 | Gallagher et al. |
| 2005/0198377 | A1 | 9/2005 | Ferguson et al. |
| 2005/0216421 | A1 | 9/2005 | Barry et al. |
| 2005/0228985 | A1 | 10/2005 | Ylikoski et al. |
| 2005/0238046 | A1 | 10/2005 | Hassan et al. |
| 2005/0239447 | A1 | 10/2005 | Holzman et al. |
| 2005/0245241 | A1 | 11/2005 | Durand et al. |
| 2005/0246282 | A1 | 11/2005 | Naslund et al. |
| 2005/0250508 | A1 | 11/2005 | Guo et al. |
| 2005/0250536 | A1 | 11/2005 | Deng et al. |
| 2005/0254435 | A1 | 11/2005 | Moakley et al. |
| 2005/0266825 | A1 | 12/2005 | Clayton |
| 2005/0266880 | A1 | 12/2005 | Gupta |
| 2006/0014519 | A1 | 1/2006 | Marsh et al. |
| 2006/0015749 | A1 | 1/2006 | Mittal |
| 2006/0019632 | A1 | 1/2006 | Cunningham et al. |
| 2006/0020781 | A1 | 1/2006 | Scarlata et al. |
| 2006/0020787 | A1 | 1/2006 | Choyi et al. |
| 2006/0026679 | A1 | 2/2006 | Zakas |
| 2006/0030306 | A1 | 2/2006 | Kuhn |
| 2006/0034256 | A1 | 2/2006 | Addagatla et al. |
| 2006/0035631 | A1 | 2/2006 | White et al. |
| 2006/0040642 | A1 | 2/2006 | Boris et al. |
| 2006/0045245 | A1 | 3/2006 | Aaron et al. |
| 2006/0048223 | A1 | 3/2006 | Lee et al. |
| 2006/0068796 | A1 | 3/2006 | Millen et al. |
| 2006/0072451 | A1 | 4/2006 | Ross |
| 2006/0072550 | A1 | 4/2006 | Davis et al. |
| 2006/0072646 | A1 | 4/2006 | Feher |
| 2006/0075506 | A1 | 4/2006 | Sanda et al. |
| 2006/0085543 | A1 | 4/2006 | Hrastar et al. |
| 2006/0093107 | A1 | 5/2006 | Chien |

(56) References Cited

U.S. PATENT DOCUMENTS

| | | |
|---|---|---|
| 2006/0095517 A1 | 5/2006 | O'Connor et al. |
| 2006/0098627 A1 | 5/2006 | Karaoguz et al. |
| 2006/0099970 A1 | 5/2006 | Morgan et al. |
| 2006/0101507 A1 | 5/2006 | Camenisch |
| 2006/0112016 A1 | 5/2006 | Ishibashi |
| 2006/0112427 A1 | 5/2006 | Shahbazi |
| 2006/0114821 A1 | 6/2006 | Willey et al. |
| 2006/0114832 A1 | 6/2006 | Hamilton et al. |
| 2006/0126562 A1 | 6/2006 | Liu |
| 2006/0135144 A1 | 6/2006 | Jothipragasam |
| 2006/0136882 A1 | 6/2006 | Noonan et al. |
| 2006/0143066 A1 | 6/2006 | Calabria |
| 2006/0143098 A1 | 6/2006 | Lazaridis |
| 2006/0156398 A1 | 7/2006 | Ross et al. |
| 2006/0160536 A1 | 7/2006 | Chou |
| 2006/0165060 A1 | 7/2006 | Dua |
| 2006/0168128 A1 | 7/2006 | Sistla et al. |
| 2006/0173959 A1 | 8/2006 | Mckelvie et al. |
| 2006/0174035 A1 | 8/2006 | Tufail |
| 2006/0178917 A1 | 8/2006 | Merriam et al. |
| 2006/0178918 A1 | 8/2006 | Mikurak |
| 2006/0182137 A1 | 8/2006 | Zhou et al. |
| 2006/0183461 A1 | 8/2006 | Pearce |
| 2006/0183462 A1 | 8/2006 | Kolehmainen |
| 2006/0190314 A1 | 8/2006 | Hernandez |
| 2006/0190987 A1 | 8/2006 | Ohta et al. |
| 2006/0193280 A1 | 8/2006 | Lee et al. |
| 2006/0199608 A1 | 9/2006 | Dunn et al. |
| 2006/0200663 A1 | 9/2006 | Thornton |
| 2006/0206709 A1 | 9/2006 | Labrou et al. |
| 2006/0206904 A1 | 9/2006 | Watkins et al. |
| 2006/0218395 A1 | 9/2006 | Maes |
| 2006/0233108 A1 | 10/2006 | Krishnan |
| 2006/0233166 A1 | 10/2006 | Bou-Diab et al. |
| 2006/0236095 A1 | 10/2006 | Smith et al. |
| 2006/0242685 A1 | 10/2006 | Heard et al. |
| 2006/0258289 A1 | 11/2006 | Dua |
| 2006/0258341 A1 | 11/2006 | Miller et al. |
| 2006/0274706 A1 | 12/2006 | Chen et al. |
| 2006/0277590 A1 | 12/2006 | Limont et al. |
| 2006/0286977 A1* | 12/2006 | Khandelwal .......... H04W 12/02 455/435.2 |
| 2006/0291419 A1 | 12/2006 | McConnell et al. |
| 2006/0291477 A1 | 12/2006 | Croak et al. |
| 2007/0005795 A1 | 1/2007 | Gonzalez |
| 2007/0006289 A1 | 1/2007 | Limont et al. |
| 2007/0019670 A1 | 1/2007 | Falardeau |
| 2007/0022289 A1 | 1/2007 | Alt et al. |
| 2007/0025301 A1 | 2/2007 | Petersson et al. |
| 2007/0033194 A1 | 2/2007 | Srinivas et al. |
| 2007/0033197 A1 | 2/2007 | Scherzer et al. |
| 2007/0035390 A1 | 2/2007 | Thomas et al. |
| 2007/0036312 A1 | 2/2007 | Cai et al. |
| 2007/0055694 A1 | 3/2007 | Ruge et al. |
| 2007/0060200 A1 | 3/2007 | Boris et al. |
| 2007/0061243 A1 | 3/2007 | Ramer et al. |
| 2007/0061535 A1 | 3/2007 | Xu et al. |
| 2007/0061800 A1 | 3/2007 | Cheng et al. |
| 2007/0061878 A1 | 3/2007 | Hagiu et al. |
| 2007/0073899 A1 | 3/2007 | Judge et al. |
| 2007/0076616 A1 | 4/2007 | Ngo et al. |
| 2007/0093243 A1 | 4/2007 | Kapadekar et al. |
| 2007/0100981 A1 | 5/2007 | Adamczyk et al. |
| 2007/0101426 A1 | 5/2007 | Lee et al. |
| 2007/0104126 A1 | 5/2007 | Calhoun et al. |
| 2007/0104169 A1* | 5/2007 | Polson .................. H04W 28/24 370/338 |
| 2007/0109983 A1 | 5/2007 | Shankar et al. |
| 2007/0111740 A1 | 5/2007 | Wandel |
| 2007/0117538 A1 | 5/2007 | Weiser et al. |
| 2007/0130283 A1 | 6/2007 | Klein et al. |
| 2007/0130315 A1 | 6/2007 | Friend et al. |
| 2007/0140113 A1 | 6/2007 | Gemelos |
| 2007/0140145 A1 | 6/2007 | Kumar et al. |
| 2007/0140275 A1 | 6/2007 | Bowman et al. |
| 2007/0143824 A1 | 6/2007 | Shahbazi |
| 2007/0147317 A1 | 6/2007 | Smith et al. |
| 2007/0147324 A1 | 6/2007 | McGary |
| 2007/0149252 A1 | 6/2007 | Jobs et al. |
| 2007/0155365 A1 | 7/2007 | Kim et al. |
| 2007/0165630 A1 | 7/2007 | Rasanen et al. |
| 2007/0168499 A1 | 7/2007 | Chu |
| 2007/0171856 A1 | 7/2007 | Bruce et al. |
| 2007/0174490 A1 | 7/2007 | Choi et al. |
| 2007/0178888 A1 | 8/2007 | Alfano et al. |
| 2007/0191006 A1 | 8/2007 | Carpenter |
| 2007/0192460 A1 | 8/2007 | Chol et al. |
| 2007/0198656 A1 | 8/2007 | Mazzaferri et al. |
| 2007/0201502 A1 | 8/2007 | Abramson |
| 2007/0213054 A1 | 9/2007 | Han |
| 2007/0220251 A1 | 9/2007 | Rosenberg et al. |
| 2007/0226225 A1 | 9/2007 | Yiu et al. |
| 2007/0226775 A1 | 9/2007 | Andreasen et al. |
| 2007/0234402 A1 | 10/2007 | Khosravi et al. |
| 2007/0243862 A1 | 10/2007 | Coskun et al. |
| 2007/0248100 A1 | 10/2007 | Zuberi et al. |
| 2007/0254646 A1 | 11/2007 | Sokondar |
| 2007/0254675 A1 | 11/2007 | Zorlu Ozer et al. |
| 2007/0255769 A1 | 11/2007 | Agrawal et al. |
| 2007/0255797 A1 | 11/2007 | Dunn et al. |
| 2007/0255848 A1 | 11/2007 | Sewall et al. |
| 2007/0257767 A1 | 11/2007 | Beeson |
| 2007/0259656 A1 | 11/2007 | Jeong |
| 2007/0259673 A1 | 11/2007 | Willars et al. |
| 2007/0263558 A1 | 11/2007 | Salomone |
| 2007/0266422 A1 | 11/2007 | Germano et al. |
| 2007/0274327 A1 | 11/2007 | Kaarela et al. |
| 2007/0280453 A1 | 12/2007 | Kelley |
| 2007/0282896 A1 | 12/2007 | Wydroug et al. |
| 2007/0288989 A1 | 12/2007 | Aarnos et al. |
| 2007/0293191 A1 | 12/2007 | Mir et al. |
| 2007/0294395 A1 | 12/2007 | Strub et al. |
| 2007/0294410 A1 | 12/2007 | Pandya et al. |
| 2007/0297378 A1 | 12/2007 | Poyhonen et al. |
| 2007/0298764 A1 | 12/2007 | Clayton |
| 2007/0299965 A1 | 12/2007 | Nieh et al. |
| 2007/0300252 A1 | 12/2007 | Acharya et al. |
| 2008/0005285 A1 | 1/2008 | Robinson et al. |
| 2008/0005561 A1 | 1/2008 | Brown et al. |
| 2008/0010379 A1 | 1/2008 | Zhao |
| 2008/0010452 A1 | 1/2008 | Holtzman et al. |
| 2008/0018494 A1 | 1/2008 | Waite et al. |
| 2008/0020738 A1 | 1/2008 | Ho et al. |
| 2008/0022354 A1 | 1/2008 | Grewal et al. |
| 2008/0025230 A1 | 1/2008 | Patel et al. |
| 2008/0032715 A1 | 2/2008 | Jia et al. |
| 2008/0034063 A1 | 2/2008 | Yee |
| 2008/0034419 A1 | 2/2008 | Mullick et al. |
| 2008/0039102 A1 | 2/2008 | Sewall et al. |
| 2008/0049630 A1 | 2/2008 | Kozisek et al. |
| 2008/0050715 A1 | 2/2008 | Golczewski et al. |
| 2008/0051076 A1 | 2/2008 | O'Shaughnessy et al. |
| 2008/0052387 A1 | 2/2008 | Heinz et al. |
| 2008/0056273 A1 | 3/2008 | Pelletier et al. |
| 2008/0059474 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0066181 A1 | 3/2008 | Haveson et al. |
| 2008/0070550 A1 | 3/2008 | Hose |
| 2008/0077705 A1 | 3/2008 | Li et al. |
| 2008/0080457 A1 | 4/2008 | Cole |
| 2008/0081606 A1 | 4/2008 | Cole |
| 2008/0082643 A1 | 4/2008 | Storrie et al. |
| 2008/0083013 A1 | 4/2008 | Soliman et al. |
| 2008/0085707 A1 | 4/2008 | Fadell |
| 2008/0089295 A1 | 4/2008 | Keeler et al. |
| 2008/0089303 A1 | 4/2008 | Wirtanen et al. |
| 2008/0095339 A1 | 4/2008 | Elliott et al. |
| 2008/0096559 A1 | 4/2008 | Phillips et al. |
| 2008/0098062 A1 | 4/2008 | Balia |

(56) References Cited

U.S. PATENT DOCUMENTS

| | | |
|---|---|---|
| 2008/0109679 A1 | 5/2008 | Wright et al. |
| 2008/0117958 A1 | 5/2008 | Pattenden et al. |
| 2008/0120129 A1 | 5/2008 | Seubert et al. |
| 2008/0120174 A1 | 5/2008 | Li |
| 2008/0120668 A1 | 5/2008 | Yau |
| 2008/0120688 A1 | 5/2008 | Qiu et al. |
| 2008/0122796 A1 | 5/2008 | Jobs et al. |
| 2008/0125079 A1 | 5/2008 | O'Neil et al. |
| 2008/0126287 A1 | 5/2008 | Cox et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1 | 6/2008 | Choi-Grogan et al. |
| 2008/0134330 A1 | 6/2008 | Kapoor et al. |
| 2008/0139210 A1 | 6/2008 | Gisby et al. |
| 2008/0147454 A1 | 6/2008 | Walker et al. |
| 2008/0160958 A1 | 7/2008 | Abichandani et al. |
| 2008/0162637 A1 | 7/2008 | Adamczyk et al. |
| 2008/0162704 A1 | 7/2008 | Poplett et al. |
| 2008/0164304 A1 | 7/2008 | Narasimhan et al. |
| 2008/0166993 A1 | 7/2008 | Gautier et al. |
| 2008/0167027 A1 | 7/2008 | Gautier et al. |
| 2008/0167033 A1 | 7/2008 | Beckers |
| 2008/0168275 A1 | 7/2008 | DeAtley et al. |
| 2008/0168523 A1 | 7/2008 | Ansari et al. |
| 2008/0177998 A1 | 7/2008 | Apsangi et al. |
| 2008/0178300 A1 | 7/2008 | Brown et al. |
| 2008/0181117 A1 | 7/2008 | Acke et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |
| 2008/0201266 A1 | 8/2008 | Chua et al. |
| 2008/0207167 A1 | 8/2008 | Bugenhagen |
| 2008/0212470 A1 | 9/2008 | Castaneda et al. |
| 2008/0212751 A1 | 9/2008 | Chung |
| 2008/0219268 A1 | 9/2008 | Dennison |
| 2008/0221951 A1 | 9/2008 | Stanforth et al. |
| 2008/0222692 A1 | 9/2008 | Andersson et al. |
| 2008/0225748 A1 | 9/2008 | Khemani et al. |
| 2008/0229385 A1 | 9/2008 | Feder et al. |
| 2008/0229388 A1 | 9/2008 | Maes |
| 2008/0235511 A1 | 9/2008 | O'Brien et al. |
| 2008/0240373 A1 | 10/2008 | Wilhelm |
| 2008/0244018 A1 | 10/2008 | Chen et al. |
| 2008/0250053 A1 | 10/2008 | Aaltonen et al. |
| 2008/0256593 A1 | 10/2008 | Vinberg et al. |
| 2008/0259924 A1 | 10/2008 | Gooch et al. |
| 2008/0262798 A1 | 10/2008 | Kim et al. |
| 2008/0263348 A1 | 10/2008 | Zaltsman et al. |
| 2008/0268813 A1 | 10/2008 | Maes |
| 2008/0270212 A1 | 10/2008 | Blight et al. |
| 2008/0279216 A1 | 11/2008 | Sharif-Ahmadi et al. |
| 2008/0282319 A1 | 11/2008 | Fontijn et al. |
| 2008/0291872 A1 | 11/2008 | Henriksson |
| 2008/0293395 A1 | 11/2008 | Mathews et al. |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0313315 A1 | 12/2008 | Karaoguz et al. |
| 2008/0313730 A1 | 12/2008 | Iftimie et al. |
| 2008/0316923 A1 | 12/2008 | Fedders et al. |
| 2008/0318547 A1 | 12/2008 | Ballou et al. |
| 2008/0318550 A1 | 12/2008 | DeAtley |
| 2008/0319879 A1 | 12/2008 | Carroll et al. |
| 2008/0320497 A1 | 12/2008 | Tarkoma et al. |
| 2009/0005000 A1 | 1/2009 | Baker et al. |
| 2009/0005005 A1 | 1/2009 | Forstall et al. |
| 2009/0006116 A1 | 1/2009 | Baker et al. |
| 2009/0006200 A1 | 1/2009 | Baker et al. |
| 2009/0006229 A1 | 1/2009 | Sweeney et al. |
| 2009/0013157 A1 | 1/2009 | Beaule |
| 2009/0016310 A1 | 1/2009 | Rasal |
| 2009/0017809 A1 | 1/2009 | Jethi et al. |
| 2009/0036111 A1 | 2/2009 | Danford et al. |
| 2009/0042536 A1 | 2/2009 | Bernard et al. |
| 2009/0044185 A1 | 2/2009 | Krivopaltsev |
| 2009/0046707 A1 | 2/2009 | Smires et al. |
| 2009/0046723 A1 | 2/2009 | Rahman et al. |
| 2009/0047989 A1 | 2/2009 | Harmon et al. |
| 2009/0048913 A1 | 2/2009 | Shenfield et al. |
| 2009/0049156 A1 | 2/2009 | Aronsson et al. |
| 2009/0049518 A1 | 2/2009 | Roman et al. |
| 2009/0054030 A1 | 2/2009 | Golds |
| 2009/0065571 A1 | 3/2009 | Jain |
| 2009/0066999 A1 | 3/2009 | Ito |
| 2009/0067372 A1 | 3/2009 | Shah et al. |
| 2009/0068984 A1 | 3/2009 | Burnett |
| 2009/0070379 A1 | 3/2009 | Rappaport |
| 2009/0077622 A1 | 3/2009 | Baum et al. |
| 2009/0077643 A1 | 3/2009 | Schmidt et al. |
| 2009/0079699 A1 | 3/2009 | Sun |
| 2009/0113514 A1 | 4/2009 | Hu |
| 2009/0125619 A1 | 5/2009 | Antani |
| 2009/0132860 A1 | 5/2009 | Liu et al. |
| 2009/0149154 A1 | 6/2009 | Bhasin et al. |
| 2009/0149165 A1 | 6/2009 | Minborg et al. |
| 2009/0157792 A1 | 6/2009 | Fiatal |
| 2009/0163173 A1 | 6/2009 | Williams |
| 2009/0172077 A1 | 7/2009 | Roxburgh et al. |
| 2009/0180391 A1 | 7/2009 | Petersen et al. |
| 2009/0181662 A1 | 7/2009 | Fleischman et al. |
| 2009/0197585 A1 | 8/2009 | Aaron |
| 2009/0197612 A1 | 8/2009 | Kiiskinen |
| 2009/0203352 A1 | 8/2009 | Fordon et al. |
| 2009/0217065 A1 | 8/2009 | Araujo, Jr. |
| 2009/0217364 A1 | 8/2009 | Salmela et al. |
| 2009/0219170 A1 | 9/2009 | Clark et al. |
| 2009/0248883 A1 | 10/2009 | Suryanarayana et al. |
| 2009/0249247 A1 | 10/2009 | Tseng et al. |
| 2009/0253409 A1 | 10/2009 | Slavov et al. |
| 2009/0254857 A1 | 10/2009 | Romine et al. |
| 2009/0257379 A1 | 10/2009 | Robinson et al. |
| 2009/0262715 A1 | 10/2009 | Juang |
| 2009/0265754 A1 | 10/2009 | Hinds |
| 2009/0271514 A1 | 10/2009 | Thomas et al. |
| 2009/0282127 A1 | 11/2009 | Leblanc et al. |
| 2009/0286507 A1 | 11/2009 | O'Neil et al. |
| 2009/0287921 A1 | 11/2009 | Zhu et al. |
| 2009/0288140 A1 | 11/2009 | Huber et al. |
| 2009/0291665 A1 | 11/2009 | Gaskarth et al. |
| 2009/0299857 A1 | 12/2009 | Brubaker |
| 2009/0307696 A1 | 12/2009 | Vals et al. |
| 2009/0307746 A1 | 12/2009 | Di et al. |
| 2009/0315735 A1 | 12/2009 | Bhavani et al. |
| 2009/0320110 A1 | 12/2009 | Nicolson et al. |
| 2010/0017506 A1 | 1/2010 | Fadell |
| 2010/0020822 A1 | 1/2010 | Zerillo et al. |
| 2010/0027469 A1 | 2/2010 | Gurajala et al. |
| 2010/0027559 A1 | 2/2010 | Lin et al. |
| 2010/0029273 A1 | 2/2010 | Bennett |
| 2010/0030890 A1 | 2/2010 | Dutta et al. |
| 2010/0041364 A1 | 2/2010 | Lott et al. |
| 2010/0041365 A1 | 2/2010 | Lott et al. |
| 2010/0041391 A1 | 2/2010 | Spivey et al. |
| 2010/0042675 A1 | 2/2010 | Fujii |
| 2010/0043068 A1 | 2/2010 | Varadhan et al. |
| 2010/0069074 A1 | 3/2010 | Kodialam et al. |
| 2010/0071053 A1 | 3/2010 | Ansari et al. |
| 2010/0075666 A1 | 3/2010 | Garner |
| 2010/0077035 A1 | 3/2010 | Li et al. |
| 2010/0080202 A1 | 4/2010 | Hanson |
| 2010/0082431 A1 | 4/2010 | Ramer et al. |
| 2010/0088387 A1 | 4/2010 | Calamera |
| 2010/0103820 A1 | 4/2010 | Fuller et al. |
| 2010/0113020 A1 | 5/2010 | Subramanian et al. |
| 2010/0121744 A1 | 5/2010 | Belz et al. |
| 2010/0131584 A1 | 5/2010 | Johnson |
| 2010/0142478 A1 | 6/2010 | Forssell et al. |
| 2010/0144310 A1 | 6/2010 | Bedingfield |
| 2010/0151866 A1 | 6/2010 | Karpov et al. |
| 2010/0153781 A1 | 6/2010 | Hanna |
| 2010/0167696 A1 | 7/2010 | Smith et al. |
| 2010/0177663 A1 | 7/2010 | Johansson et al. |

(56) References Cited

U.S. PATENT DOCUMENTS

| | | |
|---|---|---|
| 2010/0183132 A1 | 7/2010 | Satyavolu et al. |
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0190469 A1 | 7/2010 | Vanderveen et al. |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |
| 2010/0195503 A1 | 8/2010 | Raleigh |
| 2010/0197268 A1 | 8/2010 | Raleigh |
| 2010/0198698 A1 | 8/2010 | Raleigh et al. |
| 2010/0198939 A1 | 8/2010 | Raleigh |
| 2010/0222024 A1 | 9/2010 | Sigmund et al. |
| 2010/0235329 A1 | 9/2010 | Koren et al. |
| 2010/0241544 A1 | 9/2010 | Benson et al. |
| 2010/0248719 A1 | 9/2010 | Scholaert |
| 2010/0284327 A1 | 11/2010 | Miklos |
| 2010/0284388 A1 | 11/2010 | Fantini et al. |
| 2010/0287599 A1 | 11/2010 | He et al. |
| 2010/0311402 A1 | 12/2010 | Srinivasan et al. |
| 2010/0325420 A1 | 12/2010 | Kanekar |
| 2011/0004917 A1 | 1/2011 | Saisa et al. |
| 2011/0013569 A1 | 1/2011 | Scherzer et al. |
| 2011/0019574 A1 | 1/2011 | Malomsoky et al. |
| 2011/0081881 A1 | 4/2011 | Baker et al. |
| 2011/0082790 A1 | 4/2011 | Baker et al. |
| 2011/0088025 A1* | 4/2011 | Basmov .............. G06F 8/61 717/170 |
| 2011/0110309 A1 | 5/2011 | Bennett |
| 2011/0126141 A1 | 5/2011 | King et al. |
| 2011/0130119 A1 | 6/2011 | Gupta et al. |
| 2011/0145920 A1 | 6/2011 | Mahaffey et al. |
| 2011/0159818 A1 | 6/2011 | Scherzer et al. |
| 2011/0173678 A1 | 7/2011 | Kaippallimalil et al. |
| 2011/0177811 A1 | 7/2011 | Heckman et al. |
| 2011/0182220 A1 | 7/2011 | Black et al. |
| 2011/0185202 A1 | 7/2011 | Black et al. |
| 2011/0244837 A1 | 10/2011 | Murata et al. |
| 2011/0249668 A1 | 10/2011 | Milligan et al. |
| 2011/0264923 A1 | 10/2011 | Kocher et al. |
| 2011/0277019 A1 | 11/2011 | Pritchard, Jr. |
| 2012/0011017 A1 | 1/2012 | Wolcott et al. |
| 2012/0020296 A1 | 1/2012 | Scherzer et al. |
| 2012/0124647 A1* | 5/2012 | Simula ............... H04L 63/0815 709/217 |
| 2012/0144025 A1 | 6/2012 | Melander et al. |
| 2012/0166364 A1 | 6/2012 | Ahmad et al. |
| 2012/0185636 A1 | 7/2012 | Leon et al. |
| 2012/0196644 A1 | 8/2012 | Scherzer et al. |
| 2012/0236760 A1 | 9/2012 | Ionescu et al. |
| 2012/0238287 A1 | 9/2012 | Scherzer |
| 2013/0029653 A1 | 1/2013 | Baker et al. |
| 2013/0058274 A1 | 3/2013 | Scherzer et al. |
| 2013/0065555 A1 | 3/2013 | Baker et al. |
| 2013/0072177 A1 | 3/2013 | Ross et al. |
| 2013/0084835 A1 | 4/2013 | Scherzer et al. |
| 2013/0144789 A1 | 6/2013 | Aaltonen et al. |
| 2013/0165075 A1 | 6/2013 | Rishy-Maharaj et al. |
| 2013/0225151 A1 | 8/2013 | King et al. |
| 2013/0326356 A9 | 12/2013 | Zheng et al. |
| 2014/0073291 A1 | 3/2014 | Hildner et al. |
| 2014/0099916 A1* | 4/2014 | Mallikarjunan ........ H04W 8/20 455/406 |
| 2014/0241342 A1 | 8/2014 | Constantinof |
| 2015/0181628 A1 | 6/2015 | Haverinen et al. |

FOREIGN PATENT DOCUMENTS

| | | |
|---|---|---|
| CN | 1345154 A | 4/2002 |
| CN | 1508734 A | 6/2004 |
| CN | 1538730 A | 10/2004 |
| CN | 1567818 A | 1/2005 |
| CN | 101035308 A | 3/2006 |
| CN | 1801829 A | 7/2006 |
| CN | 1802839 A | 7/2006 |
| CN | 1889777 A | 7/2006 |
| CN | 101155343 B | 9/2006 |
| CN | 1867024 A | 11/2006 |
| CN | 1878160 A | 12/2006 |
| CN | 1937511 A | 3/2007 |
| CN | 101123553 A | 9/2007 |
| CN | 101080055 A | 11/2007 |
| CN | 101115248 A | 1/2008 |
| CN | 101127988 A | 2/2008 |
| CN | 101183958 A | 5/2008 |
| CN | 101335666 A | 12/2008 |
| CN | 101341764 A | 1/2009 |
| CN | 101815275 A | 8/2010 |
| EP | 1098490 A2 | 5/2001 |
| EP | 1247411 A2 | 10/2002 |
| EP | 1289326 A1 | 3/2003 |
| EP | 1463238 | 9/2004 |
| EP | 1503548 A1 | 2/2005 |
| EP | 1545114 A1 | 6/2005 |
| EP | 1739518 | 1/2007 |
| EP | 1772988 | 4/2007 |
| EP | 1850575 A1 | 10/2007 |
| EP | 1887732 A1 | 2/2008 |
| EP | 1942698 A1 | 7/2008 |
| EP | 1978772 | 10/2008 |
| EP | 2007065 A1 | 12/2008 |
| EP | 2026514 A1 | 2/2009 |
| JP | 3148713 B2 | 3/2001 |
| JP | 2005339247 A | 12/2005 |
| JP | 2006041989 | 2/2006 |
| JP | 2006155263 A | 6/2006 |
| JP | 2006197137 | 7/2006 |
| JP | 2006344007 A | 12/2006 |
| JP | 2007318354 A | 12/2007 |
| JP | 2008301121 A | 12/2008 |
| JP | 2009111919 | 5/2009 |
| JP | 2009212707 A | 9/2009 |
| JP | 2009218773 | 9/2009 |
| JP | 2009232107 A | 10/2009 |
| KR | 20040053858 A | 6/2004 |
| KR | 100958566 B1 | 5/2010 |
| WO | 1998058505 | 12/1998 |
| WO | 1999027723 | 6/1999 |
| WO | 1999065185 A3 | 5/2001 |
| WO | 0208863 | 1/2002 |
| WO | 2002045315 A2 | 6/2002 |
| WO | 2002067616 A1 | 8/2002 |
| WO | 2002093877 A1 | 11/2002 |
| WO | 03017065 A2 | 2/2003 |
| WO | 2003014891 | 2/2003 |
| WO | 2003017063 A2 | 2/2003 |
| WO | 2003017065 A2 | 2/2003 |
| WO | 2003058880 A1 | 7/2003 |
| WO | 2004028070 A1 | 4/2004 |
| WO | 2004064306 A2 | 7/2004 |
| WO | 2004095753 A3 | 1/2005 |
| WO | 2005008995 | 1/2005 |
| WO | 2005053335 A1 | 6/2005 |
| WO | 2005083934 A1 | 9/2005 |
| WO | 2006004467 A1 | 1/2006 |
| WO | 2006004784 A1 | 1/2006 |
| WO | 2006012610 A2 | 2/2006 |
| WO | 2006050758 A1 | 5/2006 |
| WO | 2006077481 A1 | 7/2006 |
| WO | 2006093961 A1 | 9/2006 |
| WO | 2006120558 | 11/2006 |
| WO | 2006130960 A1 | 12/2006 |
| WO | 2007001833 A2 | 1/2007 |
| WO | 2007014630 A1 | 2/2007 |
| WO | 2007018363 A1 | 2/2007 |
| WO | 2007053848 A1 | 5/2007 |
| WO | 2007068288 | 6/2007 |
| WO | 2007097786 A | 8/2007 |
| WO | 2007107701 A2 | 9/2007 |
| WO | 2007120310 | 10/2007 |

(56) References Cited

FOREIGN PATENT DOCUMENTS

| WO | 2007124279 | | 11/2007 |
|---|---|---|---|
| WO | 2007126352 | | 11/2007 |
| WO | 2007129180 | A2 | 11/2007 |
| WO | 2007133844 | A | 11/2007 |
| WO | 2004077797 | A3 | 2/2008 |
| WO | 2008017837 | A1 | 2/2008 |
| WO | 2008051379 | A2 | 5/2008 |
| WO | 2008066419 | A1 | 6/2008 |
| WO | 2008080139 | A1 | 7/2008 |
| WO | 2008080430 | A1 | 7/2008 |
| WO | 2008099802 | A1 | 8/2008 |
| WO | 2009002949 | A2 | 12/2008 |
| WO | 2009008817 | A1 | 1/2009 |
| WO | 2009002949 | A3 | 3/2009 |
| WO | 2006073837 | A3 | 4/2009 |
| WO | 2007069245 | A3 | 4/2009 |
| WO | 2009091295 | A1 | 7/2009 |
| WO | 2010088413 | A1 | 8/2010 |
| WO | 2010128391 | A2 | 11/2010 |
| WO | 2010128391 | A3 | 1/2011 |
| WO | 2011002450 | A1 | 1/2011 |

OTHER PUBLICATIONS

Ruckus Wireless—White Paper; "Smarter Wi-Fi for Mobile Operator Infrastructures" 2010.
Sabat, "The evolving mobile wireless value chain and market structure," Nov. 2002.
Sadeh et al., "Understanding and Capturing People's Privacy Policies in a Mobile Social Networking Application," ISR School of Computer Science, Carnegie Mellon University, 2007.
Schiller et al., "Location-Based Services," The Morgan Kaufmann Series in Data Management Systems, 2004.
Sharkey, "Coding for Life—Battery Life, That Is," May 27, 2009.
Steglich, Stephan, "I-Centric User Interaction," Nov. 21, 2003.
Sun et al., "Towards Connectivity Management Adaptability: Context Awareness in Policy Representation and End-to-end Evaluation Algorithm," Dept. of Electrical and Information Engineering, Univ. of Oulu, Finland, 2004.
Van Eijk, et al., "GigaMobile, Agent Technology for Designing Personalized Mobile Service Brokerage," Jul. 1, 2002.
VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.
Windows7 Power Management, published Apr. 2009.
Wireless Broadband Alliance, "WISPr 2.0, Apr. 8, 2010"; Doc. Ref. No. WBA/RM/WISPr, Version 01.00.
Zhu et al., "A Survey of Quality of Service in IEEE 802.11 Networks," IEEE Wireless Communications, Aug. 2004.
"Ads and movies on the run," the Gold Coast Bulletin, Southport, Qld, Jan. 29, 2008.
"ASA/PIX: Allow Split Tunneling for VPN Clients on the ASA Configuration Example," Document ID 70917, Jan. 10, 2008.
"Communication Concepts for Mobile Agent Systems," by Joachim Baumann et al.; Inst. of Parallel and Distributed High-Performance Systems, Univ. of Stuttgart, Germany, pp. 123-135, 1997.
"End to End QoS Solution for Real-time Multimedia Application;" Computer Engineering and Applications, 2007, 43 (4): 155-159, by Tan Zu-guo, Wang Wen-juan; Information and Science School, Zhanjian Normal College, Zhan jiang, Guangdong 524048, China.
"Jentro Technologies launches Zenlet platform to accelerate location-based content delivery to mobile devices," The Mobile Internet, Boston, MA, Feb. 2008.
"The Construction of Intelligent Residential District in Use of Cable Television Network," Shandong Science, vol. 13, No. 2, Jun. 2000.
3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8.4.0, Dec. 2008.
3rd Generation Partnership Project, "Technical Specification Group Services and System Aspects; Policy and Charging Control Architecture," Release 8, Document No. 3GPP TS 23.203, V8.4.0, Dec. 2008.
Accuris Networks, "The Business Value of Mobile Data Offload—a White Paper", 2010.
Ahmed et al., "A Context-Aware Vertical Handover Decision Algorithm for Multimode Mobile Terminals and Its Performance," BenQ Mobile, Munich Germany; University of Klagenfurt, Klagenfurt, Austria; 2006.
Alonistioti et al., "Intelligent Architectures Enabling Flexible Service Provision and Adaptability," 2002.
Amazon Technologies, Inc., "Kindle™ User's Guide," 3rd Edition, Copyright 2004-2009.
Android Cupcake excerpts, The Android Open Source Project, Feb. 10, 2009.
Anton, B. et al., "Best Current Practices for Wireless Internet Service Provider (WISP) Roaming"; Release Date Feb. 2003, Version 1.0; Wi-Fi Alliance—Wireless ISP Roaming (WISPr).
Blackberry Mobile Data System, version 4.1, Technical Overview, 2006.
Byrd, "Open Secure Wireless," May 5, 2010.
Chandrasekhar et al., "Ferntocell Networks: A Survey," Jun. 28, 2008.
Chaouchi et al., "Policy Based Networking in the Integration Effort of 4G Networks and Services," 2004 IEEE.
Cisco Systems, Inc., "Cisco Mobile Exchange (CMX) Solution Guide: Chapter 2—Overview of GSM, GPRS, and UMTS," Nov. 4, 2008.
Client Guide for Symantec Endpoint Protection and Symantec Network Access Control, 2007.
Dikaiakos et al., "A Distributed Middleware Infrastructure for Personalized Services," Nov. 24, 2003.
Dixon et al., Triple Play Digital Services: Comcast and Verizon (Digital Phone, Television, and Internet), Aug. 2007.
Droid Wall 1.3.7 description Apr. 28, 2010 obtained from https://www.freewarelovers.com/android/apps/droid-wall.
Ehnert, "Small application to monitor IP trafic on a Blackberry—1.01.03", Mar. 27, 2008; http://www.ehnert.net/MiniMoni/.
European Commission, "Data Roaming Tariffs—Transparency Measures," obtained from EUROPA—Europe's Information Society Thematic Portal website, Jun. 24, 2011: "http://ec.europa.eu/information_society/activities/roaming/data/measures/index_en.htm."
Farooq et al., "An IEEE 802.16 WiMax Module for the NS-3 Simulator," Mar. 2-6, 2009.
Fujitsu, "Server Push Technology Survey and Bidirectional Communication in HTTP Browser," Jan. 9, 2008 (JP).
Han et al., "Information Collection Services for Qos-Aware Mobile Applications," 2005.
Hartmann et al., "Agent-Based Banking Transactions & Information Retrieval—What About Performance Issues?" 1999.
Hewlett-Packard Development Company, LP, "IP Multimedia Services Charging," white paper, Jan. 2006.
Hossain et al., "Gain-Based Selection of Ambient Media Services in Pervasive Environments," Mobile Networks and Applications. Oct. 3, 2008.
Jing et al., "Client-Server Computing in Mobile Environments," GTE Labs. Inc., Purdue University, ACM Computing Surveys, vol. 31, No. 2, Jun. 1999.
Kasper et al., "Subscriber Authentication in mobile cellular Networks with virtual software SIM Credentials using Trusted Computing," Fraunhofer-Institute for Secure Information Technology SIT, Darmstadt, Germany; ICACT 2008.
Kassar et al., "An overview of vertical handover decision strategies in heterogeneous wireless networks," ScienceDirect, University Pierre & Marie Curie, Paris, France, Jun. 5, 2007.
Kim, "Free wireless a high-wire act; MetroFi needs to draw enough ads to make service add profits," San Francisco Chronicle, Aug. 21, 2006.

(56) References Cited

OTHER PUBLICATIONS

Knight et al., "Layer 2 and 3 Virtual Private Networks: Taxonomy, Technology, and Standarization Efforts," IEEE Communications Magazine, Jun. 2004.
Koutsopoulou et al., "Charging, Accounting and Billing Management Schemes in Mobile Telecommunication Networks and the Internet," IEEE Communications Surveys & Tutorials, First Quarter 2004, vol. 6, No. 1.
Koutsopoulou et al., "Middleware Platform for the Support of Charging Reconfiguration Actions," 2005.
Kuntze et al., "Trustworthy content push," Fraunhofer-Institute for Secure Information Technology SIT; Germany; WCNC 2007 proceedings, IEEE.
Kyriakakos et al., "Ubiquitous Service Provision in Next Generation Mobile Networks," Proceedings of the 13th IST Mobile and Wireless Communications Summit, Lyon, France, Jun. 2004.
Li, Yu, "Dedicated E-Reading Device: The State of the Art and The Challenges," Scroll, vol. 1, No. 1, 2008.
Loopt User Guide, metroPCS, Jul. 17, 2008.
Muntermann et al., "Potentiale und Sicherheitsanforderungen mobiler Finanzinformationsdienste und deren Systeminfrastrukturen," Chair of Mobile Commerce & Multilateral Security, Goethe Univ. Frankfurt, 2004.
NetLimiter Lite 4.0.19.0; http://www.heise.de/download/netlimiter-lite-3617703.html from vol. 14/2007.
Nilsson et al., "A Novel MAC Scheme for Solving the QoS Parameter Adjustment Problem in IEEE802.11e EDCA," Feb. 2006.
Nuzman et al., "A compund model for TCP connection arrivals for LAN and WAN applications," Oct. 22, 2002.
Open Mobile Alliance (OMA), Push Architecture, Candidate Version 2.2; Oct. 2, 2007; OMA-AD-Push-V2_2-20071002-C.
Oppliger, Rolf, "Internet Security: Firewalls and Bey," Communications of the ACM, May 1997, vol. 40. No. 5.
Rao et al., "Evolution of Mobile Location-Based Services," Communication of the ACM, Dec. 2003.
Richtel, "Cellphone consumerism; If even a debit card is too slow, now you have a new way to act on impulse: [National Edition]," National Post, Canada, Oct. 2, 2007.
Arm TrustZone Microprocessor Report, dated Aug. 25, 2033.
Arm TrustZone Paper, TrustZone: Integrated Hardware and Software Security, dated Jul. 2004.
Limont Prosecution History Excerpt, U.S. Appl. No. 11/171,850, filed Jun. 30, 2005.
Plaintiff's Infringement Contention in Case No. 6:23-CV-00352-JRG-RSP, *Headwater Research LLC* v. *Cellco Partnership, d/b/a Verizon Wireless, Verizon Corporate Services Group Inc.* (E.D. Tex, filed Jul. 28, 2023).
IPR2024-00809 Petition for Inter Partes Review of U.S. Pat. No. 9,198,042, filed Apr. 19, 2024.
IPR2024-00809 File History of Inter Partes Review of U.S. Pat. No. 9,198,042, filed Apr. 19, 2024.
Federal Communications Commission (FCC) Regulation (2010), available at, https://www.govinfo.gov/content/pkg/FR-2010-06-22/pdf/2010-15073.pdf.
Samsung Galaxy SII Mobile Phone User Manual (2011), available at https://ringtones.specialtyansweringservice.net/wpcontent/uploads/2014/08/manuals/samsung-galaxys2-userguide.pdf.
IPhone User Guide for iPhone OS 3.1 Software (2009), available at https://cdsassets.apple.com/live/6GJYWVAV/user/ma616_iphone_ios3_1_user_guide.pdf.
Architecture and Enablers for Optimized Radio Resource Usage in Heterogeneous Wireless Access Networks (2009), available at https://www.researchgate.net/publication/224371987_Architecture_and_Enablers_for_Optimized_Radio_Resource_Usage_in_Heterogeneous_Wireless_Access_Networks_The_IEEE_19004_Working_Group.
Characterizing Radio Resource Allocation for 3G Networks (2010), available at https://www.cs.columbia.edu/~lierranli/coms6998-7Spring2014/papers/RRC3G_imc2010.pdf.
Operating System Implications of Fast, Cheap, Non-Volatile Memory (2011), available at https://www.usenix.org/legacy/events/hotos11/tech/final_files/Bailey.pdf.
IPod touch User Guide for iOS 5.1 Software (2012), available at https://cdsassets.apple.com/live/6GJYWVAV/user/ma1627_ipod_touch_ios5_user_guide.pdf.
Samsung Galaxy SIII 4G LTE Smartphone User Manual (2013), available at https://downloadcenter.samsung.com/content/UM/202101/20210101045744723/ATT_SGHI747_Galaxy_SIII_English_User_Manual_KK_NE4_F1.pdf.
Jacob et al., Memory Systems: Cache, DRAM, Disk (2007).
European Telecommunications Standards Institute (ETSI) Technical Specification 23.003 v8.11.0 (2011), available at https://www.etsi.org/deliver/etsi_ts/123000_123099/123003/08.11.00_60/ts_123003v081100p.pdf.
Control Servers in the Core Network (2000), available at https://citeseerx.ist.psu.edu/document?repid=rep1&type=pdf&doi=1247211968f9167dbc5e7ea896bd910762e57ba7.
Wireless Application Protocol (WAP) Architectural Overview (2001), available at https://www.openmobilealliance.org/release/Push/V2_1-20051122-C/WAP-250-PushArchOverview-20010703-a.pdf.
Complaint for Patent Infringement in *Headwater Research LLC* v. *Samsung Electronics Co., Ltd. et al.*, 2-24-cv-00228 (EDTX) (Apr. 3, 2024).
Docket Control Order in *Headwater Research LLC* v. *Samsung Electronics Co., Ltd. et al.*, Case No. 2:24-cv-00228 (EDTX) (Aug. 9, 2024).
Disclosure of Asserted Claims and Infringement Contentions in *Headwater Research LLC* v. *Samsung Electronics Co., Ltd. et al.*, 2-24-cv-00228 (EDTX) (Jul. 11, 2024).
File History of IPR2025-00483, filed Feb. 10, 2025.
Petition for Inter Partes Review in IPR2025-00483, filed Feb. 10, 2025.
File History of IPR2025-00484, filed Feb. 10, 2025.
Petition for Inter Partes Review in IPR2025-00484, filed Feb. 10, 2025.
Complaint, *Headwater Research LLC* v. *Samsung Elec-tronics Co., Ltd. et al*, 2-24-cv-00228, E.D. Tex., filed Apr. 3, 2024.
(Excerpts) Smith, et al., 2005. "Virtual Machines: Versa-tile Platforms for Systems and Processes," Elsevier, Inc, 2005, ISBN 1-55860-910-5.
(Excerpts) Telecom Dictionary, Athos Publishing, 2007.
(Excerpts) Eberspächer, Jörg (2001). GSM Switching, Services and Protocols, Second Edition. John Wiley & Sons Ltd. ISBN: 978-0-470-85394-8.
3rd Generation Partnership Project; Technical Specifica-tion Group Terminals; "Characteristics of the USIM application" (Release 7), 3GPP TS 31.102 V7.0.0 ("3GPP USIM").
Kasper, et al., Feb. 2008. "Subscriber authentication in cellular networks with trusted virtual sims." In 2008 10th International Conference on Advanced Communication Technology (vol. 2, pp. 903-908). IEEE.
TCG Mobile Reference Architecture, version 1.0, Revi-sion 1, Jun. 12, 2007. ("TCG Mobile Reference Archi-tecture").
TCG Mobile Trusted Module Specification, version 1.0, Revision 6, Jun. 26, 2008. ("TCG Mobile Trusted Mod-ule Specification").
Stone, G.N., Lundy, B. and Xie, G.G., 2001. Network policy languages: a survey and a new approach. IEEE network, 15(1), pp. 10-21.
David K. Gifford. 1982. Cryptographic sealing for infor-mation secrecy and authentication. Commun. ACM 25, 4 (Apr. 1982), 274-286. https://doi.org/10.1145/358468.358493.
Jansen, Wayne A. and Richard P. Ayers. "Forensic Tools for Mobile Phone Subscriber Identity Modules." J. Digit. Forensics Secur. Law 1 (2006): 75-94.
National Institute of Standards and Technology. 2001. Security Requirements for Cryptographic Modules, downloaded from the Internet at https://nvl-pubs.nist.gov/nistpubs/FIPS/NIST.FIPS.140-2.pdf on Dec. 5, 2024.
Verma, et. al., (2002). Policy-based management of con-tent distribution networks. IEEE network, 16(2), 34-39.
Lobo, et al., (1999). A policy description language. AAAI/IAAI, 1999, 291-298.

(56) References Cited

OTHER PUBLICATIONS

Westerinen, et al., IETF RFC 3198, Terminology for Policy-Based Management, Nov. 2001, downloaded from the Internet on May 27, 2024.
(Excerpts) Keith Mayes and Konstantinos Markantonakis. 2008. Smart Cards, Tokens, Security and Applications (1st. ed.).
(Excerpts) Gasser, Morrie. Building a Secure Computer System. New York, NY: Van Nostrand Reinhold, 1988. ("Gasser").
(Excerpts) Malhotra, Ravi. 2002. IP Routing: Help for Network Administrators. O'Reilly Media. ISBN: 978-0-596-00275-0 ("Malhotra").
Jude, Michael. "Policy-Based Management: Beyond the Hype." Business Communications Review 31.3 (2001): 52-56. ("Jude").
Merkle, Ralph C. 1978. Secure communications over in-secure channels. Commun. ACM 21, 4 (Apr. 1978), 294-299. https://doi.org/10.1145/359460.359473 ("Merkle").
ARM. 2004. PrimeCell Infrastructure AMBA 3 TrustZone Protection Controller (BP147) Revision: r0p0 Technical Overview, downloaded from the Internet at https://documentation-ser-vice.arm.com/static/5e9565afc8052b1608762aae%3Fto-ken%3D&ved=2ahUKEwiZq56_3pGKAxVUCnkGHcR9OGIQFnoECAwQAQ&usg=AOv-Vaw2PG8jUG9TU8fpiRxmGKNyM on Dec. 5, 2024.
Network Associates, Inc. 1999. PGP, Version 6.5.1. An Introduction to Cryptography.
Stuart E. Madnick and John J. Donovan. 1973. Application and analysis of the virtual machine approach to information system security and isolation. In Proceedings of the workshop on virtual computer systems. Association for Computing Machinery, New York, NY, USA, 210-224. https://doi.org/10.1145/800122.803961.
European Telecommunications Standards Institute. 1998. Terrestrial Trunked Radio (TETRA); Security Aspects; Subscriber Identity Module to Mobile Equipment (SIM-ME) interface. ETSI ETS 300 812 ed.1 (Nov. 1998), downloaded from the Internet at https://www.etsi.org/de-liver/etsi_i_ets/300800_300899/300812/01_20_9826/ets_300812e01c.pdf on Dec. 12, 2024.
IETF RFC 1122, Requirements for Internet Hosts—Communication Layers, Oct. 1989, downloaded from the internet at https://datatracker.ietf.org/doc/html/rfc1122 on Dec. 12, 2024.
IETF RFC 793, Transmission Control Protocol, Sep. 1981, downloaded from the internet at https://www.ietf.org/rfc/rfc793.txt on Dec. 11, 2024.
Smith, et al., 2005. "The architecture of virtual machines. Computer," 38(5).
ISO/IEC 7498-1, "Information technology—Open Systems Interconnection—Basic Reference Model: The Basic Model," downloaded from the internet at https://www.ecma-international.org/wp-content/up-loads/s020269e.pdf on Jan. 10, 2025.
Gonçalves, et al., Oct. 2009. A graphical user inter-face for policy composition in CIM-SPL. In 2009 Inter-national Conference on Ultra Modern Telecommunications & Workshops (pp. 1-7). IEEE.
Agrawal, et. al., May 2007. Issues in designing a policy language for distributed management of IT infrastruc-tures. In 2007 10th IFIP/IEEE International Symposium on Integrated Network Management (pp. 30-39). IEEE.
File History of IPR2025-00482, filed Jan. 28, 2025.
Petition for Inter Partes Review in IPR2025-00482, filed Jan. 28, 2025.

\* cited by examiner

DEVICE ASSISTED SERVICES INSTALL

BACKGROUND OF THE INVENTION

With the advent of mass market digital communications, applications and content distribution, many access networks such as wireless networks, cable networks and DSL (Digital Subscriber Line) networks are pressed for user capacity, with, for example, EVDO (Evolution-Data Optimized), HSPA (High Speed Packet Access). LTE (Long Term Evolution). WiMax (Worldwide Interoperability for Microwave Access), DOCSIS, DSL, and Wi-Fi (Wireless Fidelity) becoming user capacity constrained. In the wireless case, although network capacity will increase with new higher capacity wireless radio access technologies, such as MIMO (Multiple-Input Multiple-Output), and with more frequency spectrum and cell splitting being deployed in the future, these capacity gains are likely to be less than what is required to meet growing digital networking demand.

Similarly, although wire line access networks, such as cable and DSL, can have higher average capacity per user compared to wireless, wire line user service consumption habits are trending toward very high bandwidth applications and content that can quickly consume the available capacity and degrade overall network service experience. Because some components of service provider costs go up with increasing bandwidth, this trend will also negatively impact service provider profits.

BRIEF DESCRIPTION OF THE DRAWINGS

Various embodiments of the invention are disclosed in the following detailed description and the accompanying drawings.

DETAILED DESCRIPTION

Figure 1:
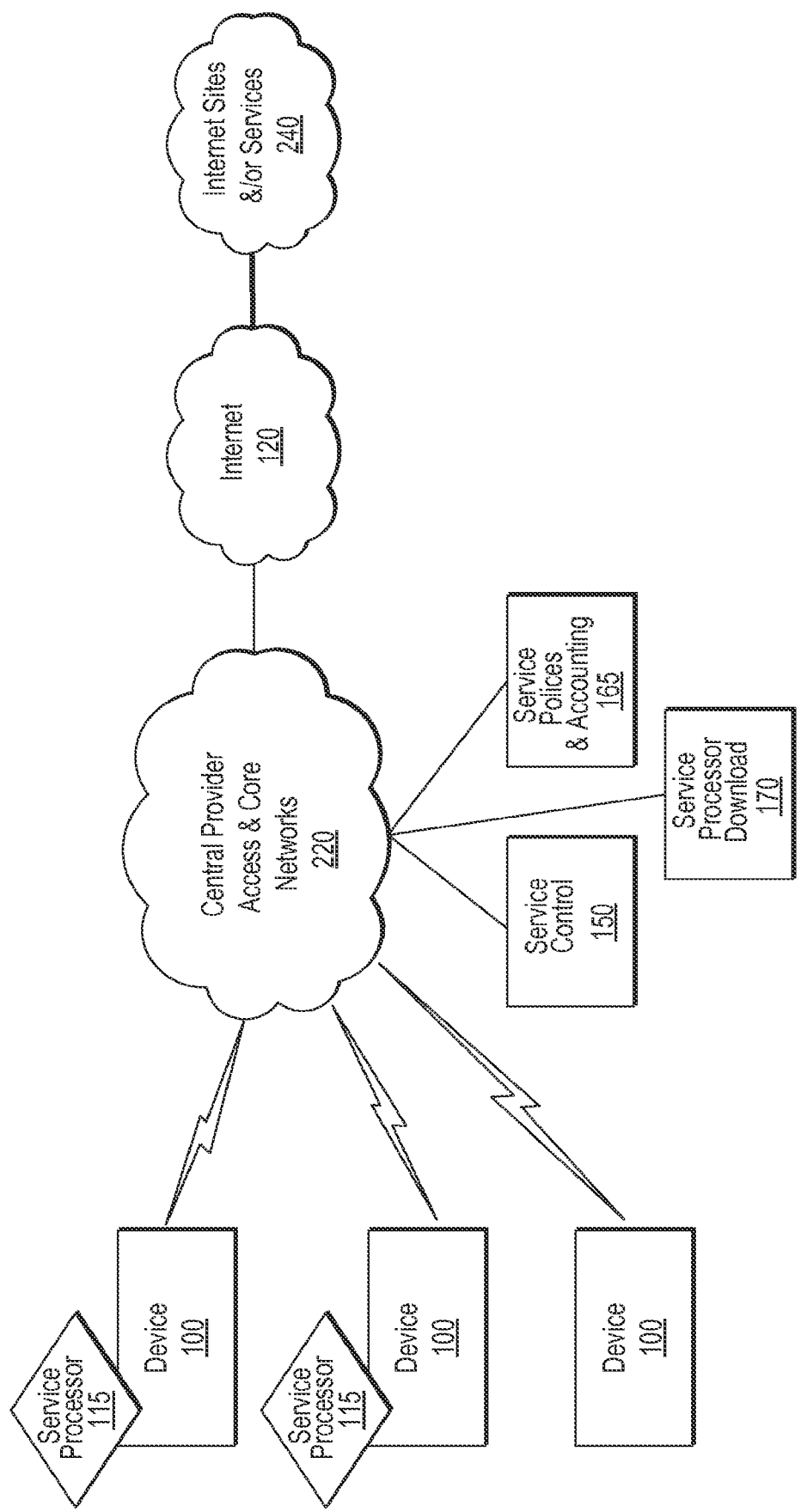
FIG. 1 illustrates a wireless network architecture for providing device assisted services (DAS) install techniques in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Device assisted services (DAS) install techniques are provided in accordance with some embodiments. In some embodiments. DAS install techniques for providing service processors for mobile devices are provided. In some embodiments, DAS install techniques for downloading/installing new and/or updated service processors for mobile devices are provided. In some embodiments. DAS install techniques for providing verified service processors for mobile devices are provided. In some embodiments, DAS install techniques for providing secured service processors for mobile devices are provided. In some embodiments, DAS install techniques include providing a generic first version service processor for downloading and installing a second version service processor. These and other DAS install techniques are described herein with respect to various embodiments.

In some embodiments, a virtual network overlay includes a device service processor, a network service controller and a control plane communication link to manage various aspects of device based network service policy implementation. In some embodiments, the virtual network overlay networking solution is applied to an existing hierarchical network (e.g., for wireless services), and in some embodiments, is applied to simplify or flatten the network architecture as will be further described below. In some embodiments, the large majority of the complex data path network processing required to implement the richer service management objectives of existing hierarchical networks (e.g., for wireless services) are moved into the device, leaving less data path processing required in the edge network and in some cases even less in the core network. Because the control plane traffic between the service control servers and the device agents that implement service policies can be several orders of magnitude slower than the data plane traffic, service control server network placement and backhaul infrastructure is much less performance sensitive than the data plane network. In some embodiments, as described further below, this architecture can be overlaid onto all the important existing access network architectures used today. In some embodiments, this architecture can be employed to greatly simplify core access network routing and data plane traffic forwarding and management. For example, in the case of wireless networks, the incorporation of device assisted service policy implementation architectures can result in base stations that directly connect to the Internet local loop and the data traffic does not need to be concentrated into a dedicated core network. This results, for example, in a large reduction in backhaul cost, core network cost and maintenance cost. These cost savings can be re-deployed to purchase and install more base stations with smaller cells, which results in higher data capacity for the access network leading to better user experience, more useful applications and lower service costs. This flattened networking architecture also results in latency reduction as fewer routes are needed to move traffic through the Internet. In some embodiments, the present invention provides the necessary teaching to enable this powerful transformation of centralized network service architectures to a more distributed device based service architectures.

Figure 6:
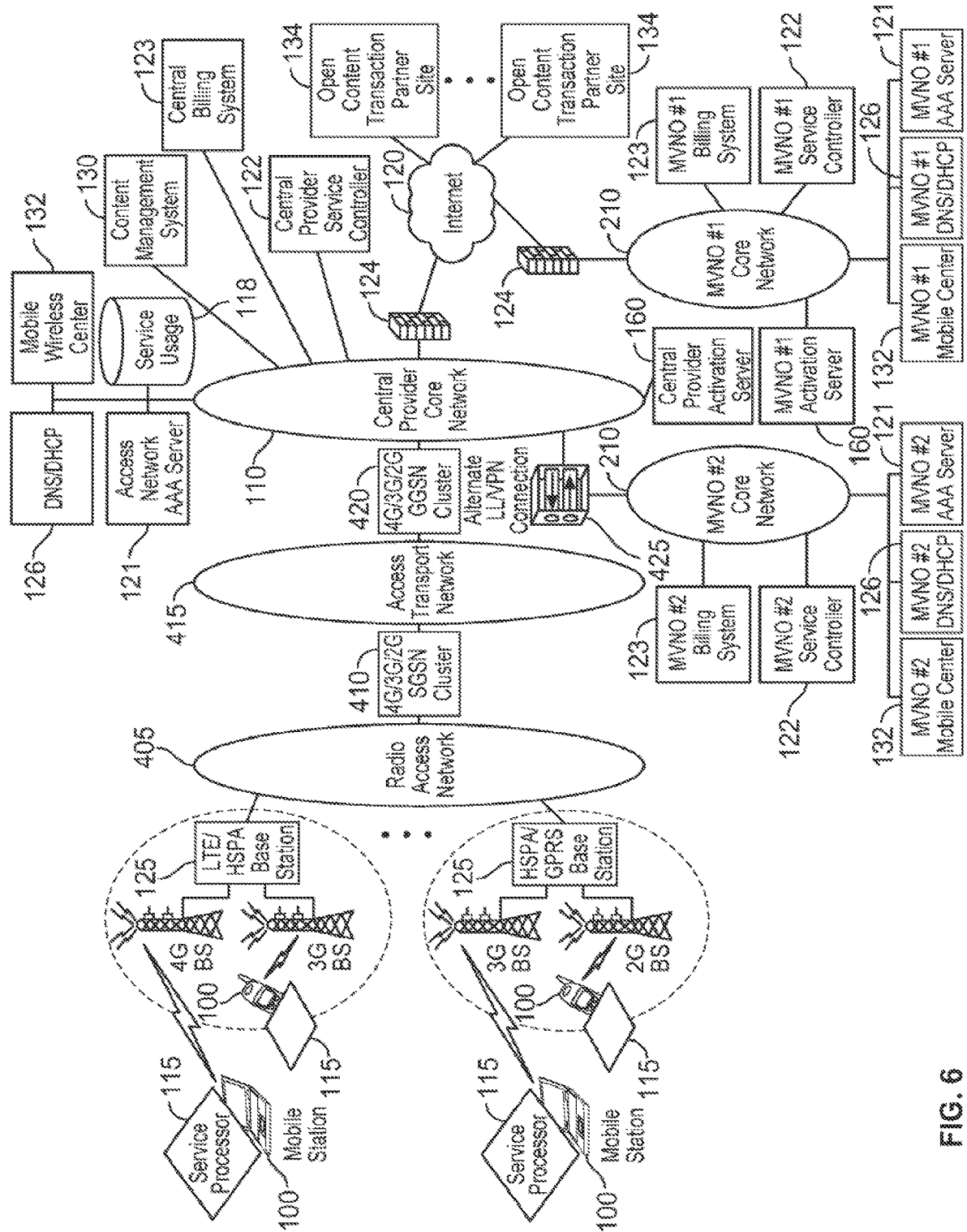
FIG. 6 illustrates a network architecture including a Universal Mobile Telecommunications System (UMTS) overlay configuration in accordance with some embodiments.

FIG. 6 illustrates a network architecture including a Universal Mobile Telecommunications System (UMTS) overlay configuration in accordance with some embodiments. As shown. FIG. 6 includes a 4G/3G/2G HSPA/Transport access network operated by a central provider and two mobile virtual network operator (MVNO) networks 210 operated by two MVNO partners. In some embodiments, the central provider can offer improved service capabilities using a conventional UMTS network. As shown, the base stations 125 do not connect directly to the Internet 120, and instead the base stations 125 connect to the conventional UMTS network. However, the service processor 115 still connects through the secure control plane link to service controller 122. In some embodiments, the data plane traffic is backhauled across the various UMTS network routers and gateways as is the control plane traffic, and the Internet protocol detail records (IPDRs) are obtained from the access network AAA server 121. Referring now to the 4G/3G/2G HSPA/Transport access network as shown in FIG. 6, the LTE/HSPA and HSPA/GPRS base stations/nodes 125 are in communication with 4G/3G/2G Service/Serving GPRS Support Nodes (SGSNs) cluster 410 via a radio access network 405, which are in communication with 4G/3G/2G Gateway GPRS Support Nodes (GGSNs) cluster 420 via an access transport network 415 (e.g., a GPRS-IP network), which are then in communication with central provider core network 110.

As shown in FIG. 6, service usage data store 118 is a functional descriptor for a network level service usage information collection and reporting function located in one or more of the networking equipment boxes attached to one or more of the sub-networks in the figure (e.g., RAN, transport and/or core networks). As shown in FIG. 6, service usage 118 is an isolated function connected to the central provider core network 110 and the intention of this depiction is to facilitate all the possible embodiments for locating the service usage 118 function. In some UMTS network embodiments, the service usage 118 function is located or partially located in the GGSN gateway (or gateway cluster) 420. In some embodiments, service usage 118 functionality is located or partially located in the SGSN gateway (or gateway cluster) 410. In some embodiments, service usage 118 functionality is located or partially located in the equipment cluster that includes the AAA 121 and/or the mobile wireless center 132. In some embodiments, service usage 118 functionality is located or partially located in the base station, base station controller and/or base station aggregator, collectively referred to as base station 125 in FIG. 6. In some embodiments, service usage 118 functionality is located or partially located in a networking component in the transport network 415, a networking component in the core network 110, the billing system 123 and/or in another network component or function. This discussion on the possible locations for the network based service usage history logging and reporting function can be easily generalized by one of ordinary skill in the art (e.g., RAN Gateway 410 and/or Transport Gateway 420), and this background will be assumed even if not directly stated in all discussion above and below.

In some embodiments, a central provider provides open development services to MVNO. Master Value Added Reseller (MVAR) and/or Original Equipment Manufacturer (OEM) partners. In some embodiments, all three service providers, central provider service provider, MVNO #1 service provider and MVNO #2 service provider have service control and billing control of their own respective devices 100 through the unique pairing of the service processors 115 and service controllers 122. For example, MVNO #1 and MVNO #2 can each have open development billing agreements with the central provider and each can own their respective billing systems 123. As shown in FIG. 6. MVNO #1 core network 210 is in communication with the central provider core network 110 via the Internet 120, and MVNO #2 core network 210 is in communication with the central provider core network 110 via an alternate landline (LL)/VPN connection 425. In some embodiments, the two MVNOs each offer completely different devices and/or services, and the devices and/or services also differ significantly from those offered by the central provider, and the service profiles are adapted as required to service the different devices and respective service offerings. In addition, the central billing system 123 allows all three service provider user populations to access ecommerce experiences from transaction provider partners operating transaction servers 134, to choose central provider billing options that combine their third party transaction bills on their service provider bill, and each subscriber population can experience a service provider specified look and feel that is unique to the respective service provider even though the different user populations are interfacing to the same transaction servers and the transaction partners do not need to require significant custom development to provide the unique central billing and unique consistent user experience look and feel.

In some embodiments, a central provider offers open network device and service developer services using one service controller server 122 (e.g., a service controller server farm) and allows the open development partners to lease server time and server tools to build their own service profiles. The central provider also provides service billing on behalf of services to the open development partners. For example, this reduces costs associated with setting up an MVNO network for the open development partners and does not require the partners to give up significant control or flexibility in device and/or service control.

In some embodiments, virtual service provider (VSP) capabilities include making available to a third party service partner one or more of the following: (1) device group definition, control and security. (2) provisioning definition and execution, (3) ATS activation owner, (4) service profile definitions, (5) activation and ambient service definition, (6) billing rules definition, (7) billing process and branding controls, (8) bill by account settings, (9) service usage analysis capabilities by device, sub-group or group, (10) beta test publishing capabilities by device, sub-group or group, and (11) production publishing, fine tuning and re-publishing.

Figure 7:
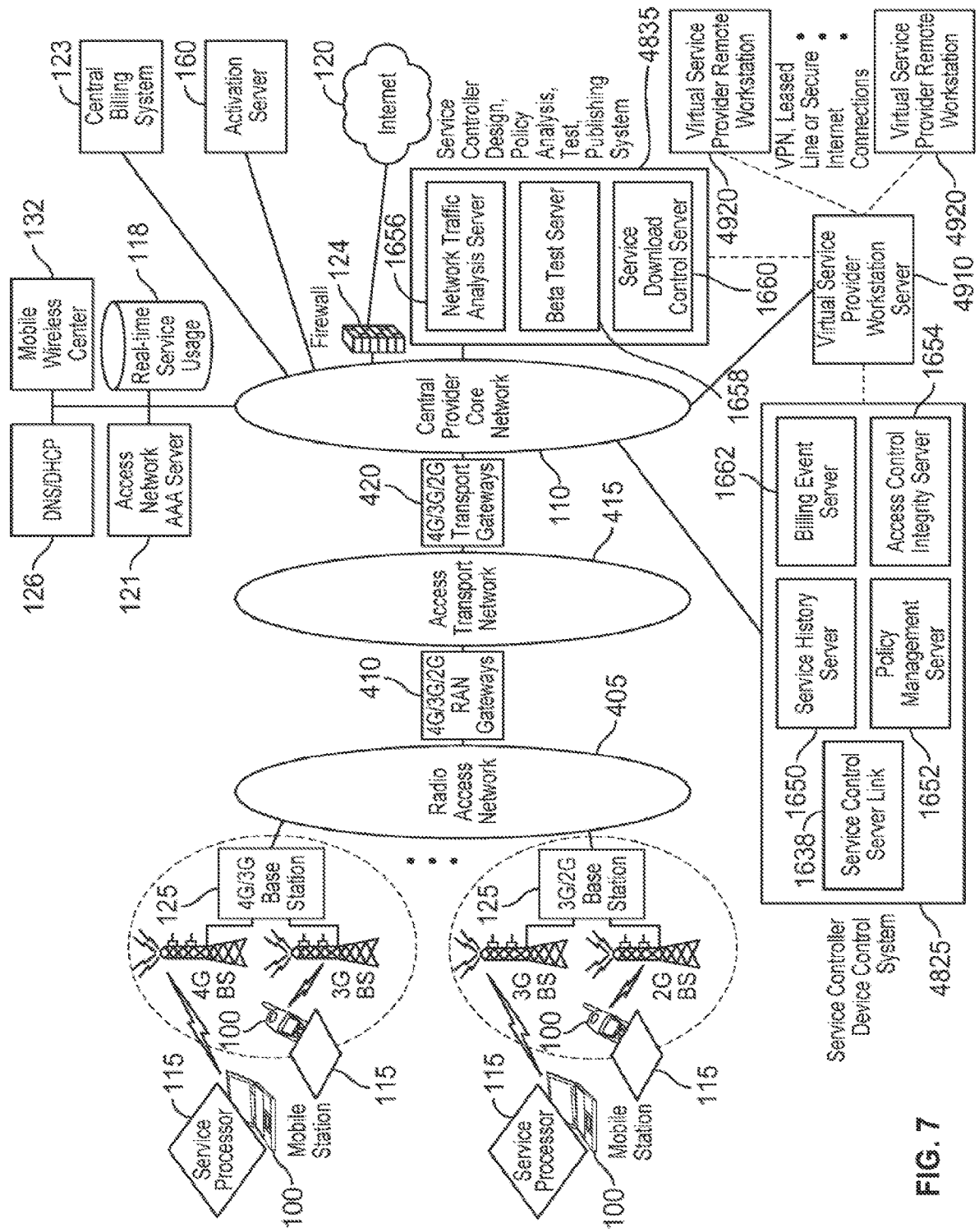
FIG. 7 illustrates a network architecture for an open developer platform for virtual service provider (VSP) partitioning in accordance with some embodiments.

FIG. 7 illustrates a network architecture for an open developer platform for virtual service provider (VSP) partitioning in accordance with some embodiments. As shown, the service controller design, policy analysis, definition, test, publishing system 4835 is configured so that multiple "service group owners" (e.g., the service provider for certain smart phones) or "device group owners" (e.g., eReader devices for the eReader service provider(s)) or "user group owners" (e.g., IT for Company X for their employees' corporate mobile devices), collectively referred to as the "Virtual Service Provider" (VSP), are serviced with the same service controller infrastructure and the same (or substantially similar) service processor design from virtual service provider workstation server 4910 and/or virtual service provider remote workstation(s) 4920. As shown, the virtual service provider remote workstation(s) 4920 communicates with the virtual service provider workstation server 4910 via VPN, leased line or secure Internet connections. The dashed lines shown in FIG. 7 are depicted to represent that, in some embodiments, the virtual service provider workstation server 4910 is networked with the service controller device control system 4825 and/or, in some embodiments, the service controller design, policy analysis, definition, test, publishing system 4835. Based on the discussion herein, it will be apparent to one of ordinary skill in the art that the VSP workstation server 4910 can also be networked in various embodiments with billing system 123, AAA server 121, gateways 410 or 420, or other network components to perform, for example, various network provisioning and activation related functions discussed herein for the device group assigned to one or more VSPs, or for other reasons as will be apparent to a given VSP embodiment.

In some embodiments, the service controller functionality is partitioned for a VSP by setting up one or more secure workstations, secure portals, secure websites, secure remote software terminals and/or other similar techniques to allow the service managers who work for the VSP to analyze, fine tune, control or define the services they decide to publish to one or more groups of devices or groups of users that the VSP "owns." In some embodiments, the VSP "owns" such groups by virtue of a relationship with the central provider in which the VSP is responsible for the service design and profitability. In some embodiments, the central provider receives payment from the VSP for wholesale access services. In some embodiments, the VSP workstations 4910 and 4920 only have access to the service analysis, design, beta testing and publishing functions for the devices or users "owned" by the VSP. In some embodiments, the user or device base serviced by the central provider network is securely partitioned into those owned by the central provider, those owned by the VSP, and those owned by any other VSPs.

In some embodiments, the VSP manages their devices from the VSP workstations 4910 and 4920 using device based service control techniques as described herein. In some embodiments, the VSP manages their devices from the VSP workstations 4910 and 4920 using device assisted and network based service control techniques as described herein. In some embodiments, the VSP manages their devices from the VSP workstations 4910 and 4920 using network based service control techniques (e.g., DPI techniques) as described herein.

For example, this approach is particularly well suited for "open developer programs" offered by the central providers in which the central provider brings in VSPs who offer special value in the devices or service plans, and using this approach, neither the central provider nor the VSP needs to do as much work as would be required to set up a conventional MVNO or MVNE system, which often requires some degree of customization in the network solution, the billing solution or the device solution for each new device application and/or service application that is developed and deployed. In some embodiments, the service customization is simplified by implementing custom policy settings on the service processor and service controller, and the custom device is quickly brought onto the network using the SDK and test/certification process. In some embodiments, the VSP functionality is also offered by an entity other than the central provider. For example, an MVNE entity can develop a wholesale relationship with one or more carriers, use the service controller to create the VSP capabilities, and then offer VSP services for one network or for a group of networks. In some embodiments, the service customization is simplified by implementing custom policy settings through the VSP embodiments on the network equipment, including, in some embodiments, service aware or DPI based network equipment that has a relatively deep level of service activity control capability. For example, using the embodiments described herein, and possibly also including some of the activation and provisioning embodiments, it is possible to efficiently design and implement custom ambient service plans that are different for different types of devices, different OEMs, different VSPs, different distributors, or different user groups all using the same general infrastructure, whether the service control policy implementation is accomplished primarily (or exclusively) with networking equipment (network) based service control, primarily (or exclusively) with device based service control or with a combination of both (e.g., hybrid device and network based service control).

As discussed herein, various VSP embodiments for performing one or more of analyzing traffic usage and defining, managing service profiles or plans, dry lab testing service profiles or plans, beta testing service profiles or plans, fine tuning service profiles or plans, publishing service profiles or plans, or other policy related settings can involve programming settings in the network equipment and/or programming settings or software on the device. For example, as discussed herein, the service processor settings are controlled by the service controller, which can be partitioned to allow groups of devices to be controlled. As another example, equipment in the network involved with network based service control, such as DPI based gateways, routers or switches, can similarly be programmed to utilize various VSP embodiments to implement that portion of the service profile (or service activity usage control) that is controlled by network level functions, and it will be appreciated that substantially all or all of the service activity control for certain embodiments can be accomplished with the network functions instead of the device. Continuing this example, just as the device service processor settings control functions of the service processor can have a group of devices that are partitioned off and placed under the control of a VSP, various VSP control embodiments can partition off a group of devices that have service usage activity controlled by the networking equipment, including, in some embodiments, sophisticated service aware DPI based service control equipment, to achieve similar objectives. It will be appreciated that the discussion herein regarding service controller design, policy analysis, test, publishing 4835, and the discussion regarding device group, user group and other VSP related embodiments, should be understood as applicable to various embodiments described in view of device based services control, control assistance and/or monitoring, or network based services control, control assistance and/or monitoring, or a combination of device based services control, control assistance and/or monitoring and network based services control, control assistance and/or monitoring. The various embodiments described herein related to service activation and provisioning also make apparent how the programming of network equipment service control, service control assistance and/or monitoring can be implemented prior to and following activation of the device. It will also be appreciated that the VSP capabilities described herein can also be applied to those devices that have services controlled by, provided by and/or billed by the central provider, so these techniques can be applied to central provider service embodiments, MVNO embodiments and other embodiments.

In some embodiments, an SDK is provided that allows developers, such as device manufacturers, service providers, MVNO. MVNE and/or VSPs, to develop various service processors (e.g., different versions of the service processor 115) for various devices (e.g., various types of devices 100) and corresponding service controllers (e.g., different versions of the service controller 122) for various types of services and network environments. For example, a device manufacturer can use the SDK to develop a new service processor for their new device (e.g., mobile phone, PDA, eBook reader, portable music device, computer, laptop, netbook, or any other network accessible device). The device manufacturer can also preload/preinstall their new service processor on their new devices. In this example, users of the new device would then be able to utilize the new device to access network based services using the new service processor, which communicates with the deployed new service controller, as similarly discussed herein in various embodiments. For example, the device can be pre-installed with the new service processor to provide ambient services, as similarly discussed herein in various embodiments. For example, the SDK can allow for substantially similar service processors to be installed on similar and/or different devices thereby minimizing any unnecessary differences between service processor elements for device assisted services. In some embodiments, for ambient services for a group of devices, or devices associated with a certain service provider, a set of numbers (e.g., dummy numbers) can be assigned for use for attempting access via the access network using a new device that is not yet otherwise subscribed for service. In some embodiments, the set of (dummy) numbers used for ambient access by the device can also be used for associating the device with a service provider or a type of device (e.g., eReader or some other type of network accessible device), and upon activation, the service provider assigns a real number for the activated device (e.g., which can be provided at the time of manufacture of the device, point of sale of the device, or after the point of sale of the device, such as upon activation of the device). For example, ambient access of the device can use the device ID. SIM ID, assigned phone (real or dummy) number, and/or other information associated with the device for assigning appropriate service control and service policy/profile for the device.

In some embodiments, the service processor 115 is distributed as an SDK to any device that the central provider or the VSP desires to offer services with so that the service processor 115 can be efficiently designed or adapted by the device OEM, ODM or manufacturer for operation on the service network. In some embodiments, the SDK includes either a complete set of service processor 115 agent software designed for and/or tested for the OS (Operating System) and processor set being used on the device, or a mature reference design for the OS and processor set being used on the device, or a less mature reference design (potentially for the same OS and/or processor set or a different OS and/or processor set being used on the device) that the OEM (Original Equipment Manufacturer) ports to the desired OS or processor set, or a basic set of example software programs that the OEM or ODM (Original Design Manufacturer) can use to develop software compatible with the service, or a set of specifications and descriptions (possibly forming an interoperability standard) of how to design the software to be compatible with the service. In some embodiments, the SDK includes a set of OEM lab test procedures and/or test criteria to ensure that the implementation of the service SDK is compatible with the service and will operate properly. In some embodiments, the SDK includes a set of network certification test procedures and/or test criteria to ensure that the implementation of the service SDK is compatible with the service and will operate properly. In some embodiments, the certification procedures are approved for testing by the OEM, the central provider, the VSP and/or a trusted third party. For example, the central provider is typically in control of the SDK and the test procedures, but others can be in control. In some embodiments, the test procedures are at least in part common across multiple central provider networks. In some embodiments, the SDK concept is extended to include one or more modem modules where one or more of the SDK embodiments described above is combined with a standard reference design or a standard hardware sales package for one or more modems so that the entire package forms a turn-key product that allows a device manufacturer, central provider, VSP or other entity bring new devices or device applications onto the central provider network possibly in combination with other networks in a manner that requires less engineering time and resources and less network certification time and resources than would be required in some designs that do not use this standard SDK plus module approach. For example, the standard SDK plus module product embodiments can be pre-certified and tested with one or more central providers to further reduce development time and expense. The standard SDK plus module embodiments can also use a multi-mode modem (e.g., modems based on a multimode CDMA, EVDO, UMTS, HSPA chipset as in the Gobi global multimode chipset product or modems based on other recently announced LTE plus HSPA chipsets, WiMax plus Wi-Fi chipsets or LTE plus EVDO chipsets) and a multi-mode connection manager agent so that the same SDK plus modem embodiment may satisfy a wide range of applications for many service providers around the world.

In some embodiments, at the time of manufacture, the device is associated with an MVNO. For example, the MVNO can provide an ambient service that provides a service provider clearing house, in which the device can access a network in ambient access mode (e.g., a wholesale MVNO connection through the access network) for purposes of selecting a service provider (e.g., a VSP. MVNO or carrier). Based on the service provider selection, the device credentials and/or service processor are reprogrammed and/ or new software is downloaded/installed to activate the device with the selected service provider, as described herein for provisioning the device and the account on that service provider network (e.g., the activation tracking service (ATS) can track such activation, for example, for revenue sharing purposes, as an activation incentive fee).

In some embodiments ATS is implemented entirely in the network. At the time of manufacture or at sometime during device distribution, the device master agent programs a unique credential in the device that cannot be re-programmed or removed (or is difficult to re-program or remove) and that can be recognized and recorded by the network at the time of activation or at some other time. In this manner, even if other, possibly primary, device credentials are reprogrammed or removed, there will still be a credential that is associated with the device master agent. The ATS process can then be implemented by using a database search function to scan through the database of activated devices to form a list of devices that have been activated for the purpose of master agent reconciliation. Example credentials that can suffice are MEID, hardware MAC address, and/or serial number, that are picked up and recorded by the service provider or other service entity at time of activation or before or after activation.

In some embodiments, the service processor 115 includes various components, such as device agents, that perform service policy implementation or management functions. In some embodiments, these functions include service policy or implementation verification, service policy implementation tamper prevention, service allowance or denial, application access control, traffic control, network access control services, various network authentication services, service control plane communication, device heartbeat services, service billing, transaction billing, simplified activation services and/or other service implementations or service policy implementations. It will be apparent to those of ordinary skill in the art that the division in functionality between one device agent and another is a design choice, that the functional lines can be re-drawn in any technically feasible way that the product designers see fit, and that the placing divisions on the naming and functional breakouts for device agents aids in understanding, although in more complex embodiments, for example, it can make sense to the product designer to break out device agent functionality specifications in some other manner in order to manage development specification and testing complexity and workflow.

Figure 8:
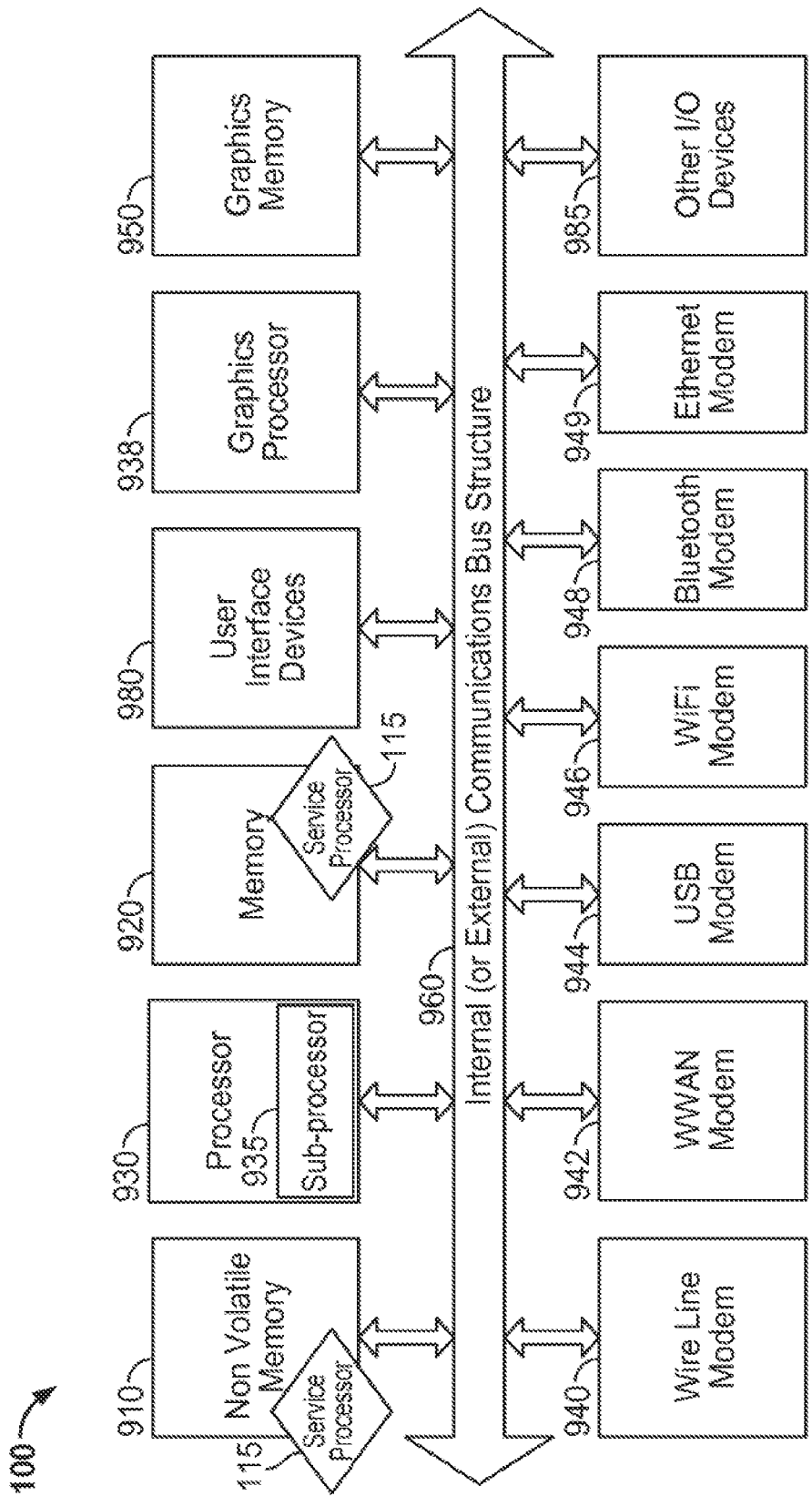
FIG. 8 illustrates a hardware diagram of a device that includes a service processor in accordance with some embodiments.

FIG. 8 illustrates a hardware diagram of a device 100 that includes a service processor 115 in accordance with some embodiments. As shown in FIG. 8, the service processor 115 is stored in a non volatile memory 910 and a memory 920 of the device 100. As will be appreciated by those of ordinary skill in the art, the present invention can operate with virtually any device architecture, and the device architectures discussed herein are examples of various implementations on certain devices (e.g., of different representations of device 100).

As shown in FIG. 8, device 100 also includes a processor 930, sometimes referred to as a CPU or central processor unit, an APU or application processor unit, a core processor, a computing device, or many other well known terms. In some embodiments, device 100 includes one or more processors and/or a multicore processor. As shown, processor 930 includes a sub-processor 935. In some embodiments, processor 930 and/or sub-processor 935 are based on an architecture sometimes referred to as a complex instruction set computer or CISC, a reduced instruction set computer or RISC, a parallel processor, a combination of two or more architectures or any other processor architecture. In some embodiments, processor 930 has a design that is based on logic and circuitry from one or more standard design library or published architecture, or includes specialized logic and circuitry designed for a given device 100 or collection of such devices. In some embodiments, a device includes more than one processor and/or sub-processor, and in such a device, one processor and/or sub-processor can have one architecture while another may have a somewhat different or completely different architecture. In some embodiments, one or more of the processors and/or sub-processors can have a general purpose architecture or instruction set, can have an architecture or instruction set that is partially general or partially specialized, or can have an instruction set or architecture that is entirely specialized. In some embodiments, a device includes more than one processor and/or sub-processor, and in such a device, there can be a division of the functionality for one or more processors and/or sub-processors. For example, one or more processors and/or sub-processors can perform general operating system or application program execution functions, while one or more others can perform communication modem functions, input/output functions, user interface functions, graphics or multimedia functions, communication stack functions, security functions, memory management or direct memory access functions, computing functions, and/or can share in these or other specialized or partially specialized functions. In some embodiments, any processor 930 and/or any sub-processor 935 can run a low level operating system, a high level operating system, a combination of low level and high level operating systems, or can include logic implemented in hardware and/or software that does not depend on the divisions of functionality or hierarchy of processing functionality common to operating systems.

As shown in FIG. 8, device 100 also includes non-volatile memory 910, memory 920, graphics memory 950 and/or other memory used for general and/or specialized purposes. As shown, device 100 also includes a graphics processor 938 (e.g., for graphics processing functions). In some embodiments, graphics processing functions are performed by processor 930 and/or sub-processor 935, and a separate graphics process 938 is not included in device 100. As shown in FIG. 8, device 100 includes the following modems: wire line modem 940. WWAN modem 942, USB modem 944. Wi-Fi modem 946, Bluetooth modem 948, and Ethernet modem 949. In some embodiments, device 100 includes one or more of these modems and/or other modems (e.g., for other networking/access technologies). In some embodiments, some or all of the functions performed by one or more of these modems are performed by the processor 930 and/or sub processor 935. For example, processor 930 can implement some or all of certain WWAN functional aspects, such as the modem management, modem physical layer and/or MAC layer DSP, modem I/O, modem radio circuit interface, or other aspects of modem operation. In some embodiments, processor 930 as functionality discussed above is provided in a separate specialized processor as similarly shown with respect to the graphics and/or multimedia processor 938.

As also shown in FIG. 8, device 100 includes an internal (or external) communication bus structure 960. The internal communication bus structure 960 generally connects the components in the device 100 to one another (e.g., allows for intercommunication). In some embodiments, the internal communication bus structure 960 is based on one or more general purpose buses, such as AMBA, AHP, USB, PCIe, GPIO, UART, SPI, I2C, Fire wire, DisplayPort, Ethernet, Wi-Fi, Bluetooth, Zigbee, IRDA, and/or any other bus and/or I/O standards (open or proprietary). In some embodiments, the bus structure is constructed with one or more custom serial or parallel interconnect logic or protocol schemes. As will be apparent to one of ordinary skill in the art, any of these or other bus schemes can be used in isolation and/or in combination for various interconnections between device 100 components.

Figure 9:
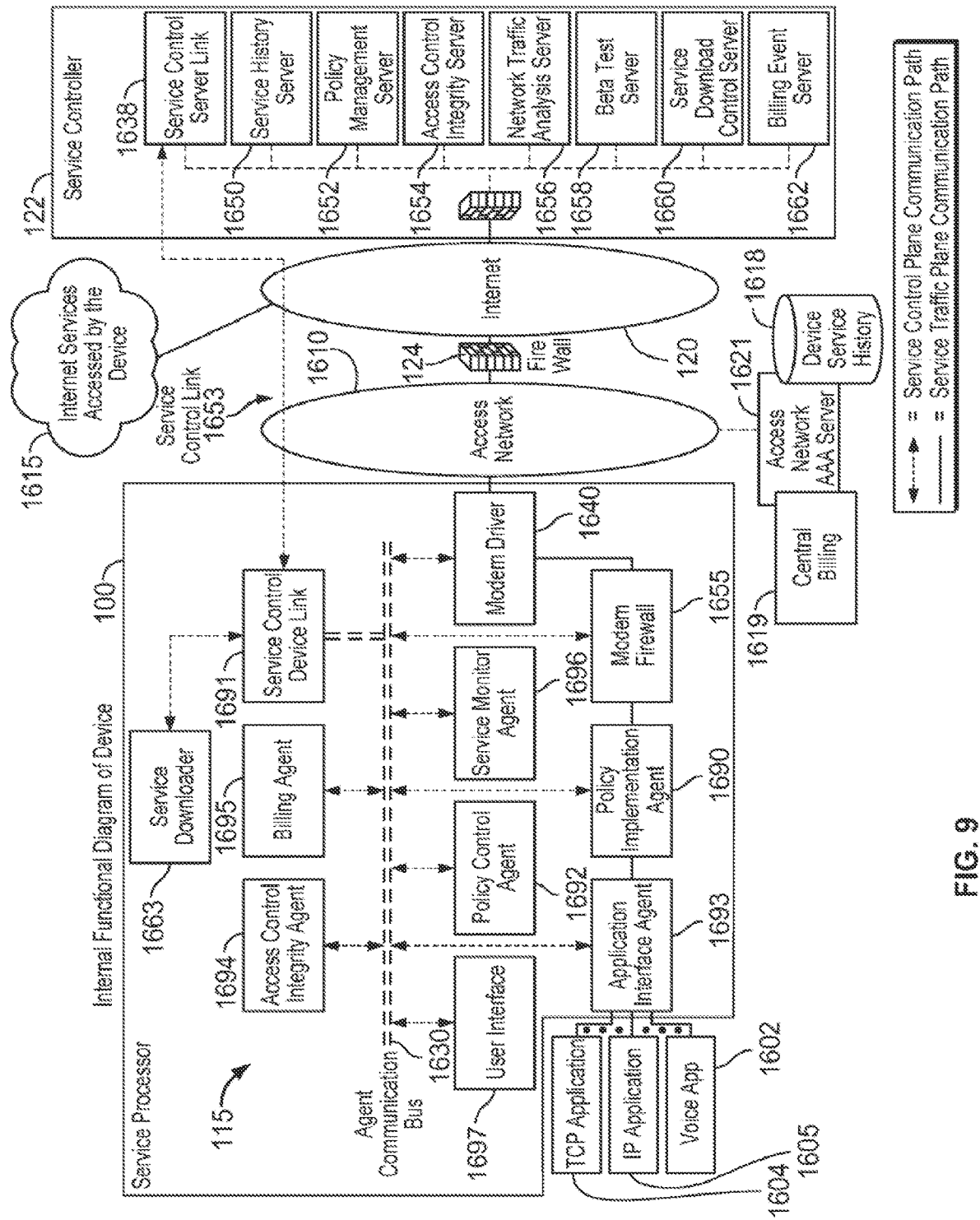
FIG. 9 is a functional diagram illustrating a device based service processor and a service controller in accordance with some embodiments.

In some embodiments, all or a portion of the service processor 115 functions disclosed herein are implemented in software. In some embodiments, all or a portion of the service processor 115 functions are implemented in hardware. In some embodiments, all or substantially all of the service processor 115 functionality (as discussed herein) is implemented and stored in software that can be performed on (e.g., executed by) various components in device 100. FIG. 8 illustrates an embodiment in which service processor 115 is stored in device memory, as shown, in memory 920 and/or non-volatile memory 910, or a combination of both. In some embodiments, it is advantageous to store or implement certain portions or all of service processor 115 in protected or secure memory so that other undesired programs (and/or unauthorized users) have difficulty accessing the functions or software in service processor 115. In some embodiments, service processor 115, at least in part, is implemented in and/or stored on secure non-volatile memory (e.g., non volatile memory 930 can be secure non-volatile memory) that is not accessible without pass keys and/or other security mechanisms. In some embodiments, the ability to load at least a portion of service processor 115 software into protected non-volatile memory also requires a secure key and/or signature and/or requires that the service processor 115 software components being loaded into non-volatile memory are also securely encrypted and appropriately signed by an authority that is trusted by a secure software downloader function, such as service downloader 1663 as discussed below (and as shown in FIG. 9). In some embodiments, a secure software download embodiment also uses a secure non-volatile memory. Those of ordinary skill in the art will also appreciate that all memory can be on-chip, off-chip, on-board and/or off-board. In some embodiments, the service processor 115 which as shown in FIG. 8 is stored or implemented in non volatile memory 910 and memory 920, can be implemented in part on other components in device 100.

FIG. 9 is a functional diagram illustrating a device based service processor 115 and a service controller 122 in accordance with some embodiments. For example, this provides relatively full featured device based service processor implementation and service controller implementation. As shown, this corresponds to a networking configuration in which the service controller 122 is connected to the Internet 120 and not directly to the access network 1610. As shown, a data plane (e.g., service traffic plane) communication path is shown in solid line connections and control plane (e.g., service control plane) communication path is shown in dashed line connections. As previously discussed, it is understood that the division in functionality between one device agent and another is based on, for example, design choices, networking environments, devices and/or services/applications, and various different combinations can be used in various different implementations. For example, the functional lines can be re-drawn in any way that the product designers see fit. As shown, this includes certain divisions and functional breakouts for device agents as an illustrative implementation, although other, potentially more complex, embodiments can include different divisions and functional breakouts for device agent functionality specifications, for example, in order to manage development specification and testing complexity and workflow. In addition, the placement of the agents that operate, interact with or monitor the data path can be moved or re-ordered in various embodiments. For example, as discussed below in some embodiments, one or more of the policy implementation or service monitoring functions can be placed on one of the access modems located below the modem driver and modem bus in the communication stack as illustrated in certain figures and described herein. As discussed below, some simplified embodiment figures illustrate that not all the functions illustrated in all the figures are necessary for many designs, so a product/service designer can choose to implement those functions believed to be most advantageous or sufficient for the desired purposes and/or environment. The functional elements shown in FIG. 9 are described below.

In some embodiments, the service control device link 1691 facilitates another important function, which is the download of new service processor software elements, revisions of service processor software elements, and/or dynamic refreshes of service processor software elements. There are many embodiments for such operations. In some embodiments, the software is received as a single file over the service control device link 1691. For example, the file can have encryption or signed encryption beyond any provided by the communication link protocol itself. In some embodiments, the software files are segmented into smaller packets that are communicated in multiple messages sent over the service control device link 1691. In some embodiments, once the file(s) are received, or the segmented portions of the file(s) are received, they are communicated to a service downloader 1663 for file aggregation and installation, which, in some embodiments, is performed after further measures to verify the service processor software are completed. In some embodiments, the files are sent using other delivery means, such a direct TCP socket connection to the service downloader 1663 or some other software installer, which can also involve secure transport and additional levels of encryption.

In some embodiments, the policy control agent 1692 adapts low level service policy rules/settings to perform one or more of the following objectives: achieve higher level service usage or cost objectives, reduce network control channel capacity drain, reduce network control plane server processing bandwidth, and/or provide a higher level of user privacy or network neutrality while satisfying service usage or service activity objectives. In some embodiments, the policy control agent 1692 performs a policy control function to adapt instantaneous service policies to achieve a service usage objective. In some embodiments, the policy control agent 1692 receives service usage information from the service monitor agent 1696 to evaluate service usage history as compared to service usage goals. In some embodiments, the policy control agent 1692 uses service monitor 1696 service usage or service activity history and various possible algorithm embodiments to create an estimate of the future projected service usage. In some embodiments, the policy control agent 1692 uses a future projection of service usage to determine what service usage or service activity controls need to be changed to maintain service usage goals. In some embodiments, the policy control agent 1692 uses service usage history to perform a service usage or service activity analysis to determine the distribution of service usage across service usage elements within categories, such as usage by application, usage by URL, usage by address, usage by content type, usage by time of day, usage by access network, usage by location, and/or any other categories for classifying service usage. In some embodiments, the policy control agent 1692 uses the service usage distribution analysis to determine which service usage elements or service activities are creating the largest service usage (e.g., if e-mail, social networking, or multimedia/online video application categories are creating the largest service usage).

In some embodiments, device based access control services are extended and combined with other policy design techniques to create a simplified device activation process and connected user experience referred to herein as ambient activation. In some embodiments, ambient access generally refers to an initial service access in which such service access is in some manner limited, such as where service options are significantly limited (e.g., low bandwidth network browsing and/or access to a specific transactional service), limited bandwidth, limited duration access before which a service plan must be purchased to maintain service or have service suspended/disabled or throttled or otherwise limited/reduced/downgraded, and/or any other time based, quality based, scope of service limited initial access for the network enabled device. In some embodiments, ambient activation is provided by setting access control to a fixed destination (e.g., providing access to a portal, such as a web page (e.g., for a hotspot) or WAP (Wireless Application Protocol) page, that provides the user with service plan options for obtaining a service plan for the user desired access, such as the service plan options for data usage, service types, time period for access (e.g., a day pass, a week pass or some other duration), and costs of service plan(s)). In some embodiments, service data usage of the ambient activated device is verified using IPDRs (e.g., using the device ID/device number for the device 101 to determine if the device has been used in a manner that is out of plan for the service plan associated with the device 101, such as based on the amount of data usage exceeding the service plan's service data usage limits, out of plan/unauthorized access to certain websites, and/or out of plan/unauthorized transactions). In some embodiments, service data usage of the ambient activated device is verified by setting a maximum data rate in the policy control agent 1692 and if/when it is determined that the device is exceeding a specified data rate/data usage, then the service data usage is throttled accordingly. In some embodiments, various other verification approaches are used for ambient activation purposes.

In some embodiments, the billing agent 1695 detects and reports service billing events. In some embodiments, the billing agent 1695 plays a key role in transaction billing. In some embodiments, the billing agent 1695 performs one or more of the following functions: provides the user with service plan options, accepts service plan selections, provides options on service usage notification policies, accepts user preference specifications on service usage notification policies, provides notification on service usage levels, provides alerts when service usage threatens to go over plan limits or to generate excess cost, provides options on service usage control policy, accepts choices on service usage control policy, informs policy control agent 1692 of user preference on service usage control policy, provides billing transaction options and/or accepts billing transaction choices. In some embodiments, the billing agent 1695 interacts with transaction servers (e.g., open content transaction partner sites 134) to conduct ecommerce transactions with central billing 1619.

In some embodiments, the service notification and billing interface notifies the user of expected network coverage (e.g., based on the device's current geography/location and the accessible networks for the device from that current geography/location) and displays options to the user based on the expected network coverage information. In some embodiments, the service notification and billing interface notifies the user of their current service usage at specified service usage points and displays various options to the user (e.g., service usage options and/or billing options). For example, the user's responses to the presented options are recorded (e.g., stored locally on the device at least temporarily for reporting purposes or permanently in a local configuration data store until such configuration settings are otherwise modified or reset) and reported, such as to the billing server (e.g., central billing 1619). For example, user input, such as selected options and/or corresponding policy settings, can be stored locally on the device via a cache system. As another example, the service notification and billing interface displays options to the user for how the user wants to be notified and how the user wants to control service usage costs, the user's input on such notification options is recorded, and the cost control options (e.g., and the billing agent 1695 and policy control agent 1692) are configured accordingly. Similarly, the user's input on service plan options/changes can be recorded, and the service plan options/changes (e.g., and the billing agent 1695 and policy control agent 1692) are configured/updated accordingly. In another example, the service notification and billing interface provides various traffic control profiles, such as for where the user requests assistance in controlling service usage costs (e.g., service data usage and/or transactional usage related activities/costs). Similarly, the service notification and billing interface can provide various notification options, such as for where the user wants advance warning on service coverage. In another example, the service notification and billing interface provides options for automatic pre-buy at a set point in service usage. In another example, the service notification and billing interface provides the option to choose different notification and cost control options for alternative networks or roaming networks.

As shown in FIG. 9, the service processor 115 includes a service interface or user interface 1697. In some embodiments, the user interface 1697 provides the user with information and accepts user choices or preferences on one or more of the following: user service information, user billing information, service activation, service plan selection or change, service usage or service activity counters, remaining service status, service usage projections, service usage overage possibility warnings, service cost status, service cost projections, service usage control policy options, privacy/CRM/GPS related options, and/or other service related information, settings, and/or options. For example, the user interface 1697 can collect service usage information from service monitor agent 1696 to update the local service usage counter (and/or, alternatively, the service usage information is obtained from the service controller 122) to update user interface service usage or service cost information for display to the user. As another example, service billing records obtained from central billing system 1619 can be used to synchronize local service usage counters and service monitor agent 1696 information to perform real-time updating of local service usage counters between billing system 1619 synchronizations. As another example, the user interface 1697 can display options and accept user preference feedback, such as similarly discussed above with respect to user privacy/CRM/GPS filtering, traffic monitoring and service controls. For example, the user interface 1697 can allow the user of the device to modify their privacy settings, provide user feedback on service preferences and/or service experiences, modify their service profiles (e.g., preferences, settings, configurations, and/or network settings and options), to review service usage data (e.g., based on local service usage counters and/or other data monitored by the service processor 115), to receive various events or triggers (e.g., based on projected service usage/costs), and/or the user interface 1697 can provide/support various other user input/output for service control and service usage.

In some embodiments, by providing the service policy implementation and the control of service policy implementation to the preferences of the user, and/or by providing the user with the option of specifying or influencing how the various service notification and control policies or control algorithms are implemented, the user is provided with options for how to control the service experience, the service cost, the capabilities of the service, the manner in which the user is notified regarding service usage or service cost, the level of sensitive user information that is shared with the network or service provider entity, and the manner in which certain service usage activities may or may not be throttled, accelerated, blocked, enabled and/or otherwise controlled. Accordingly, some embodiments provide the service control to beneficially optimize user cost versus service capabilities or capacities in a manner that facilitates an optimized user experience and does not violate network neutrality goals, regulations and/or requirements. For example, by offering the user with a set of choices, ranging from simple choices between two or more pre-packaged service control settings options to advanced user screens where more detailed level of user specification and control is made available, some embodiments allow the service provider, device manufacturer, device distributor, MVNO, VSP, service provider partner, and/or other "entity" to implement valuable or necessary service controls while allowing the user to decide or influence the decision on which service usage activities are controlled, such as how they are controlled or throttled and which service usage activities may not be throttled or controlled in some manner. These various embodiments allow the service provider, device manufacturer, device distributor, MVNO, VSP, service provider partner, or other "entity" to assist the user in managing services in a manner that is network neutral with respect to their implementation and service control policies, because the user is making or influencing the decisions, for example, on cost versus service capabilities or quality. By further providing user control or influence on the filtering settings for the service usage reporting or CRM reporting, various levels of service usage and other user information associated with device usage can be transmitted to the network, service provider, device manufacturer, device distributor, MVNO. VSP, service provider partner, and/or other "entity" in a manner specified or influenced by the user to maintain the user's desired level of information privacy.

As shown in FIG. 9, the service processor 115 includes the service downloader 1663. In some embodiments, the service downloader 1663 provides a download function to install or update service software elements on the device. In some embodiments, the service downloader 1663 requires a secure signed version of software before a download is accepted. For example, the download can require a unique key for a particular service downloader 1663. As another example, the service downloader 1663 can be stored or execute in secure memory or execute a secure memory partition in the CPU memory space. Those of ordinary skill in the art will appreciate that there are a variety of other security techniques that can be used to ensure the integrity of the service downloader 1663.

In some embodiments, improved and simplified processes for provisioning a device or user for service on a central provider network, an MVNO network or a virtual service provider (VSP) on the central provider network are provided. In some embodiments, provisioning includes one or more of the following: a process or result of assigning, programming, storing or embedding into the device and/or network a set of credentials, or otherwise providing the credentials to the user; the credentials being at least in part carried on the device or with the user; and/or at least a portion of or a counterpart to the credentials being stored or recognized by the network so that the various network elements responsible for admitting the device access to the appropriate service activities do so once the device or user service is active.

As an example, as discussed herein, the credentials can include one or more of the following: phone number, device identification number. MEID or similar mobile device identifier, hardware security device ID, security signature or other security credentials, device serial number, device identification and/or credential information via security hardware such as a SIM, one or more IP addresses, one or more MAC addresses, any other network address identifier, embedded device descriptive information block (static or programmable), security key, security signature algorithms, passwords or other secure authorization information, service processor (or similar device client or agent software) identifier or settings or version, device type identifier, browser (e.g., http, https, WAP, other browser client) header information or similar identifier, browser token information or similar identifier, browser cookie information or similar identifier, embedded browser instructions, portal-client (e.g., interface or communication agent that connects to a network portal used at least in part for provisioning or activation for the device or by the user) header information or similar identifier, portal-client token information or similar identifier, portal-client cookie information or similar identifier, embedded portal-client instructions, service provider, OEM, master agent (service distributor), VSP, device service owner identifier, distributor or master agent, and/or any information the network can use to authorize network admission, provision the device, provision the network, activate service, authorize, associate or enable the device with a provisioning sequence, associate or enable the device with one or more service profiles, associate or assist the device with an activation sequence, associate or enable the device with an ambient profile or service experience, associate or enable the device with one or more service plans or service capabilities, associate the device with a service provider or service owner, associate the device with an OEM or master agent, associate the device with a distributor or master agent, or associate the device with a device group, user group or user.

In some embodiments, provisioning includes assigning, programming or embedding into the device and/or network the information to define the level of service activity, referred to as a service profile, that the device is authorized to receive. In some embodiments, provisioning also includes establishing the device settings and/or network settings to define an ambient activation experience in which the device user receives a set of services after (e.g., within a short period of time after) purchasing or otherwise obtaining or installing the device whether the device has or has not been registered and activated with the device user or device owner.

In some embodiments, the ambient experience is the user experience that is available at the time the device is sold in the event the user has not yet signed up for a service plan. For example, the ambient experience is defined by an ambient service profile, an ambient service plan and/or the other service usage activity control policies in effect in the network, on the device, or a combination of both. For example, if the device service processor is used in large part to define the ambient service profile, then the initial provisioning and activation settings in the service processor, and possibly the service controller, can define the user service upgrade offering choices, network destination access control possibilities, traffic control policies, mobile commerce transaction capabilities (e.g., which transaction websites. WAP sites or portals the user can access to purchase information, content, music, games and/or eBooks), possibly free news or weather or other modest bandwidth Internet services that are provided free of charge to entice the user into using/upgrading the service or using the transactions or viewing advertisements, what advertisements are displayed to the user or what advertisement based websites the user is exposed to, certain applications may have access while others are blocked (e.g., Internet based text services have access but email downloads do not), or other example service capabilities. It will be apparent to one of ordinary skill in the art that allowing all of these services, and blocking other ambient user service attempts (e.g., unpaid large file size Internet downloads or uploads or movie viewing or other access that would consume bandwidth and cause the ambient service to be a potential source of losses for the service provider) is made possible by the service profile control capabilities of the service processor and/or the service controller. The bill by account embodiments, as discussed herein, in which each service activity can, for example, be separately tracked with the service monitor and other agents and server functions to produce a billing offset that allows categorization and mediation of different billing entities (accounts) provides the capability for the service provider to individually account for the costs of each ambient service element. This allows business models wherein the free access to the end user is paid for or partially paid for by one or more service provider partners who are billed for service access using the bill by account capabilities (e.g., the transaction partners pay for user access to their transaction experience and perhaps pay a revenue share for transaction billing, the advertising sponsored website partners pay for their access service share).

In some embodiments, automated provisioning and activation includes automation of one or more of the following functions: (1) programming device credentials or partial credentials and recording them in a database (or providing same when they are programmed into the device), (2) associating these credentials with the proper provisioning and/or activation actions to be taken on the device and in the network, (3) directing the device to the proper activation function (e.g., activation server) sequence when it attempts to connect to the network, (4) completing provisioning of the device, (5) programming the AAA, billing system, gateways, mobile wireless center and other network equipment to the proper initial device service control settings, and (6) establishing a service account for the device.

In some embodiments, improved processes for activating service for a device or user with a network service provided by a central provider network, an MVNO network or a VSP on the central provider network are provided. In some embodiments, activation includes one or more of the following: a process or result of associating a service account with device or user credentials; with the service account potentially further being associated with a service profile defining the service activities that the device is authorized to access; creating or updating a service usage or billing record and associating it with the service account to create a service plan; and/or initiating service to the device or user in which the network equipment allows access to the appropriate level of service activities. In some embodiments, VSP embodiments include the provisioning and activation apparatus embodiments of any or all forms.

In conventional mobile device provisioning systems, the provisioning and activation process required to create a user service account and enable the device to access the desired level of service activities can limit mass market, low cost or user friendly applications of the device or service, because the process can often be cumbersome, time consuming and/or expensive for the service provider, service owner, master agent (service distributor), MVNO, VSP and/or user. Accordingly, the various embodiments for provisioning and activation described herein simplify the provisioning and activation process for mobile devices. In some embodiments, provisioning and activation for the device and/or the network accommodates a wide variety of device types and service profile types, with the capability to perform the provisioning and activation at a number of points in the manufacturing, distribution, sales and usage progression for the device, and the ability to either pre-activate before first device use or very quickly activate during first device use (or during some later use of the device).

In some embodiments, as described herein, the term provisioning generally refers to those actions/processes associated with programming the device with credentials or other device settings or software installations used to later activate the device, as well as, in some embodiments, creating database entries and other credential associations in the network so that the network and/or device have the information used to recognize the device or credentials and implement the service policies in the service profile and/or service plan once the service profile and/or service plan are activated. In some embodiments, as described herein, the term activation generally refers to the process of creating or selecting the service plan and/or service profile, programming the settings that are used in each (e.g., required) network function and/or each (e.g., required) device function so that the system can properly associate the device credentials with the appropriate service activity policies, and then admitting the device onto the network. The term activation can also refer in some embodiments to the creation of a user or device service account, in some cases, with user or device owner information or billing information. In some embodiments, the process of provisioning amounts to assigning credentials to the device and programming a portion or all of the credentials on the device, entering a portion or all of the credentials in the various necessary network equipment databases so that the network components are capable of identifying the device and associating it with the network based portion of the admission, traffic processing, service monitoring, billing, service limits and other policies that are eventually defined by the service profile and service plan.

Further examples of the network based service profile policies include network access level, traffic routing, service monitoring, service limits and actions taken upon reaching service limits. Once the service profile is created and activated during the activation process, the device credentials and the associated service profile are communicated throughout the necessary network elements so that each element can implement its part of the network portion of the service profile policies. This process of propagating the service profile settings to all the required network equipment components is a portion of what is referred to herein as activation in accordance with some embodiments. In some embodiments, the activation process includes associating the credentials with the proper service plan and/or service profile, and possibly completing the process of programming the device functions and/or network functions so that the device can be admitted to the appropriate level of network services. In some embodiments, activation also includes the service processor software settings, configurations or installs for each function or agent in the service processor to implement its part of the service profile, service plan, service billing or transaction billing policies. In some embodiments, activation also includes the creation of entries in the various service account databases and/or billing databases to create a user account or device owner account for the purpose of managing the user choices for service plan and other account information storage and management aspects, such as maintaining status information, maintaining the central service profile configuration, conducting reconciliation and billing exchanges, service usage history, and/or account history.

In some embodiments, the term credentials generally refers to the set of information parameters that the network and/or device uses (e.g., requires) to admit the device onto the network and associate it with the appropriate service profile and/or service plan. For example, the credentials can include one or more of the following: phone number, device identification number, MEID or similar mobile device identifier, hardware security device ID, security signature or other security credentials, device serial number, device identification and/or credential information via security hardware such as a SIM, one or more IP addresses, one or more MAC addresses, any other network address identifier, embedded device descriptive information block (static or programmable), security key, security signature algorithms, passwords or other secure authorization information, service processor (or similar device client or agent software) identifier or settings or version, device type identifier, browser (e.g., http, https, WAP, other browser client) header information or similar identifier, browser token information or similar identifier, browser cookie information or similar identifier, embedded browser instructions, portal-client (e.g., interface or communication agent that connects to a network portal used at least in part for provisioning or activation for the device or by the user) header information or similar identifier, portal-client token information or similar identifier, portal-client cookie information or similar identifier, embedded portal-client instructions, service provider. OEM, master agent (service distributor). VSP, device service owner identifier, distributor or master agent, and/or any information the network can use to authorize network admission, provision the device, provision the network, activate service, authorize, associate or enable the device with a provisioning sequence, associate or enable the device with one or more service profiles, associate or assist the device with an activation sequence, associate or enable the device with an ambient profile or service experience, associate or enable the device with one or more service plans or service capabilities, associate the device with a service provider or service owner, associate the device with an OEM or master agent, associate the device with a distributor or master agent, or associate the device with a device group, user group or user. In some embodiments, at least some of the credentials are unique to the device, and, in some embodiments, groups of devices share one or more aspects of the credentials. In some embodiments, the term permanent credentials generally refers to the set of credentials that include at least a subset that are intended to be assigned to a device or user on a permanent basis. In some embodiments, the term temporary credentials generally refers to the set of credentials that include at least a subset that are intended to be assigned to a device or user on a temporary basis. In some embodiments, temporary credentials are eventually replaced by permanent credentials. In some embodiments, at least some elements in the temporary credentials (e.g., phone number and/or access or authorization security credential) are used for more than one device. In some embodiments, the temporary credentials are recycled from one or more devices and used for one or more other devices, for example, when they remain unused for a period of time or when they are replaced with permanent credentials on one or more devices. It should not be inferred from the term permanent credentials that permanent credentials are never recycled, for example, when the user discontinues service or use of the credentials. Also, the term temporary credentials does not imply that temporary credentials are always temporary. In some embodiments, partial credentials or pre-activation credentials generally refer to a subset of credentials that are to gain access to limited network services for the purpose of provisioning of credentials and/or activation of a service plan or service profile. For example, prior to a phone number being assigned, a device can gain access to a limited set of network server destinations in which embedded information contained in the device (e.g., the partial credentials) is provided to the server, the server associates that information with the proper additional credentials (including the phone number) to assign to the device and/or associates the information with the proper service profile to activate service. In this example, partial credentials can include device type, OEM, service provider, VSP, device identification number, SIM, service processor configuration or some other information used by the server to determine what the credentials should be and the proper service profile.

In some embodiments, a permanent service account generally refers to the service account that is permanently associated with the user and/or device. For example, this account includes an association with the device or user credentials, user information or billing information, service profile, billing profile, network authorization status and other aspects that define the device or user service policies and billing policies. In some embodiments, the term temporary service account generally refers to a service account that is temporarily set up and associated with the device before some or all of the required permanent account information is available or entered for a device or user. For example, this account can be set up with an association with an actual user, or can be set up with a mock user or unassigned user association so that the network and billing system can recognize the credentials, authenticate the device, admit the device, provide the proper level of service activity control according to the service profile associated with the temporary service account, or collect the service activity usage information for various network and billing system accounting needs before actual user information or billing information has been entered into the network systems. For example, a temporary service account can make it possible or easier to use existing billing systems or other network systems to provide simplified provisioning, simplified activation or ambient services. A temporary service account can also become a permanent service account by replacing mock user or unassigned user information with actual user information, or a temporary service account may need to be replaced by a permanent service account when actual user information needs to be entered into the network systems, possibly including the billing or service profile databases.

In some embodiments, temporary or permanent device credentials and other information used/required for provisioning the device are generated with apparatus located at the manufacturer or in the distribution channel as discussed below. In some embodiments, the apparatus includes a local onsite server that typically shares some aspects of the provisioning information (e.g., phone number, phone number range. MEID or MEID range. SIM number or SIM number range, IP address or IP address range. MAC address or MAC address range, other secure device credential elements) with a network provisioning database. In some embodiments, the apparatus includes a server terminal, and the aforementioned portion of the credentials is generated by the network and shared with the local provisioning apparatus. In some embodiments, as will be discussed below, the provisioning credentials are in part generated in the network and shared with the device while it is connected online to an activation server (e.g., activation server 160) that is connected to the access network. Similarly, there can be activation servers connected to apparatus in the manufacturing or distribution channel that service device activation, or over the air or over the network apparatus connected to an activation server, which in turn connects to the device, can be used to accomplish activation programming of the network and device as further discussed below.

In some embodiments, when a device is provisioned and entered into the network provisioning database, it is associated with the automatic provisioning and/or activation sequence the device is intended to go through once it connects to the network or to the apparatus that will complete the process. In some embodiments, one or more device parameters (e.g., service owner, device type. OEM, plan type. IP address, security credential and/or software version) are used to determine what the appropriate network provisioning steps and/or settings are for completing the provisioning and/or activation process, and this association information is stored in the network provisioning database for propagation of the provisioning profiles or activation profiles to the various network equipment elements. In some embodiments, the network provisioning database is provided (e.g., in the network) that associates the pre-activation provisioning information (e.g., generated, as described herein, at time of manufacture, sometime during distribution, by the user on a website by a sales associate or other activation assistant, or by the network when a new device enters the automatic activation process). For example, the pre-activation provisioning information informs the network whether or not to let the device onto an activation sequence when the device attempts access, and in some cases, also instructs the network to direct the device to a specific activation sequence including, for example, an activation server (or other activation sequencing apparatus) sequence as described herein. In some embodiments, a central database is queried by other network equipment or the central database is included in one or more of the network elements (e.g., the AAA server and/or billing system, mobile wireless center 132), or the database is copied in pail or in whole in various network elements (e.g., the central database, AAA server, mobile wireless center, billing system and/or gateways).

In some embodiments, propagating the network equipment provisioning information for a given device or group of devices is accomplished with a network provisioning system that has access to the network provisioning database and is capable of programming the appropriate network equipment. In some embodiments, this network equipment is referred to as "network management" equipment or "network provisioning" equipment. In some embodiments, there are several functions that take part individually or in concert, including, for example, the AAA server 121, service controller 122 (either with device based/assisted services through the service processor related embodiments or with network only embodiments as described herein), the mobile wireless center 132 (e.g., including the home location register (HLR) or other similar function referred to by other industry terms), the activation server(s) 160, other network provisioning or management equipment attached to or associated with the billing database system, and/or some other equipment apparatus. In some embodiments, the local database on the device, database in the AAA server and/or database elsewhere in network is provisioned to inform the gateway of the process for handling the pre-provisioned device according to, for example, the credentials. For example, if the device is not recognized or not authenticated onto the access network as an activated device with associated active service profile and/or service plan, the device connection or communication can be directed (or routed) to a generic activation server that provides an activation sequence that is not necessarily determined by one or more of the specific device credential elements, partial credential elements, device profile or partial device profile that define something specific about the activation sequence for the device. In another example, in which the device is not recognized or authenticated as an activated device with associated service profile and/or service plan, the device can be directed (or routed) to an activation service (or other activation sequencing apparatus) that uses some part of the credentials or range of partial credentials or a portion of a partial or complete device profile to determine a desired pre-determined device specific or device group specific activation sequence that is implemented by a specific activation service sequence or other activation sequence apparatus. In another example, in which the device is not recognized or authenticated as an activated device with associated active service profile and/or service plan, a portion of the device credentials or partial credentials can be used as a look-up index into a database that determines what the specific device activation sequence should be, and the device can be directed (or routed) to a specific activation server sequence or other activation sequencing apparatus.

In some embodiments, a database in the AAA server or database elsewhere in network is provisioned to inform the gateway what to do with a pre-provisioned device according to the credentials. For example, devices can be authenticated (for activated devices), routed to activation servers (or other activation sequencing apparatus) or denied access. In some embodiments, the AAA server (and/or other network elements) provide the above discussed look-up function for the above gateway description in which a lookup database, locally stored or stored in a central database, is queried to provide secondary routing information to the specific or generic activation servers.

In some embodiments, the pre-provisioned database is located in the billing system. In some embodiments, the billing system accesses the pre-provisioned database (e.g., stored on the billing system or another network element) for the purpose of setting up temporary accounts or permanent accounts and associating those accounts with pre-activation status, activated free ambient or activated paying customer.

In some embodiments, for zero activation, all the required pre-provisioning or programming of the above network elements, or others, is coordinated by the network provisioning system at some point after the partial or full device credentials have been associated with the device or reserved for a particular device type or service type. In some embodiments, the network provisioning system also coordinates the information to or from the device provisioning apparatus that is described elsewhere.

In view of the various embodiments described herein, it will be appreciated that many of the automated or background provisioning, activation and ambient embodiments described herein can be accomplished with network based approaches, device based approaches, or network/device combination/hybrid based approaches. For example, when the access control for the provisioning process is accomplished in the device (e.g., a device based approach), the activation server can be located anywhere on the Internet, and the device will ensure that the activation process is conducted with the activation server while blocking other traffic from occurring. As another example, some or all of the ambient provisioning programming steps become steps to program the access control, traffic control, application control, bill by account rules, and/or other aspects in the service processor or service controller as described herein.

In some embodiments, the provisioning apparatus described herein can be a computer located in the user's home or business, and the user or an IT manager has access to a website that provides the provisioning information, in which the computer serves as the provisioning or software programming apparatus. In some embodiments, the network itself, possibly through an activation server 160, website or other interface to the device, becomes the provisioning apparatus, in some cases, with the assistance of software on the device to affect the programming of provisioning information from the network or the communication of device credentials or other information to the network. For example, this software can be a background process that runs without user interaction, a portal/widget program, a web browser based program, a WAP browser based program, and/or any other program that provides a counterpart function to the network functions effecting the provisioning (e.g., activation server). In some embodiments, the activation server either initiates a specific provisioning sequence if device software is present to assist or routes to a website for manual entry if there is no software present.

Figure 10:
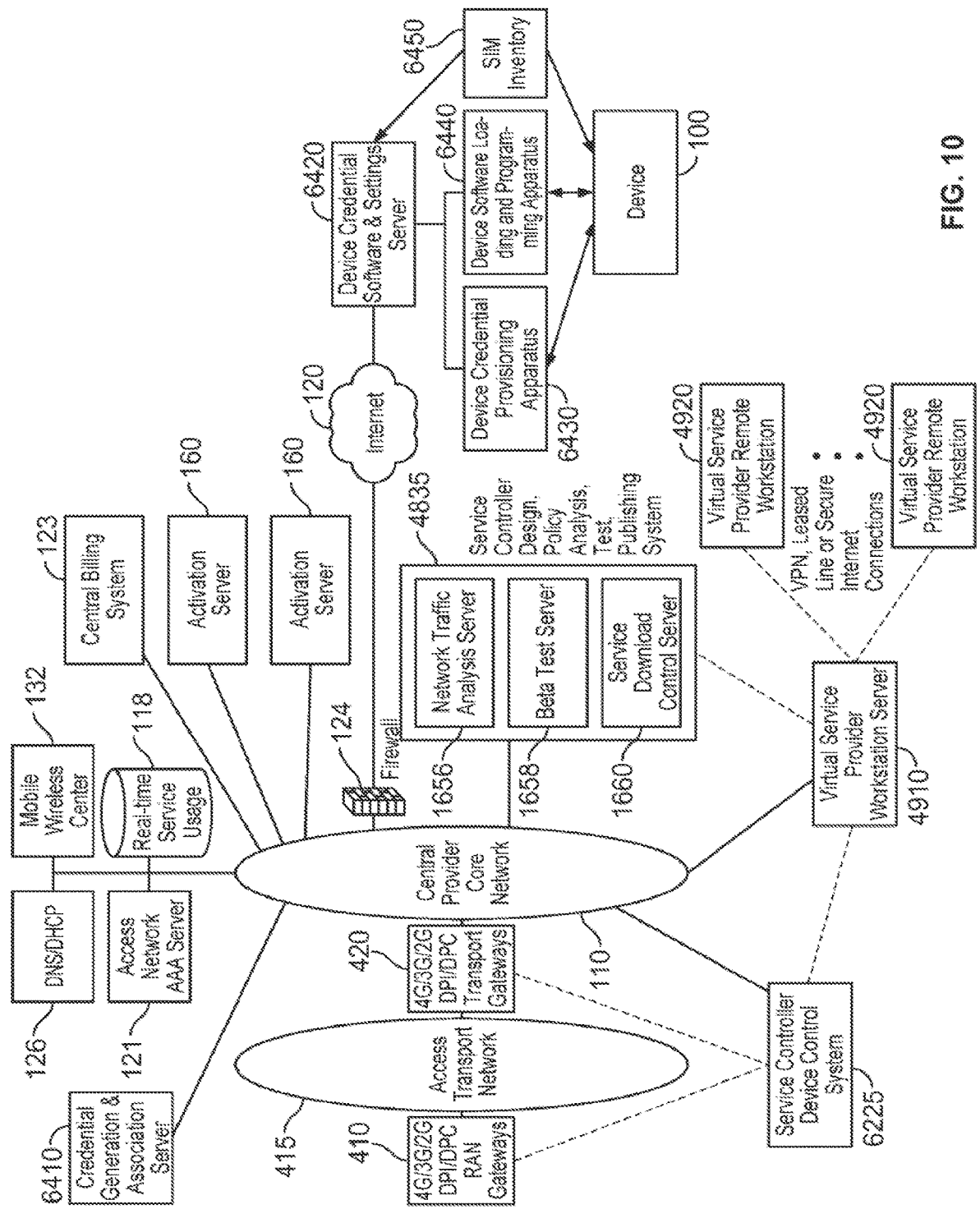
FIG. 10 illustrates a network architecture including a system located in the manufacturing or distribution chain for the device that provides the device provisioning or partial provisioning, and any pre-activation required for the device to later activate on the network in accordance with some embodiments.

FIG. 10 illustrates another network architecture including a system located in the manufacturing or distribution chain for the device that provides the device provisioning or partial provisioning, and any pre-activation required for the device to later activate on the network in accordance with some embodiments. Device credential, software and settings server 6420 provides a link to the network functions that generate or provide device credentials, and/or associate device credentials with activation profiles or pre-activation profiles in the network equipment (e.g., the billing system 123, service controller device control system 6225, gateways 410, 420, base station 125, credential generation and association server 6410, activation server 160, service download control server 1660 and/or other network apparatus). For example, the link between the device credential, software and settings server 6420 to the central provider core network equipment can be over the Internet 120 (e.g., a secure link over the Internet) as shown or over another connection such as a leased line. The device credential, software and settings server 6420 obtains credentials or partial credentials from the network apparatus that generates them, illustrated by the credential generation & association server 6410. Credential generation & association server 6410 need not be directly connected to the central provider core network 110 as shown, but can be located elsewhere (e.g., in another location connected by a secure Internet link). Credential generation & association server 6410 assigns credentials, or partial credentials, for use by device credential, software and settings server 6420. When these credentials are assigned to a device, they are programmed, loaded or otherwise associated with the device by device credential provisioning apparatus 6430, which is connected to the device wirelessly or via a wire line connection.

In some embodiments, a device software loading and programming apparatus 6440 provides software loading or device settings functions that form a portion or all of the provisioning or pre-provisioning device configuration, or form a portion or all of the device activation profile configuration, or form the device service owner, master agent or VSP device assignment or signature, and in some embodiments, using an activation tracking service (ATS) system. As discussed herein, the ATS monitors network connections and aspects of traffic that provide insight into which networks the device 100 is gaining access to, in some embodiments, for the purpose of ensuring that an OEM, master agent, device service owner or VSP is being compensated for devices that activate on a service provider network. In some embodiments, the ATS agent connects to a server counterpart that records and, in some embodiments, also analyzes the service or network connection information to make a determination of the type of access service the device is receiving and, in some cases, determine which networks the device is activated on. In some embodiments, the ATS is installed on the device in a manner that makes it difficult to tamper with or remove so that the entity that is intended to get credit for device service activation does get credit (e.g., the ATS agent can be loaded into secure memory, it can be installed with software that makes it difficult to de-install, it can be installed on the modem possibly in secure memory, it can be installed in the BIOS, it can be installed deep in the OS kernel, it can be installed with one or more additional device agents that monitor the ATS agent and alert a network function or re-install it if tampered with). The SIM inventory 6450 is provided to illustrate that, in some embodiments, hardware elements (e.g., a SIM security module as shown) or hardware configurations are also installed or manipulated in device 100 and these operations and the recording of the resulting associations form a portion of the provisioning or pre-provisioning process.

In some embodiments, at the time the credentials or partial credentials are loaded, programmed, set, installed, read from the device or otherwise recorded, they are, in some cases, all associated together in a database that allows for later identification of the device and its appropriate provisioning and/or activation process through such associations. For example, this can involve reading device parameters such as MEID. MAC address, device type, or other information that is associated with the information being loaded or configured on the device. As discussed herein, this credential configuration and association information is stored in the network equipment responsible using it to configure the network to activate the device in one of the various embodiments disclosed herein.

Some embodiments include tying some or all of the activation provisioning steps and information settings together into a database that defines a higher level activation profile for a group of users (/devices), and a server is used to perform device and equipment programming for the devices in the group, including, for example, associating the following device information into the group definition: credentials, service owner or master agent, provisioning information and/or activation profile. Some embodiments further provide for this device group information being distributed to the various network equipment components required to activate the devices as discussed elsewhere. In some embodiments, this programming and device group association is accomplished using the VSP workstation server 4910. For example, a device can be manufactured and distributed in a manner that provides flexible assignment of the device to a group that is assigned to an activation profile or a service owner.

In some embodiments, multiple activation servers 160 are provided (as shown), which illustrates that there can be multiple device activation servers 160 each with a different device activation experience and potentially controlled by a different VSP, service owner, service provider, OEM or master agent. As discussed herein, there are several ways that a device 100 can be routed to the proper activation server 160 so that the device provisioning and activation process can be completed. In some embodiments, all devices that are not activated are re-directed (or routed) to an activation server that reads one or more parameters in the device credentials. The device credential information can be determined either through the device identification information associated with the access network connection itself (e.g., MEID. IP address, phone number, security credentials, or other credentials identified for a device that gains access with the network), or with the aid of the device in a pre-arranged query-response sequence. The device can then be re-directed (or routed) to the appropriate activation server for that device, device group, device service owner or VSP. In some embodiments, the same process described above can be accomplished with a single re-direction from a service gateway 420 or 410, or another router enable network element. In some embodiments, the gateway or network element itself decodes the device credential information as described herein and performs the correct re-direct (or route) to the appropriate activation server 160 for that device. In some embodiments, the activation server 160 can be incorporated directly into the gateway 420 or 410, the base station 125 or other network component. In some embodiments, the activation server 160 can be incorporated into the service controller 122 or the service controller device control system 6225.

In some embodiments, apparatus other than the activation server are used to facilitate provisioning of credentials or partial credentials, or activation, during manufacturing or device distribution, and, for example, these apparatus can augment, supplement, compliment or replace the activation server function. Such apparatus include, for example, device programming equipment (e.g., device credential provisioning apparatus 6430, device software loading and programming apparatus 6440 or SIM inventory 6450), equipment that is networked into a central provider. MVNO or VSP database (e.g., device credential, software and settings server 6420) to gain access to provisioning information or activation information that is programmed into a device or group of devices, or to place device credential or partial credential information in a network database for later recognition, or to receive or communicate security information such as certificates for devices or SIM modules that will later be used to complete provisioning or complete activation or gain access to a network. For example, these apparatus, or any other apparatus including the activation server, can be networked into a service provider network or device database, an MVNO network or device database or a VSP network or device database. In some embodiments, programming of the device credentials or other information associated with the service processor or device is provided, so that, for example, the device can be recognized by an activation server or similar network function at a later point in time so that provisioning or activation can be completed in an automated manner, potentially with reduced or no user involvement, that provides a provisioning or activation configuration that is in some way unique for the service provider or service provider partner, device type, user group, VSP, MVNO, master agent or other entity. In some embodiments, this programming is provided in a manner that is difficult to change without the proper authorization so that the device is properly associated with the proper "service owner" or master agent (e.g., for the purpose of activation incentive payments). For example, as discussed herein, various approaches can be applied to the device credential or other settings or software provisioning so that the settings or software are secure or protected, or so that if the software is removed, replaced or modified it is reported or replace or restored. In some embodiments, VSP control of the provisioning, partial provisioning or activation of devices is provided during manufacture or at different points in the distribution channel. As discussed herein, some of these embodiments allow the central provider to offer to service partners (e.g., VSPs, MVNOs, master agents, and/or OEMs) similar types of control for device activation experience design or device service assignment control (e.g., sometimes referred to as service provider device locking so that other service providers cannot provide primary access to the device) during the manufacturing or distribution process that are possible with devices manufactured and distributed for the central service provider.

In some embodiments, the device is provisioned before the user obtains the device with permanent credentials, temporary credentials or partial credentials. In this case, the necessary credential programming of the device occurs during manufacture, at some point in the device distribution, such as at a distribution depot or in a store, or at the point of sale or point of shipment. In some embodiments, provisioning of network information as discussed above is used, and the network information is provisioned at the same time, before or after the device information is provisioned. In some embodiments, the device provisioning information is programmed with dedicated apparatus that connects to the device either with wires or wirelessly. For example, the dedicated apparatus can be local to the location where the device is being provisioned, or it can be partially or entirely networked into a database or provisioning solution located elsewhere and operated by the central provider, a VSP. OEM or other entity. For example, the apparatus to program the network portions of the provisioning information can also be networked and the operators who set up the required network programming for a device or group of devices may be in the vicinity of the servers that host the provisioning and management tools or they may network into the servers. In some embodiments, provisioning system operators have full or partial control of any device provisioning equipment associated with the entity they work for (e.g., OEM, VSP or master agent) but only have remote access via secure terminal, secure website or other techniques to network into a central provider or VSP server farm in which they control or partially control the network portion of provisioning capabilities for that subset of devices that are assigned to the entity they work for with (e.g. OEM, VSP or master agent).

In some embodiments, provisioning is accomplished over the air on the mobile access network for mobile devices, or over the wired access network or WLAN connection for wired access networks, either before the user receives the device or after the user receives the device. In some cases, the device can be connected to general purpose equipment, such as a computer to perform the programming required to complete provisioning. In the cases in which the device is provisioned at point of sale or after point of sale, the device provisioning can be triggered by a user initiated sequence, or can be initiated by an automated background sequence at any time after the device is powered on. In such cases, in some embodiments, partial credentials that include information such as device type, OEM or service provider are used to assist in determining how to complete the provisioning, and the information can also include secure information, certificate or signature programmed into the partial credentials that is required for the network to perform the provisioning of the remaining credential information in the device and possibly the network. In some embodiments, any network information used/required to provision the device or service is generated at the time the partial credentials are determined rather than beforehand.

In some embodiments, the device is activated for service before the user obtains the device with permanent credentials, temporary credentials or partial credentials, or with a permanent service account or a temporary service account. For example, in this case, the necessary steps of provisioning and activating service for the device can occur during manufacture, at some point in the device distribution, such as at a distribution depot or in a store, or at the point of sale or point of shipment. In some embodiments, the steps for activating service include one or more of the following: provision the device (e.g., with permanent, temporary or partial credentials), provision the necessary network databases and equipment to prepare them to recognize the device and associate it with the service profile and/or service plan, create or select the service account (e.g., permanent or temporary service account), select or create the service profile and/or service plan, program any elements in the device required to activate service (e.g., account ID, device aspects of the service profile and/or service plan), and program the necessary network databases and equipment with the required associations of device credentials and service profile and/or service plan policy settings. In some embodiments, the device oriented programming portions of the service activation steps occur at the same time, before or after the network oriented programming portions of the service activation steps.

In some embodiments, the device activation information is programmed with dedicated apparatus that connects to the device via a wireless or wire line connection. For example, the dedicated apparatus can be local to the location where the device is being provisioned, or the dedicated apparatus can be partially or entirely networked into a database or service activation solution located elsewhere and operated by the central provider, a VSP, OEM or other entity. For example, the apparatus to program the network portions of the activation information can also be networked and the operators who set up the required network programming for a device or group of devices can be in the vicinity of the servers that host the service activation and management tools or they can network into the servers. In some embodiments, activation server tools operators have full or partial control of any device activation apparatus associated with the entity they work for (e.g., OEM. VSP or master agent) but only have remote and partial access via secure terminal, secure website or other techniques to network into the network portion of the activation tools that are controlled by the central provider or VSP. The server tools operators can be restricted in some embodiments to providing network activation information or settings only for those devices or device groups that are assigned to the entity they work for with (e.g., OEM, VSP or master agent). For example, the device control group restriction can be accomplished with a secure database that has secure sub-partitions for one or more entities so that they cannot impact the control of one another's network activation settings but can control their own devices. In this way, a centralized set of activation tools resources controlled by a central provider, VSP or other entity can be partitioned so that different entities can have partial or full control of the activation service definition for devices or groups of devices without impact or risk to others who share the network and activation tools resources.

In some embodiments, activation is accomplished with an over the air interface to a mobile device, or over the wired access network or WLAN connection for wired access networks, either before the user receives the device or after the user receives the device. In some cases, the device can be connected to general purpose equipment such as a computer to perform the programming required to complete activation. In the cases in which the device is activated at point of sale or after point of sale, the final device activation process can be triggered by a user initiated sequence, or can be initiated by an automated background sequence at any time after the device is powered on. In such cases, some embodiments call for a temporary service account that is used to bring the device onto the network before the user has input the information necessary to create a permanent service account. In some embodiments, a temporary or permanent service account can be applied to the device at the time the device reaches the network, and the type of account, service profile and/or service plan can be influenced (e.g., partially determined or informed) or determined by information embedded in the device credentials or partial credentials, such as device type, device ID. SIM. OEM or service provider. For example, the device credentials can also include secure information, certificate or signature that can be required by the network to perform the activation steps for temporary or permanent service account status. In some embodiments, in which the device is activated in this manner before the user information is available, or before the user has selected a pay for service plan, the service profile and service plan are set up for ambient services as described herein.

In some embodiments, the device is activated during the manufacturing or distribution process, and then the activated device status is suspended. Once the temporary or permanent service account is set up, with appropriate service profile and/or service plan and temporary or permanent credentials, in some networks and billing systems the service can often be more easily resumed once suspended as compared to provisioning and activating the device from scratch. The device is then later resumed (or re-activated) when some event triggers the resume process, such as when it ships to the end user or when the end user attempts to use it. This process prevents the network from needing to manage credentials and accounts for devices that have been activated but are not yet on the network.

In some embodiments, provisioning is accomplished at least in part with temporary credentials in a manner which is automated and convenient for the user or device owner. In some embodiments, at least some subset of the temporary credential elements replaced at a later point in time by permanent credential elements in a manner that is also automated and convenient for the user or device owner. In some embodiments, the temporary credential set is pre-programmed into the device along with a temporary or permanent service account including service profile during the manufacturing or distribution process so that the device is activated with temporary credentials when it ships. In some embodiments, the aforementioned pre-programming is performed for the network via a secure set of server access equipment that networks into the network databases used to define the service profile and/or the service plan. In some embodiments, a subset of the temporary credentials is recycled once it is replaced, if a temporary service account is not activated or used after some period of time, if a permanent account is not activated or used after some period of time, or if the credentials subset is revoked from the device for some other reason.

In some embodiments, more than one device is assigned one or more elements of the temporary credentials, such as the phone number, which may be limited in supply. In some embodiments, a network will accept more than one set of temporary credentials, one or more redundant elements, for two or more different devices. In some embodiments, a device that has two or more temporary credential sets, in which at least a subset of the credential elements are different for the sets, so that if one set of credentials has elements that are already being used to access the network, then one or more reserve sets can be drawn upon to gain access to the network.

In some embodiments, the temporary credentials are used to log onto the network to conduct an over the air or over the network activation process in which an activation server reads at least a portion the device credentials to determine some aspect of how the device service profile. In some embodiments, the aforementioned over the air activation process is accomplished in the background without user intervention. In some embodiments, the over the air activation process is initiated when the user first attempts to use the device or when the user first attempts to access the network or upon user request or approval. In some embodiments, the over the air activation process is initiated using a temporary service account for the device and/or network to gain access to the network. In some embodiments, the over the air activation process is initiated after the user has entered the information required to create a permanent user account into the device or into the network. In some embodiments, the user is required to enter the aforementioned user information before using the device or using some aspect of the device. In some embodiments, the temporary service account is replaced by a permanent service account some time after the user has entered the necessary information to create a permanent account into the device or network. In some embodiments, the over the air activation process is initiated using a permanent service account assignment for the device and/or network to gain access to the network.

In some embodiments, the service profile is assigned to the device and/or network during the aforementioned over the air activation to be a pay for service profile with a free trial period. In some embodiments, the service profile assigned to the device and/or network during the aforementioned over the air activation includes pre-pay, post-pay, session based pay or pay as you go options for service. As will be apparent to one of ordinary skill in the art, various embodiments disclosed herein are particularly well suited for control or pre-pay services. In some embodiments, the service profile that is assigned to the device and/or network during the aforementioned over the air activation is an ambient service profile providing service access before all the user information is available to assign a permanent account. In some embodiments, the service profile that is assigned to the device and/or network during the aforementioned activation is an ambient service profile providing a service upgrade selection option interface to the user. In some embodiments, the service profile that is assigned to the device and/or network during the aforementioned activation is an ambient service profile providing transaction services to the user. In some embodiments, the service profile that is assigned to the device and/or network during the aforementioned activation is an ambient service profile providing bill by account functionality for the network. In some embodiments, the service profile that is assigned to the device and/or network during the aforementioned activation is an ambient service profile providing some amount of free networking or information service to entice the user to use the other ambient services. In some embodiments, the aforementioned ambient service is at least partially implemented with device based service activity control or control assistance. In some embodiments, the aforementioned ambient service is at least partially implemented by gateways, routers or switches in the network that are programmed according to the ambient access profile for the device to implement the ambient policies for network access control, routing control, traffic control or service monitoring and reporting for bill by account.

In some embodiments, activation is accomplished at least in part with a temporary service account in a manner that is automated and convenient for the user or device owner. In some embodiments, at least some subset of the temporary service account is replaced at a later point in time by permanent service account subset in a manner that is also automated and convenient for the user or device owner. In some embodiments, the temporary service account settings (e.g., including the service profile settings and/or the service plan settings) are pre-programmed into the device along with a temporary or permanent credentials set during the manufacturing or distribution process so that the device is activated with temporary credentials when it ships. In some embodiments, the aforementioned pre-programming for the network is performed via a secure set of server access equipment that networks into the network databases used to define the service profile and/or the service plan. In some embodiments, the device is suspended once it is activated but before the user is using it, and then resumed before or commensurate with the point in time that the user begins to use it. In some embodiments, some subset of the temporary service account is recycled once it is replaced, if the temporary service account is not used after some period of time, if the temporary service account is not upgraded to a permanent service account after some period of time, or if the activation is revoked from the device for some other reason. In some embodiments, more than one device is assigned to the same temporary service account. In some embodiments, a network accepts more than one device on the same temporary service account. In some embodiments, a device includes or is associated with two or more temporary service accounts, in which at least a subset of the temporary service account elements are different, so that if one account is already being used to access the network then one or more reserve accounts can be drawn upon to gain access to the network. In some embodiments, the temporary service account is associated with a temporary credentials set. In some embodiments, the temporary service account is associated with a permanent credentials set.

In some embodiments, un-activated devices are detected by the network muting equipment (e.g., service gateways or routers in hierarchical networks or base stations with embedded gateways in flat networks) and the device muting is programmed to re-direct un-activated devices to an activation server network destination. For example, the activation server can first inspect the information associated with the device to determine if the device belongs to the list of devices, device types or device groups that the network is programmed to provide access to. For example, the information used to determine this can include device type, service provider, phone number, device ID, SIM ID or configuration, secure information used to qualify the device. IP address. MAC address, user, user group. VSP, OEM, device distributor, service distributor (master agent), service processor presence or configuration, presence or configuration of other software or hardware. There can also be some activation definition information embedded in the credentials, or associated with some portion of the credentials, or programmed additionally on the device that informs the activation server as to the service profile and/or service plan and/or service account that should be established for the device. If activation information (the service profile, service plan and/or service account information) is found through association with the device credentials (e.g., device ID, phone number. IP address. MAC address, SIM or other security credentials) rather than being read directly from information embedded in the device or device credentials, then the pertinent aspects of the credentials can be used as a cross reference to look up the service plan and/or service profile information stored in a database networked to or within the activation server. The activation information can include information to define a wide variety of service plans and service profiles that when properly implemented on the network functions, and perhaps device if necessary, can provide for a wide range of service activity policies, service billing policies, transaction billing policies and service account types that can be associated with the device over the air or over the network.

In some embodiments, once the activation server has determined the activation information from the device or from a look up based on some aspect of the device credentials, then the activation server initiates the necessary network settings and billing database entries to be programmed by sending the service profile instructions to the network provisioning and activation apparatus and the service plan instructions to the billing system. In some embodiments, the activation server can then also send the any necessary service profile and/or service plan settings required for the device to a provisioning and activation support software function on the device, such as various embodiments of the service processor, so that the device provisioning and activation can be completed. The provisioning can be with permanent credentials or temporary credentials, and the service account that is set up may be permanent or temporary. In some embodiments, the activation process described above is completed perhaps before the user has entered some or all of the user information necessary to set up a permanent service account, and, in these cases, a temporary service account can be set up. In some cases, the activation process can be completed in the background before the user has completed an attempt to access the network and the service profile can be set up to provide ambient services to a temporary service account. In some embodiments, the user is required to enter the information required to establish a permanent service account prior to gaining full use of the device, either on the device, on a computer or in the store, so that by the time the user begins using the device the above activation embodiments can provide for ambient services activation with permanent account status so that the user can purchase a service upgrade or any transaction without entering any more account information.

In some embodiments, a device status is changed from a temporary service account to a permanent service account. If the device is activated with a temporary service account, and the user information is available to set up a permanent account, then if the billing system rules and interfaces allow for such, the user information can be changed from the mock information to the actual user information while maintaining the same account identifiers in the billing system. If the billing system will not allow for such, then the user information can be used to establish a new account, the device credentials can be re-associated with the new account, in some cases, after modifying one or more of the device credential parameters, and the network functions can be re-programmed as required, and, in some cases, the device can be re-programmed as required to accommodate the new permanent account.

In some embodiments, code on the device pulls a temporary or permanent set of credentials. When the credentials are pulled, the network associates the device with an ambient service profile according to one or more of the following: embedded device information identifying device type, service owner (e.g., VSP), user group, or user, or device ID is cross referenced to a database that is populated some time from manufacturing time to post sale where the database provides information identifying device type, service owner (e.g., VSP), user group, or user. The device is then re-directed accordingly (e.g., for device based this is a matter of setting the policies or loading the software for the service processor, for the network based approach this is a matter of populating the routing tables and service profile). For example, credentials can be re-cycled after a period of time, and/or some portion of the credentials can be redundant with other devices. For example, this is essentially a dynamic service for (temporarily) assigning device credentials, and the duration of the temporary credential validity for that device ID can be time limited to give the user time to activate a real account or a free trial, session limited, or a longer duration of time that is perhaps refreshed each time the device logs on. For example, the device could also already have permanent or temporary credentials but not have a service account. The above process can be used to assign a temporary or permanent service account as well. Once the service account is assigned and the appropriate service profile is propagated to the network elements, the device can then be directed to or use the appropriate activation profile service activities or the appropriate ambient service activities.

In some embodiments, the device is activated in the background in a manner that is virtually transparent to the user. For example, at some point in the distribution channel, the device is programmed to seek the activation server system described above as soon as it is turned on, or as soon as some other event occurs like the user using the device or the user attempting to gain access. When the pre-programmed event is triggered, the device connects to the network and the gateways or routers re-direct the device to an activation server, as discussed above. As also described herein, the activation server either derives information from the device that informs the server what service the device should be activated with, or the server derives that information from a database look up with a portion of the device credentials as the cross reference parameter. Once the activation server has determined the activation information from the device or from a look up based on some aspect of the device credentials, then the activation server causes all the necessary network settings and billing database entries to be configured/programmed by sending the service profile instructions to the network provisioning and activation apparatus and the service plan instructions to the billing system. In some embodiments, the activation server can then also send the any necessary service profile and/or service plan settings required for the device to a provisioning and activation support software function on the device, such as various embodiments of the service processor, so that the device provisioning and activation can be completed. For example, the provisioning can be with permanent credentials or temporary credentials, and the service account that is set up can be permanent or temporary.

In some embodiments, background activation is performed using the aforementioned activate/suspend process. At some point in the distribution channel, the device is programmed to seek to resume service as soon as it is turned on, or as soon as some other event occurs like the user using the device or the user attempting to gain access. When the pre-programmed event is triggered, the device attempts to connect to the network and the gateways or routers re-direct the device to an activation server as described herein. As also described herein, the activation server either derives information from the device that informs the server that the device is ready to resume service, or the server derives that information from a database look up with a portion of the device credentials as the cross reference parameter. Once the server is aware of this information, it sends a message to resume service to the billing system, or other network function that controls the suspend/resume function, and the service is resumed.

In some embodiments, background activation is performed as described below. The service processor and the credentials are pre-programmed during the manufacturing or distribution process to provide the desired service profile support and/or billing profile support for the desired initial ambient service. As described herein, this programming can be accomplished with dedicated apparatus at the manufacturer or distribution depot. Furthermore, the party responsible for defining the service (e.g., typically the central provider. OEM. VSP, distributor or master agent) can network into the service processor programming apparatus to control service processor and/or credential programming for all or a subset or group of the devices or device types locally available. The service processor enabled device is programmed to seek the activation server system described above as soon as it is turned on, or as soon as some other event occurs like the user using the device or the user attempting to gain access. In some embodiments, the activation server is the access control server previously discussed or the access control server can act in concert with another server that performs the activation function. When the pre-programmed event is triggered, the device connects to the network and the gateways or routers re-direct the device to the activation server. As also described herein, the activation server can communicate with the service processor to verify the service processor security credentials, agents and configuration.

In some embodiments, if the activation server determines that the pre-programmed settings stored in the service processor need to be modified to provide the latest version of the desired service, or if the service processor agent software needs to be updated, then this can be accomplished prior to completing the activation process. Once the service processor configuration and settings are confirmed, the activation server causes the necessary network settings and billing database entries to be programmed by sending the service profile instructions to the network provisioning and activation apparatus and the service plan instructions to the billing system. Given that the service processor can perform some or much of the service activity control or control assistance, the service control options are generally larger than without the service processor, and there can be less configuration to perform for other networking equipment to complete the provisioning and activation process. The provisioning can be with permanent credentials or temporary credentials, and the service account that is set up can be permanent or temporary.

In some embodiments, pre-programming and pre-activation of devices with temporary credentials and a temporary service account are used to ship devices that are pre-activated. Given that the credentials are temporary and can be recycled when the permanent credentials are assigned, concerns about using up too many pre-assigned credentials are reduced. In embodiments in which a portion of credentials elements can be used for multiple devices, this concern is further reduced. If there is a concern about too many activated devices being assigned that are not actually active and generating service revenue, then the suspend/resume process discussed herein can be employed. In some embodiments, the temporary credentials and/or temporary account can be replaced with permanent credentials and/or account assignments at any time as follows. When a pre-programmed event in the device is triggered, then the device initiates a program that seeks the aforementioned activation server or another server that has the capability of fulfilling the device request to exchange the temporary credentials for permanent credentials and/or exchange the temporary account for a permanent account. The event that triggers the credential exchange can be the same or different than the event that triggers the service account exchange. The service account exchange can typically be triggered by the point in time that the user enters account information.

In some embodiments, the aforementioned ambient service is partly implemented with a combination of the techniques for pre-provisioning during manufacturing or distribution and at least partially implementing the service activity control (e.g., access control, routing policy, traffic control, usage limits, and/or policy for usage limit overage) required for implementing ambient using the service policy provisioning capabilities in the data path gateways, routers or switches in the network. The gateways, router or switches are pre-programmed as discussed herein according to the ambient access profile for the device to implement the ambient policies for network access control, routing control, traffic control or service monitoring and reporting for bill by account. In some embodiments, the provisioning credential elements are not all pre-programmed before the device ships, but a subset of the credential elements are programmed using the activation server technique discussed herein. This over the air automated provisioning is combined with the activation server reading the device credentials to derive the service activity control settings for the gateways, routers or switches that will result in the desired ambient services activity controls.

In some embodiments, the aforementioned ambient service is implemented with a combination of the techniques for pre-activation during manufacturing or distribution and at least partially implementing the service activity control (e.g., access control, routing policy, traffic control, usage limits, and/or policy for usage limit overage) required for implementing ambient using the service policy control capabilities in the data path gateways, routers or switches in the network. The gateways, router or switches are programmed to recognize the pre-activated device credentials as discussed herein according to the ambient access profile for the device to implement the ambient policies for network access control, routing control, traffic control or service monitoring and reporting for bill by account. In some embodiments, the device activation profile and/or service account are not pre-programmed in the network and/or the device before the device ships but the activation profile and/or service account are programmed using the activation server technique discussed herein. This over the air automated provisioning is combined with the activation server reading the device credentials to derive the service profile activity control settings for the gateways, routers or switches that results in the desired ambient services activity controls.

In some embodiment, a VSP capability is enabled by providing a secure network connection to the service policy settings tools that define the device pre-provisioning settings, the device pre-activation service profile settings, the network equipment service activity control policy settings (e.g., access control, routing policy, traffic control, usage limits, and/or policy for usage limit overage), and the network billing system database. By providing server tools that enable all these settings to be controlled (or perhaps only observed in the case of the billing system) by a secure workstation or secure website interface that networks into the equipment that programs the settings, and providing for a secure partitioning of the devices that can be controlled by a given secure workstation or secure website interface, a central provider can provide VSP services to multiple entities who all have different device and service plan combinations that they desire different flavors of ambient services for. These techniques can also be extended beyond ambient to any device/service profile/service plan combo the VSP desires to create. In some embodiments, the networking equipment is implemented to secure device service group domains in which the service policies for a group of devices can be controlled. In some embodiments, the pre-provisioning and pre-activation techniques are substituted with the over the air activation server techniques discussed herein, and a secure device group partition capability is provided in the activation server as well so that the activation server device group partition control capabilities can be added to the secure device group partition control capabilities of the network gateways, routers and/or switches, the device programming tools and the billing system to form a VSP partition solution for over the air activation of various device/service plan combinations. In some embodiments, the device groups are relatively small so that beta trials of arbitrarily large or small size can be designed and implemented by defining a service control group as described above, and after fine tuning and perfecting the beta trial settings the device group can be expanded to publish the automated provisioning and activation service settings to a larger user or device group for production services.

In some embodiments, device based service activity control assistance (e.g., based on the various service processor embodiments described herein) is combined with simplified provisioning techniques described herein so that service processor enabled devices can be shipped with pre-provisioned credentials (temporary or permanent) or can obtain credentials in an automated manner that is convenient and efficient for the user or device owner. In some embodiments, the service processor embodiments in combination with the manufacturing and supply chain credentials and provisioning apparatus described elsewhere provide various approaches for provisioning pre-provisioned service processor enabled devices. In some embodiments, the service processor embodiments in combination with the activation server variants discussed above provide various approaches for over the air or over the network simplified post-sale provisioning for service processor enabled devices. For example, these embodiments can also be used for ambient services given that as discussed herein the service processor has capability to implement service profile policies for deep control of ambient service activity control.

In some embodiments, provisioning includes provisioning partial device credentials that include, for example, a secure certificate that is used to authorize full credential provisioning and/or activation by performing a process for a later look-up/validation of the full device credentials. For example, the look-up/validation of the full device credentials can be performed by a gateway, router or similar network device that re-directs to a provisioning server and/or activation server or other network components that either: (1) recognizes the partial credentials that serve as a reference to direct the device communication to a specific provisioning/activation server determined from the partial credentials; or (2) does not recognize the partial credentials, and directs the device communication to a less specific provisioning/activation server that is not necessarily associated with a reference to the partial credentials.

In some embodiments, if the partial device credentials (e.g., temporary or permanent credentials) are being used for provisioning, then the partial credentials are read (e.g., and/or other credentials can be looked up based on the partial credentials as described above). The device is authorized if the proper credentials and/or secure certificate is present. The device credential provisioning is then completed (e.g., using activation server commands or settings to a device based software and/or hardware element), and the credentials are, in some cases, also communicated to the various network equipment elements.

In some embodiments, if the partial device credentials are being used for activation, then partial or full device credential provisioning is performed, such as described above. A service account (e.g., temporary or permanent service account) is created or looked up based on the partial device credentials (e.g., a user account associated with the device through embedded partial or full credentials or a look up process, or based on a dynamically created/assigned temporary account associated with the device through embedded partial or full credentials). An initial service profile and, in some cases, an initial service plan (e.g., service control policy settings including a billing profile) are determined from embedded information and/or using a look up process (e.g., based on the device type and/or partial or full device credentials). The device is then programmed to enable access with the service profile and plan, and, in some cases, the various network components/elements are programmed to enable the service profile and plan, and, in some cases, proper entries in the billing system are made or confirmed, and the device credentials are, thus, activated for service.

In some embodiments, the above described provisioning and/or activation processes are performed with the provisioning server(s) and/or activation server(s) in the background with reduced, minimal or no user input required, for example, after the device is sold to the user and the user turns on the device so that by the time the user attempts to access the service using the device, the provisioning and/or activation process is already completed.

In some embodiments, device based service activity control assistance (e.g., based on the service processor embodiments) is combined with simplified activation techniques described herein so that service processor enabled devices can be shipped with pre-activated accounts (temporary or permanent), or can obtain activated account status in an automated manner that is convenient and efficient for the user or device owner. In some embodiments, the service processor embodiments in combination with the manufacturing and supply chain activation and provisioning apparatus described elsewhere provide various approaches for pre-activated service processor enabled devices. In some embodiments, the service processor embodiments in combination with the activation server variants discussed above provide various approaches for over the air or over the network simplified post-sale account activation for service processor enabled devices. These embodiments can also be used for ambient services given that as discussed herein the service processor has capability to implement service profile policies for deep control of ambient service activity control.

As discussed herein, in some embodiments for activation, the network AAA (or other network function) either recognizes one or more aspects of a pre-activated device credentials and routes the pre-activated device communication to an activation server that is appropriate for that device (routing information either derived through look up of the credential aspect or by obtaining the required information directly from the credential itself), or the AAA (or other network function) does not recognize the credentials and routes the device communication to an activation server for unrecognized device credentials. In either case, in some embodiments, one or more of the credential aspects can then be used to perform a secondary determination of what provisioning and/or activation sequence to perform in association with the device, or which activation server sequence the device should be directed to. For example, one or more device credential aspects can be read and used as a cross-reference to determine a routing for the device communication (or the information required for routing can be in the device credential information itself) so that the device can be routed to the appropriate activation server sequence.

In some embodiments, an activation server sequence can be determined at least in part by using a browser server or a portal (e.g., http server, https server, WAP server or another standard or custom protocol server for a browser, embedded or automated browser or a portal client in the device). In some embodiments, the browser server is an http or https server. The pre-activated device communication can be routed to the https server in a manner similar to that described above, and the server can read the information embedded in the https communication to determine the device credential information required to initiate the correct provisioning completion and/or activation sequences. For example, the https header information, tokens, cookies or other secure information communicated over https from a secure embedded client on the device (or user) can either provide the activation server with the information required to perform the cross-reference to an appropriate provisioning and/or activation sequence, or the https embedded information or the embedded client (or user) information can instruct the activation server on which services the device is to be provisioned and/or activated on and any necessary device or user information (e.g., device owner and/or billing information) can be exchanged, or the device might be provisioned and/or activated first on a free ambient service with temporary or permanent credentials or account.

In some embodiments, the service processor can be combined with the pre-provisioning and pre-activation techniques described above to create an ambient service solution that will work on roaming networks in which the central provider or VSP has no control or minimal control over the network elements. For example, the device includes a service processor pre-programmed for ambient service activity control as discussed herein, and the device credentials and other settings are pre-provisioned and pre-activated for the central provider network, all of which is described in numerous embodiments disclosed herein. Provided that the service provider has a roaming agreement with other service providers, or provided that the device may gain access to the roaming network, when the device is roaming it will be capable of ambient connectivity with bill by account functionality and all the other features of ambient. Furthermore, as also discussed herein, the ambient service activity control policies can be different for different roaming networks to accommodate the varying network costs and performance. Also, for example, it would be permissible to sign up for initial services or additional upgrade services with the central provider while roaming on the roaming partner network. One of ordinary skill in the art will appreciate that this also allows for creating a VSP or MVNO for the purpose of creating a clearing house for central provider service activations according to geography or user choice. By using a global multi-mode modem module, and maintaining service agreements with a multitude of carriers, the MVNO or VSP can provide consistent ambient services across multiple carriers and multiple geographies while still maintaining a good degree of cost control. Using bill by account capabilities, it is also possible to have an activation agreement where a roaming service provider agrees to refund the cost of ambient roaming. From the ambient service platform, the VSP or MVNO can then provide service purchase options to the user based on the carrier networks available to the device, or the VSP or MVNO can broker the user off to any of the carriers by activating the device onto the carriers main central provider service.

Accordingly, these embodiments provide flexible capabilities for activating a device or group of devices with a broad range of service profiles and service plans by simply programming the device with the proper credentials at some time during manufacturing or distribution, or simply programming a database associated with the network so that a portion of the device credentials can be used to look up the desired service profile and service plan. For example, various activation embodiments described herein are highly convenient for the end user and need not, in many cases, involve any human intervention.

The service processor 115, service controller 122, policy implementation and/or profile implementation and various embodiments disclosed herein are applicable to conventional communication products as well as machine to machine applications. For example, if the machine to machine device includes a service processor 115 with an activated account, then the service profile settings can be optimized for machine communications to provide only the limited access required to support the particular machine to machine application. This allows for cost optimized access services and prevents the machine to machine device or access modem from being misappropriated and used for some other service access than that intended. For example, by programming the machine to machine communications device at time of manufacture or during distribution with credentials or partial credentials that provide for automated provisioning and activation as described herein, the device can be automatically provisioned and activated on the service network with a service account when deployed, thus eliminating the need for costly or time consuming human intervention. The various embodiments that make it simpler to design, manufacture, test and deploy devices may also be equally applied to machine to machine devices. These embodiments include the service processor 115 developers kit and the automated provisioning and activation management tools among others. Also, the service analysis and test tools and the virtual service provider embodiments can also be applied to machine to machine applications.

FIG. 1 illustrates a wireless network architecture for providing device assisted services (DAS) install techniques in accordance with some embodiments. As shown. FIG. 1 includes various wireless communications devices 100 (e.g., a mobile wireless device or an intermediate networking device) in wireless communication with central provider access and core networks 210. As shown, some of the devices 100 include service processors 115. For example, devices 100 can include various types of mobile phones. PDAs, computing devices, laptops, netbooks, tablets, cameras, music/media players, GPS devices, networked appliances, and any other networked device. In some embodiments, intermediate networking devices, as described herein, include a service processor or assist in the downloading of a service processor for one or more devices 100 to facilitate network access as described herein with respect to various embodiments. In some embodiments, a device 100 does not initially include a service processor (as shown in FIG. 1). In some embodiments, a service processor 115 is previously installed (e.g., during manufacture or distribution), or is downloaded and installed on a device 100 (as also shown in FIG. 1).

In some embodiments, the wireless communications device is a mobile communications device, and the service includes one or more Internet based services, and the mobile communications device includes one or more of the following: a mobile phone, a PDA, an eBook reader, a music device, an entertainment/gaming device, a computer, laptop, a netbook, a tablet, and a home networking system. In some embodiments, the wireless communications device includes a modem, and the processor is located in the modem. In some embodiments, an intermediate networking device includes any type of networking device capable of communicating with a device and a network, including a wireless network, example intermediate networking devices include a femto cell, or any network communication device that translates the wireless data received from the device to a network, such as an access network. In some embodiments, intermediate networking devices include 3G/4G WWAN to WLAN bridges/routers/gateways, femto cells, DOCSIS modems. DSL modems, remote access/backup routers, and other intermediate network devices.

In some embodiments, there are at least two versions of a service processor. For example, a first version service processor can be a generic version of a service processor version that can be pre-installed during manufacture or distribution and used for downloading a second version service processor. For example, the first version service processor can be a generic version that is not specific to a device group while the second version is specific to a device group. As another example, the first version service processor installed during time of manufacture or during device distribution may not contain all of the functions that are available for a permanent second version service processor that is installed when the device first connects to a network. As another example, service processors can be regularly updated to change the security parameters of the software, such as software signatures, encryption, obfuscation, secure query response sequence information, and/or other parameters, so that it becomes more difficult to hack or otherwise modify the software. As another example, the second version service processor can be uniquely associated with the device 100 (e.g., wireless communications device or an intermediate networking device) and the associated service plan and/or service provider. In some embodiments, a first version service processor is installed on a device 100 (e.g., service processor 115 installed on the device 100 can be a first version service processor that was previously installed during manufacture or distribution, or downloaded and installed during initial network access, as shown in FIG. 1). In some embodiments, a second version service processor is installed on a mobile device (e.g., service processor 115 can be a second version service processor that was previously installed during manufacture or distribution, or downloaded and installed during initial network access, as shown in FIG. 1).

In some embodiments, a new and/or updated version service processor 115 can be downloaded from, for example, a service processor download 170, as described herein. In some embodiments, the service processor download 170 provides a function or service that is located elsewhere in the network or partially located in elsewhere or integrated with/as part of other network elements (e.g., the service processor download 170 can be a function/service of service control 150 and/or service policies and accounting 165). In some embodiments, the devices 100 are in service control communication with service control 150 via central provider access and core networks 220 as shown in FIG. 1. Service policies and accounting functions 165 are also provided in communication with the central provider access and core networks 220 as shown in FIG. 1. In some embodiments, the service policies and accounting functions 165 provides a function or service that is located elsewhere in the network or partially located in elsewhere or integrated with/as part of other network elements (e.g., the service policies and accounting functions 165 can be a function/service of service control 150).

In some embodiments, the devices 100 network access is initially restricted to service control related access for service processor 115 verification and/or download(s)/update (s) (e.g., a first version service processor installed on the mobile device 100 can limit or direct network access to the service control 150, service processor download 170, and/or service policies and accounting function 165), as described herein with respect to various embodiments. In some embodiments, after this initial restricted access period is completed and/or if the service processor 115 of the mobile device 100 is verified for the device and is current/updated, the device 100 can communicate via the central provider access and core networks 220 to the Internet 120 for access to various Internet sites and/or services 240 as shown in FIG. 1 (e.g., Google sites/services. Yahoo sites/services, Blackberry services, Apple iTunes and AppStore, Amazon.com, FaceBook, and/or any other Internet based sites and/or services) based on, for example, the service plan associated with the device 100. In some embodiments, service usage information (e.g., based on network based CDRs or device generated CDRs, such as micro-CDRs generated by the service processor 115, and/or other service usage measures) are used for service control and/or service plan billing and reporting, as described herein with respect to various embodiments.

Those of ordinary skill in the art will appreciate that various other network architectures can be used for DAS install techniques, and FIG. 1 is illustrative of just another such example network architecture for which DAS install techniques described herein can be provided.

In some embodiments. FIG. 1 provides a wireless network architecture that also supports partitioned device groups, in which each device group can be provided independent and secure management. In some embodiments, partitioned device groups are provided. In some embodiments, each partitioned group of devices (e.g., mobile devices 100) can be uniquely managed with secure admin log-ins. In some embodiments, the partitioned device groups are securely managed using the service processor 115 installed on the devices 100 for that device group. In some embodiments, multi-device, multi-user accounting is provided. In some embodiments, capabilities are provided to support multi-party/multi-service reconciliation records to carriers and carrier partners. In some embodiments, service usage and profitability analytics are provided. For example, a partitioned beta test group of devices can be tested and optimized for various service usage policies and/or service plans, and then the optimized service usage policies and/or service plans can be published to an entire or larger device group. In some embodiments, a carrier can be provided a carrier branded device group, and/or a MVNO can be provided a MVNO branded device group.

In some embodiments, DAS install clients (e.g., bootstrappers for devices 100) are provided. In some embodiments, a first version service processor provides DAS install client function that facilitates a bootstrapping function for downloading and installing a second version service processor. In some embodiments, DAS install clients are provided for creating/downloading and installing a verifiable service processor for each device (e.g., a network capable device, such as a mobile wireless communications device or intermediate networking device). In some embodiments, a DAS install client downloads a uniquely secured service processor for device 100 (e.g., hashed/encrypted, such as based on device credentials, to prevent, for example, mass hacking or other security vulnerabilities, and/or a signed interface between the service processor and modem). In some embodiments, a non-advertised IP address allocated for each device group is rotated (e.g., to counter denial of service (DoS), distributed denial of service (DDS), and/or other types of attacks and/or vulnerabilities or exploits), and service processors are configured with multiple IP addresses for service control access (e.g., for secured network communication with service control 150 and/or service policies and accounting 165).

In some embodiments, DAS install techniques include one or more of the following operations. First, in some embodiments, whether a device is in a device group or list that includes an installed, up to date, and/or validated service processor is determined (e.g., verify that SIM. ESN, or other unique device identifier is registered, such as in a Home Location Register (HLR)/Network Information Repository (NIR) database or other authorized data store, as associated with service settings/policies for that device for service access and send its associated Charging Data Records (CDRs) to the service controller). Second, in some embodiments, if the device does not have an installed, up to date, and/or validated service processor, then the device is directed to, for example, an activation server to, for example, authenticate the device and/or verify a service processor for the device (e.g., ensure that a current and verified service processor version is installed and/or download a current and verified service processor version for the device).

For example, a DAS install client can be downloaded and installed (e.g., using various bootstrapping techniques, in which, for example, during the installation of the service processor software it is sometimes necessary to update the installer or package manager itself, by using, for example, a small executable file, such as a bootstrapper, that updates the installer and then initiates the new/updated/second version service processor installation after the update, and, in some cases, the bootstrapper can install other prerequisites for the service processor software during the bootstrapping process as well; and using network access to a download server, and/or from a website, including, for example, service processor download function 170) that allows for secure connection from the device (e.g., mobile device 100) to a secure download server (e.g., service processor download 170). In this example, support for a configuration of the device can be determined, such as through a device query or device download of client verification software can be used to verify the device hardware/software configuration). In this example, a user/device validation step can also be performed. For example, an authorization process for a user sign-up can be performed (e.g., based on a user name, MAC address, Turing machine text verification, and/or credit card verification or using other authorization/validation techniques), in which this can be performed automatically or the user/device can be required to enter certain credentials for authorization/validation.

In some embodiments, the authorization process also includes various security techniques for securely associating a user's identity with the device (e.g., using public key/TLS techniques, SSH techniques for TLS, and/or identity management techniques or other security techniques). For example, a check can also be performed to determine if the device was previously and/or is currently an activated device (e.g., the device is already associated with an active service plan). For example, whether the device belongs to a registered device group can also be determined during a DAS install, and if not, then the default settings for that type of device can be applied. In some embodiments, the service processor is encrypted, hashed, and/or obfuscated based on the previous determination (e.g., device group association, default device settings, and/or any other settings/criteria).

In some embodiments, if the device is not associated with a service plan (e.g., based on the device look-up using device based unique identifier(s)/credential(s) or using other techniques, as described herein), then the device can be redirected to a service portal for an activation offer for a service plan (e.g., using an activation server). In some embodiments, the portal utilizes header information to indicate that the device is a managed device (e.g., for a given service provider. MVNO, or other service partner) in the portal request to proxy to an appropriate proxy server for that service provider for the activation process.

In some embodiments, the device is in probation mode after the new service processor install (e.g., restricted a restricted IP address can be used for the service controller or other network element for service control instead of the secured service controller IP addresses reserved for validated and non-probation mode service processors, which, for example, can reduce the risks of various security risks, such as DoS. DDS, and/or other mass or other types of attacks against publicly or other more easily accessible service controller or download servers). In some embodiments, while in probation mode, the service processor executes more robust service monitoring techniques (e.g., more frequent and/or more robust service integrity checks and/or more frequent heartbeats, for example, to monitor actual device/user behavior with the associated expected behavior, as described herein with respect to various embodiments). In some embodiments, after a probation period ends, the device is provided access based on the associated service plan, which is managed, at least in part, by the service processor (e.g., service processor 115) in communication with, for example, a service controller (e.g., service control 150 and service policies and accounting 165) or other authorized network elements for service control.

In some embodiments, the various techniques and embodiments described herein can be readily applied to intermediate networking devices (e.g., an intermediate modem or networking device combination). In some embodiments, intermediate networking devices include, for example, WWAN/WLAN bridges, routers and gateways, cell phones with WWAN/WLAN or WWAN/Bluetooth, WWAN/LAN or WWAN/WPAN capabilities, femto cells, back up cards for wired access routers, and/or other intermediate networking devices. In some embodiments, an intermediate networking device (e.g., an intermediate modem or networking device combination) downloads and sends a service processor to one or more devices communicating via the intermediate networking device. In some embodiments, an appropriate and validated service processor is securely downloaded to the intermediate networking device, and the intermediate networking device performs the service processor functions for various wireless communication devices (e.g., mobile wireless communication devices) in communication with the intermediate networking device. In some embodiments, in which one or more wireless communication devices are in wireless communication via an intermediate networking device, some of the service processor functions are performed on the intermediate networking device (e.g., an appropriate and validated service processor is installed or securely downloaded and installed on the intermediate networking device), and some of the service processor functions are performed on the one or more wireless communication devices (e.g., an appropriate and validated service processor is installed or securely downloaded and installed on the mobile device) (e.g., stack controls can be performed on the mobile device and various other controls can be performed on the intermediate networking device). In some embodiments, the one or more wireless communication devices cannot access the network via the intermediate networking device (e.g., the devices are quarantined) unless the one or more wireless communication devices each have an installed and functioning verified service processor (e.g., using CDRs from intermediate networking device and/or network).

In some embodiments, a USB WLAN stick or other similar networking device is provided (e.g., including a modem) with DAS install client software that loads onto the device 100 and installs a service processor 115 on the device 100. In some embodiments, software on the device 100 instructs the user to insert a properly configured memory device (e.g., a secured USB memory stick, dongle, or other secured device that can provide a DAS install client software, a service processor image, and/or device credentials for network access). In some embodiments, the USB WLAN installed software assumes control over, for example, the network stack of the device (e.g., for managing network access) and sets various service policies based on whether the service is communicated via the USB WLAN stick or via the WiFi/other (e.g., including requiring no policies, such that access is open). In some embodiments, the DAS install client software on the USB WLAN stick provides a secure client that installs itself/certain software on the device that provides a DAS install client (e.g., bootstrapper) for the device, and the DAS install client downloads an appropriate service processor onto the device and/or the USB WLAN stick (e.g., the stack can also be located and managed on the USB WLAN stick).

In some embodiments. DAS install techniques include ensuring that a device's (e.g., the device modem's) credentials for the access network match the unique credentials for the service processor and the unique credentials for the device (e.g., MAC. SIM, IMSI, and/or other unique credentials for the device). In some embodiments, DAS install techniques include ensuring that multiple IP addresses are not associated with the same service processor for a particular device. In some embodiments, DAS install techniques include determining that this is the same device/modem that a service processor was previously downloaded for and whether that prior service processor is still active on the network. If so, then, in some embodiments, the user is required to type in, for example, a password to continue, for example, a reimaging of the device (or prevent the new device install or to disable the previously activated other service processor).

In some embodiments, DAS install techniques include starting with a device that does not include a service processor (e.g., a device, with, for example, a SIM or EVDO ESSN, but with no service processor, attempts to connect to the network, an appropriate service processor for the device is determined, and then a uniquely associated service processor is downloaded and installed on the device, for example, using a bootstrapper, as similarly described herein). In some embodiments, unique device credentials (e.g., MAC, SIM, IMSI, and/or other unique credentials for the device) are used to create a secure connection with, for example, the service controller (e.g., service control 150) or a secure download server (e.g., service processor download 170), to download a (e.g., new or replacement) service processor to be securely installed on the device. Accordingly, as similarly described herein. DAS install techniques can be applied to at least one or more of the following situations: a new service processor install; and/or a replacement service processor install (e.g., the originally/previously installed service processor was wiped/reimaged, hardware failure, or otherwise corrupted or deleted, and, thus, a replacement service processor is needed). In some embodiments, when a device connects to the network without, for example, a service processor, then a look up is performed (e.g., in a data store, such as a database) to determine whether the device is a member of a device group or a new device, and an appropriate service processor (e.g., version and settings) is provided for installation on the device. In some embodiments, when the device attempts an initial access to the network, at that time an updated version of a service processor for that device can be provided based on, for example, device type, device group, master agent, user interface (UI), settings, marketing pages, and/or other features and/or settings, which, for example, can allow for a new, changed, or evolving service plan/program by the time the device logs onto the network to provide, for example, for a dynamic and scalable solution.

In some embodiments, as similarly discussed above, two versions of the service processor are provided (e.g., a first version/image and a second version/image of the service processor software). In some embodiments, a first version service processor is a general purpose version used, for example, primarily for connecting to the network and loading a second version service processor software that, for example, can be one or more of the following: an updated version, a version tailored to a more specific purpose (e.g., based on a device type, device group, service type, service provider or service provider partner, or any other purpose/criteria), a version that includes additional features/functionality, an encrypted service processor version, a version that includes special service plan settings or capabilities associated with a device group, a version that includes specific branding or features/functionality for a given service provider or service provider partner associated with a device group, a version that includes special marketing materials to motivate the user to try or buy services or transactions associated with a device group, and various other versions as will now be apparent to one of ordinary skill in the art in view of the various embodiments described herein.

In some embodiments, depending on whether the user has pre-signed up for a service plan, for example, a different version of the service processor software and/or settings is/are downloaded to the device during this initial service processor download process, including, for example, one or more of the following: a different set of options for service plan choices, marketing materials, ambient service settings and service options, service plan settings, and possibly various other features and/or settings.

In some embodiments, the first version of the service processor is installed during manufacturing or in the distribution channel prior to sale of the device. In some embodiments, the first version of the service processor is installed after the time of sale of the device using various DAS install techniques as described herein with respect to various embodiments.

In some embodiments, the first version of the service processor is not uniquely encrypted so that a general purpose version of the first service processor image can be distributed to multiple devices (e.g., downloadable via the Internet, such as through a website, or a software update not installed by an operable service processor or a software image that is loaded onto the device before the device credentials or device group associations are available or known). In some embodiments, a non-encrypted generic version of the service processor is used for broad distribution to many devices in which the device credentials are not known at the time of service processor software distribution (e.g., the generic version of the service processor can log onto the network to access a software update function in the service controller or service control 150, service processor downloader or service process download 170, and/or similar authorized network function, then the service controller can obtain the device credentials and/or user information and provide an updated version of the service processor using the various techniques or similar techniques to those described herein). In some embodiments, the second/updated version of the service processor is uniquely encrypted (e.g., based at least in part on the device credentials or device group associations).

In some embodiments, a first version of the service processor need not be uninstalled and replaced by a new install of a second version of the service processor, as, in some embodiments, the second version of the service processor includes updates to the first version of the service processor, settings changes to the first version of the service processor, and/or encryption or obfuscation of the first version of the service processor to provide a second version of the service processor that is uniquely associated with the device, the device user, the device group, and/or the service plan associated with the device. In some embodiments, the second/updated version of the service processor includes one or more restricted IP addresses providing for access to the secured service control/service controller IP addresses reserved for validated and non-probation mode service processors, which, for example, can reduce the risks of various security risks for the secured service control/service controller(s), such as DoS, DDS, and/or other mass or security attacks against publicly or other more easily accessible service control/service controller(s) and/or service processor download servers.

In some embodiments, the second version of the service processor is uniquely associated with some aspect(s) of the device credentials and/or user information with a temporary user account (e.g., also sometimes referred to herein as a dummy user account) or user account. In some embodiments, the second version of the service processor and/or the settings in the service processor are chosen based on a look up of some aspect of the device credentials and/or the user information to determine which device group version of the service processor and/or settings should be loaded. In some embodiments, when there is no appropriate device group association or the user preference takes priority over device group association, the first version of the service processor software is used to log onto the network (e.g., including potentially the service controller) to select a service offer, or device group association that then determines the second version and/or settings of the service processor software that will be loaded onto the device.

In some embodiments, the first version of the service processor is installed on aftermarket devices, and after installation this more general purpose version of the service processor provides for access to the service control/service controller (or similar network function). In some embodiments, the service control/service controller determines what type of device and/or what operating system (OS) software and/or what modem and modem software is on the device, and then loads an appropriate version of the service processor for that device or facilitates an updating of the first version of the service processor to provide a second version of the service processor for that device.

In some embodiments, the service processor is distributed on a peripheral device suitable for use with more than one type of device and/or more than one type of OS. Accordingly, in some embodiments, more than one version of the service processor can be shipped with the device for installation on the device once the device type and/or OS type is/are known, with each version of the software either being a first version of the service processor software as discussed above, or a second version or final version of the service processor software as similarly discussed above with respect to various embodiments.

In some embodiments, the first version/second version service processor software techniques, for example, allow for installations of a new OS version that is not compatible in some way with the present version of the service processor. For example, the installation of such a new and incompatible OS version can render the currently installed service processor version incapable of connecting to the network and updating the service processor. In such an example, a rust version service processor software image that is compatible with the new OS can be used to access the network (e.g., connect to the service control/service controller or some other network element) to download and install a new, possibly uniquely encrypted and compatible second service processor image, as similarly discussed above with respect to various embodiments.

In some embodiments, the first version/second version service processor software techniques, for example, can handle situations in which a device has an inadvertently wiped or damaged service processor image such that the device is no longer capable of logging onto the network with its secure credentials and/or uniquely encrypted service processor software image. In such an example, the first version software processor can then be used as similarly described above with respect to various embodiments to download and install a new/replacement second version service processor on the device.

In some embodiments, there are multiple types of device log-in to the service control/service controller depending on whether a first or second version service processor is being used. For example, if a second version service processor is being used, which, in some embodiments, includes unique secure credentials, a uniquely encrypted or secure heartbeat channel, and/or a uniquely encrypted service processor software image, then the capabilities of the device and/or service processor to access the network and/or service controller elements can be as similarly described herein with respect to various embodiments. However, if the device is using a first version service processor, which, for example, does not have unique secure credentials, a uniquely encrypted heartbeat control channel, and/or a uniquely encrypted software image, then the heartbeat control channel traffic can be handled in a differential manner as compared to the traffic handling implemented for a second version service processor image. For example, the service controller heartbeat processing elements can detect that the service processor is a first version service processor and can then route the heartbeat traffic through a different set of security processes that do not rely on all the security aspects present in a second version service processor. As another example, the first version service processor can be a widely distributed software image that does not have unique encryption on the heartbeat channel and can be handled differentially, such as handled with a different server designed to handle insecure traffic and designed to not be disposed or easily exposed to mass or other security attacks (e.g., DoS, DDS attacks, and other types of security related and/or mass/large scale attacks against a network element, such as a download server or web/application server).

In some embodiments, a device supports two or more operating systems (e.g., different versions of operating systems and/or different operating systems) and for each operating system includes a compatible service processor. For example, when a dual boot configured device boots in a first operating system version, then a first service processor that is compatible with that first operating system version is selected for network access, and when the dual boot configured device boots in a second operating system version, then the second service processor that is compatible with that second operating system version is selected for network access.

In some embodiments, initial network access for a device is directed to a service controller (e.g., service control 150), service processor downloader (e.g., service processor download 170), and/or similar network element for managing service control. In some embodiments, initial network access is restricted to this initial network access to the service controller, service processor downloader, and/or similar network element for managing service control. In some embodiments, such initial network access is restricted until the device has been verified for network access, as similarly discussed herein with respect to various embodiments. In some embodiments, such initial network access is restricted until the device has been verified for network access and an appropriate service processor has been verified on the device and/or downloaded and installed on the device, as similarly discussed herein with respect to various embodiments. In some embodiments, such initial network access is restricted using various techniques, such as using a first version of a service processor on the device that restricts such initial network access. In some embodiments, such initial network access is restricted to and maintained in probation mode, as similarly described herein (e.g., a restricted IP address can be used for the service controller or other network element for service control instead of the secured service controller IP addresses reserved for validated and non-probation mode service processors, which, for example, can reduce the risks of various security risks, such as DoS, DDS, and/or other mass attacks against publicly or other more easily accessible service controller or download servers). For example, such initial network access can include access to a common activation server, which the device can access for determination of a supported configuration for a new or second service processor image download. As another example, such initial network access can direct the device to an initial web page including access to a service plan offer and purchase options (e.g., providing for a device credential look up for device group, provide choices of programs to user, or other service plan offer and purchase options). As another example, the initial web page can include access to a service plan offer and purchase options and a service processor verification and download/update function.

In some embodiments, a network based charging data record (CDR) feed, as described herein with respect to various embodiments, is provided for monitoring service usage by managed devices. In some embodiments, the CDR feed includes device generated CDRs or micro-CDRs generated by the service processor (e.g., service processor 115 can generate CDRs for monitored service usage on the device, which can, for at least some CDRs, include unique transaction codes for uniquely identifying the monitored service usage based on service or other categorizations/criteria) on the device (e.g., a mobile device or an intermediate networking device for that mobile device). In some embodiments, the CDR feed is a real-time (e.g., near real-time) network based CDR feed provided for determining whether any devices have been compromised (e.g., a hack of a first version or second version service processor providing for unrestricted service usage for such devices, and/or any other mass or security attack or vulnerability or exploit). For example, such a CDR feed can be used to determine abnormal or unusual traffic patterns and/or service level usage activities, which, for example, can be used to identify and/or protect against a DoS/DDS attack or other types of security attacks.

In some embodiments, based on various device and/or network based monitoring techniques, as described herein with respect to various embodiments, a determination is made that the service processor (e.g., service processor 115) is not functioning properly (e.g., may have been damaged and/or compromised/tampered with and, for example, allowing network access beyond the device's associated service plan and/or not properly monitoring/billing for such service usage) and that a new/replacement service processor should be downloaded. In some embodiments, a new/replacement service processor can be downloaded and installed in such situations, using the various techniques described herein with respect to various embodiments. In some embodiments, based on various criteria (e.g., service usage monitoring, billing, and/or any other criteria) or based on proactive and/or periodic administrative/security measures, a new/replacement service processor can be downloaded and installed, using the various techniques described herein with respect to various embodiments.

In some embodiments, based on, for example, service plan changes (e.g., user changes to their service plan), service provider changes (e.g., service provider changes to their services/service policies or the associated service plan), device changes (e.g., operating system version or other software platform changes or various hardware changes), a new service processor can be downloaded and installed or the installed service processor can be updated, using the various techniques described herein with respect to various embodiments.

Figure 2:
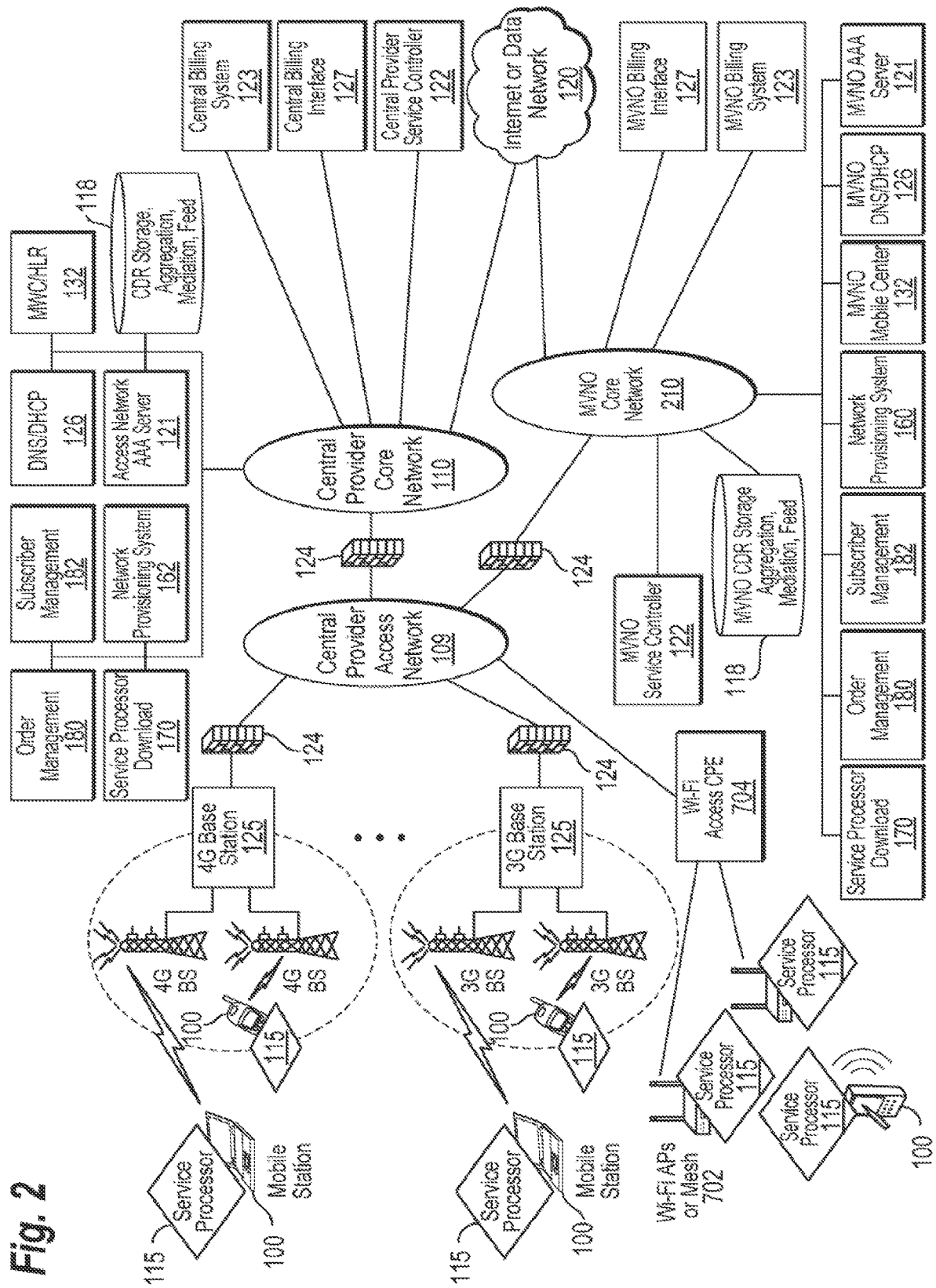
FIG. 2 illustrates another wireless network architecture for providing DAS install techniques in accordance with some embodiments.

FIG. 2 illustrates another wireless network architecture for providing DAS install techniques in accordance with some embodiments. As shown, FIG. 2 includes a 4G/3G/2G wireless network operated by, for example, a central provider. As shown, various wireless mobile devices 100 are in communication with base stations 125 for wireless network communication with the wireless network, and other devices 100 are in communication with Wi-Fi Access Points (APs) or Mesh 702 for wireless communication to Wi-Fi Access CPE 704 in communication with central provider access network 109. In some embodiments, each of the mobile devices 100 includes a service processor 115 (as shown), which, for example, can be initially installed, downloaded, and/or updated service processors (e.g., first/second version service processor images) using service processor download function 170 as described herein, and each service processor 115 connects through a secure control plane link to a service controller 122. In some embodiments, the service processor download function 170 is located elsewhere in the network or partially located in elsewhere or integrated with/as part of other network elements as will be apparent to one of ordinary skill in the art in view of the various embodiments disclosed herein.

In some embodiments, service usage information includes network based service usage information (e.g., charging data records (CDRs)), which is obtained from one or more network elements. In some embodiments, service usage information includes micro-CDRs provided by the service processor (e.g., service processor 115) installed on the device (e.g., mobile device 100). In some embodiments, micro-CDRs are used for CDR mediation or reconciliation that provides for service usage accounting on any device activity that is desired, as described herein with respect to various embodiments. In some embodiments, each device activity that is desired to be associated with a billing event is assigned a micro-CDR transaction code, and the service processor 115 is programmed to account for that activity associated with that transaction code. In some embodiments, the service processor 115 periodically reports (e.g., during each heartbeat or based on any other periodic, push, and/or pull communication technique(s)) micro-CDR usage measures to, for example, the service controller 122 or some other network element. In some embodiments, the service controller 122 reformats the heartbeat micro-CDR usage information into a valid CDR format (e.g., a CDR format that is used and can be processed by an SGSN or GGSN) and then transmits it to an authorized network element for CDR mediation (e.g., CDR storage, aggregation, mediation, feed 118, billing system 123, and/or billing interface 127 or another authorized network element/function). In some embodiments, CDR mediation is used to account for the micro-CDR service usage information by depositing it into an appropriate service usage account and deducting it from the user device bulk service usage account. For example, this technique provides for a flexible service usage billing solution that uses pre-existing solutions for CDR mediation and billing. For example, the billing system (e.g., billing system 123 and/or billing interface 127) processes the mediated CDR feed from CDR storage, aggregation, mediation, feed 118, applies the appropriate account billing codes to the aggregated micro-CDR information that was generated by the device, and then generates billing events in a manner that does not require changes to billing systems and/or billing infrastructure (e.g., using new transaction codes to label the new device assisted billing capabilities).

As shown in FIG. 2, a CDR storage, aggregation, mediation, feed 118 is provided. In some embodiments, the CDR storage, aggregation, mediation, feed 118 receives, stores, aggregates and mediates micro-CDRs received from mobile devices 100. In some embodiments, the CDR storage, aggregation, mediation, feed 118 also provides a settlement platform using the mediated micro-CDRs, as described herein with respect to various embodiments. In some embodiments, another network element provides the settlement platform using aggregated and/or mediated micro-CDRs (e.g., central billing interface 127 and/or another network element). In some embodiments, various techniques for partitioning of device groups are used for partitioning the mobile devices 100 (e.g., allocating a subset of mobile devices 100 for a distributor, an OEM, a MVNO, and/or another partner). As also shown in FIG. 2, a MVNO core network 210 also includes a MVNO CDR storage, aggregation, mediation, feed 118, a MVNO billing interface 127, and a MVNO billing system 123. In some embodiments, the MVNO CDR storage, aggregation, mediation, feed 118 receives, stores, aggregates and mediates micro-CDRs received from mobile devices 100 (e.g., MVNO group partitioned devices).

Those of ordinary skill in the art will appreciate that various other network architectures can be used for providing DAS install techniques, and FIG. 2 is illustrative of just one such example network architecture for which DAS install techniques described herein can be provided.

In some embodiments, CDR storage, aggregation, mediation, feed 118 (e.g., service usage 118, including a billing aggregation data store and rules engine) is a functional descriptor for, in some embodiments, a device/network level service usage information collection, aggregation, mediation, and reporting function located in one or more of the networking equipment apparatus/systems attached to one or more of the sub-networks shown in FIG. 2 (e.g., central provider access network 109 and/or central provider core network 110), which is in communication with the service controller 122, and a central billing interface 127. As shown, service usage 118 provides a function in communication with the central provider core network 110. In some embodiments, the CDR storage, aggregation, mediation, feed 118 function is located elsewhere in the network or partially located in elsewhere or integrated with/as part of other network elements. In some embodiments, CDR storage, aggregation, mediation, feed 118 functionality is located or partially located in the AAA server 121 and/or the mobile wireless center/Home Location Register (HLR) 132 (as shown, in communication with a DNS/DHCP server 126). In some embodiments, service usage 118 functionality is located or partially located in the base station, base station controller and/or base station aggregator, collectively referred to as base station 125 in FIG. 2. In some embodiments, CDR storage, aggregation, mediation, feed 118 functionality is located or partially located in a networking component in the central provider access network 109, a networking component in the core network 110, the central billing system 123, the central billing interface 127, and/or in another network component or function. This discussion on the possible locations for the network based and device based service usage information collection, aggregation, mediation, and reporting function (e.g., CDR storage, aggregation, mediation, feed 118) can be easily generalized as described herein and as shown in the other figures described herein as would be apparent to one of ordinary skill in the art. Also as shown in FIG. 2, the service controller 122 is in communication with the central billing interface 127 (also sometimes referred to as the external billing management interface or billing communication interface), which is in communication with the central billing system 123. As shown, an order management 180 and a subscriber management 182 are also in communication with the central provider core network 110 for facilitating order and subscriber management of services for the devices 100 in accordance with some embodiments, and a network provisioning system 162 is also provided in communication with the central provider core network 110 for facilitating network provisioning functions.

In some embodiments, the CDR storage, aggregation, mediation, feed 118 (and/or other network elements or combinations of network elements) provides a device/network level service usage information collection, aggregation, mediation, and reporting function. In some embodiments, the CDR storage, aggregation, mediation, feed 118 (and/or other network elements or combinations of network elements) collects device generated usage information for one or more devices on the wireless network (e.g., devices 100); and provides the device generated usage information in a syntax and a communication protocol that can be used by the wireless network to augment or replace network generated usage information for the one or more devices on the wireless network. In some embodiments, the syntax is a charging data record (CDR), and the communication protocol is selected from one or more of the following: 3GPP, 3GPP2, or other communication protocols. In some embodiments, as described herein, the CDR storage, aggregation, mediation, feed 118 collects/receives micro-CDRs for one or more devices on the wireless network (e.g., devices 100). In some embodiments, the CDR storage, aggregation, mediation, feed 118 (and/or other network elements or combinations of network elements) includes a service usage data store (e.g., a billing aggregator) and a rules engine for aggregating the collected device generated usage information. In some embodiments, the network device is a CDR feed aggregator, and the CDR storage, aggregation, mediation, feed 118 (and/or other network elements or combinations of network elements) also aggregates CDRs and/or micro-CDRs for the one or more devices on the wireless network; applies a set of rules to the aggregated CDRs and/or micro-CDRs using a rules engine (e.g., bill by account, transactional billing, revenue sharing model, and/or any other billing or other rules for service usage information collection, aggregation, mediation, and reporting), and communicates a new set of CDRs for the one or more devices on the wireless network to a billing interface or a billing system (e.g., providing a CDR with a billing offset by account/service).

In some embodiments, the CDR storage, aggregation, mediation, feed 118 (and/or other network elements or combinations of network elements) communicates a new set of CDRs (e.g., aggregated and mediated CDRs and/or micro-CDRs that are then translated into standard CDRs) for the one or more devices on the wireless network to a billing interface (e.g., central billing interface 127) or a billing system (e.g., central billing system 123). In some embodiments, the CDR storage, aggregation, mediation, feed 118 (and/or other network elements or combinations of network elements) communicates with a service controller (e.g., service controller 122) to collect the device generated usage information (e.g., micro-CDRs) for the one or more devices on the wireless network. In some embodiments, the CDR storage, aggregation, mediation, feed 118 (and/or other network elements or combinations of network elements) communicates with a service controller, in which the service controller is in communication with a billing interface or a billing system. In some embodiments, the CDR storage, aggregation, mediation, feed 118 (and/or other network elements or combinations of network elements) communicates the device generated usage information to a billing interface or a billing system. In some embodiments, the CDR storage, aggregation, mediation, feed 118 (and/or other network elements or combinations of network elements) communicates with a transport gateway (not shown) and/or a Radio Access Network (RAN) gateway (not shown) to collect the network generated usage information for the one or more devices on the wireless network. In some embodiments, the service controller 122 communicates the device generated service usage information (e.g., micro-CDRs) to the CDR storage, aggregation, mediation, feed 118 (and/or other network elements or combinations of network elements).

In some embodiments, the CDR storage, aggregation, mediation, feed 118 (and/or other network elements or combinations of network elements) performs rules for performing a bill by account aggregation and mediation function. In some embodiments, the CDR storage, aggregation, mediation, feed 118 (and/or other network elements or combinations of network elements) performs rules for performing a service billing function, as described herein, and/or for performing a service/transactional revenue sharing function, as described herein. In some embodiments, the service controller 122 in communication with the CDR storage, aggregation, mediation, feed 118 (and/or other network elements or combinations of network elements) performs a rules engine for aggregating and mediating the device generated usage information (e.g., micro-CDRs). In some embodiments, a rules engine device in communication with the CDR storage, aggregation, mediation, feed 118 (and/or other network elements or combinations of network elements) performs a rules engine for aggregating and mediating the device generated usage information.

In some embodiments, the rules engine is included in (e.g., integrated with/part of) the CDR storage, aggregation, mediation, feed 118. In some embodiments, the rules engine and associated functions, as discussed herein, is a separate function/device. In some embodiments, the service controller 122 performs some or all of these rules engine based functions, as discussed herein, and communicates with the central billing interface 127. In some embodiments, the service controller 122 performs some or all of these rules engine based functions, as discussed herein, and communicates with the central billing system 123.

In some embodiments, duplicate CDRs are sent from the network equipment to the billing system 123 that is used for generating service billing. In some embodiments, duplicate CDRs are filtered to send only those CDRs/records for devices controlled by the service controller and/or service processor (e.g., managed devices). For example, this approach can provide for the same level of reporting, lower level of reporting, and/or higher level of reporting as compared to the reporting required by the central billing system 123.

In some embodiments, the service controller 122 sends the device generated CDRs to the rules engine (e.g., service usage 118), and the rules engine applies one or more rules, such as those described herein and/or any other billing/service usage related rules as would be apparent to one of ordinary skill in the art. In some embodiments, the service controller 122 generates CDRs similar to other network elements, and the rules (e.g., bill-by-account) are performed in the central billing interface 127. For example, for the service controller 122 to generate CDRs similar to other network elements, in some embodiments, the service controller 122 is provisioned on the wireless network and behaves substantially similar to other CDR generators on the network) as would be apparent to one of ordinary skill in the art.

In some embodiments, the service controller 122 is provisioned as a new type of networking function that is recognized as a valid and secure source for CDRs by the other necessary elements in the network (e.g., CDR storage, aggregation, mediation, feed 118). In some embodiments, where the network necessary apparatus will only recognize CDRs from certain types of networking equipment (e.g. a RAN gateway or transport gateway), then the service controller 122 can provide authentication credentials to the other networking equipment that indicate it is one of the approved types of equipment. In some embodiments, the link between the service controller 122 and the necessary CDR aggregation and mediation equipment is secured, authenticated, encrypted, and/or signed.

In some embodiments, the CDR storage, aggregation, mediation, feed 118 discards the network based service usage information (e.g., network based CDRs) received from one or more network elements. In these embodiments, the service controller 122 can provide the device based service usage information (e.g., device based CDRs or micro-CDRs) to the CDR storage, aggregation, mediation, feed 118 (e.g., the CDR storage, aggregation, mediation, feed 118 can just provide a store, aggregate, and communication function(s)), and the device based service usage information is provided to the central billing interface 127 or the central billing system 123.

In some embodiments, the device based CDRs (e.g., micro-CDRs) and/or new CDRs generated based on execution of a rules engine as described herein are provided only for devices that are managed and/or based on device group, service plan, or any other criteria, categorization, and/or grouping, such as based on ambient service or ambient service provider or transactional service or transactional service provider.

In some embodiments, based on, for example, service plan changes (e.g., user changes to their service plan), service provider changes (e.g., service provider changes to their services/service policies or the associated service plan), micro-CDR transaction code changes, and/or any other related changes, a new service processor can be downloaded and installed or the installed service processor can be updated to allow, for example, the tracking of one or more service usage activities by the device using micro-CDRs (e.g., for new or previously unmonitored/untracked service usage activities, using, for example, new or updated micro-CDR transaction codes (uniquely) associated with such service usage activities), using the various techniques described herein with respect to various embodiments.

Figure 3:
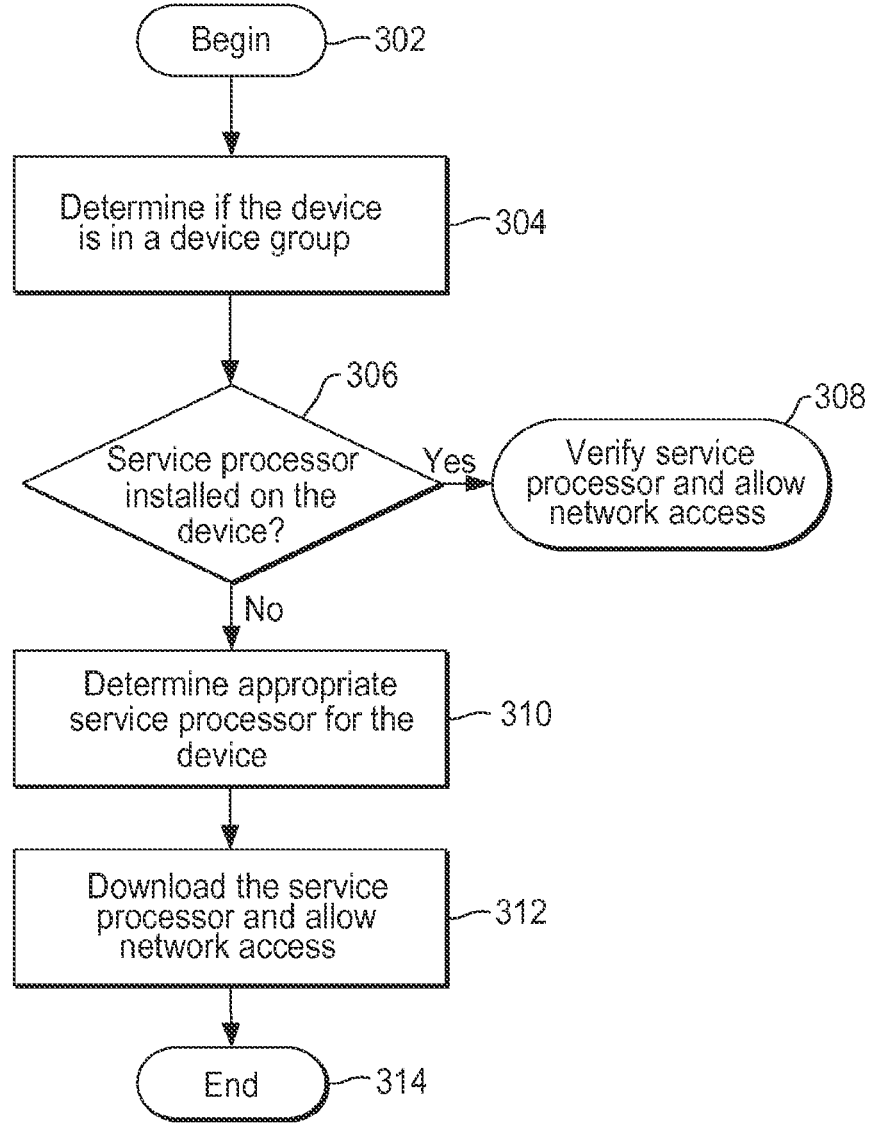
FIG. 3 illustrates a flow diagram for DAS install techniques in accordance with some embodiments.

FIG. 3 illustrates a flow diagram for DAS install techniques in accordance with some embodiments. At 302, the process begins. At 304, whether a device (e.g., mobile device 100) is in a device group is determined. At 306, whether the device includes a service processor is determined. If so, at 308, then the installed service processor is verified (e.g., up to date and/or validated for that device, device group, and/or associated service plan) and network access is allowed (e.g., managed/monitored by the installed and verified service processor according to the associated service plan for the device). Otherwise (e.g., the device does not have an installed service processor), at 310, then an appropriate service processor for the device is determined (e.g., based on the device type, device group, and/or version, such as hardware/software platform of the device, an associated service plan, service provider, and/or any other criteria or settings). At 312, the service processor is downloaded and installed (e.g., using a bootstrap process or other techniques, as described herein with respect to various embodiments) and network access is allowed (e.g., managed/monitored by the installed service processor according to the associated service plan for the device).

In some embodiments, the device is also directed to, for example, an activation server to, for example, authenticate the device and/or verify a service processor for the device (e.g., ensure that a current and verified service processor version is installed and/or download a current and verified service processor version for the device) prior to allowing such network access. For example, a DAS install client can be downloaded (e.g., using bootstrapping or other/similar techniques, from a download server and/or from a website) that allows for secure connection from the device (e.g., mobile device 100) to a secure download server (e.g., service processor download 170) (e.g., support for a configuration of the device is determined, such as through a device query or device download of client verification software can be used to verify the device hardware/software configuration). In this example, a user/device validation step can also be performed. For example, an authorization process for a user sign-up can be performed (e.g., based on a user name, MAC address. Turing machine text verification, credit card verification, and/or other authorization/validation techniques), in which this can be performed automatically or the user/device can be required to enter certain credentials for authorization/validation. In some embodiments, the authorization process also includes various techniques for associating a user's identity with the device (e.g., using public key/TLS techniques. SSH techniques for TLS, and/or identity management techniques). In this example, a check can also be performed to determine if the device was previously and/or is currently an activated device (e.g., the device is already associated with a service plan). For example, whether the device belongs to a registered device group can be determined, and if not, then the default settings for that type of device can be applied. In some embodiments, the service processor is encrypted, hashed, and/or obfuscated based on the previous determination (e.g., device group association and/or default device settings). In some embodiments, if the device is not associated with a service plan (e.g., based on the device look-up using device based unique identifier(s)/credential(s), as described herein), then the device can be redirected to a service portal for an activation offer for a service plan (e.g., using an activation server). In some embodiments, the portal utilizes header information to indicate that the device is a managed device (e.g., for a given service provider, MVNO, or other service partner) in the portal request to proxy to an appropriate proxy server for that service provider for the activation process. At 314, the process is completed.

Figure 4:
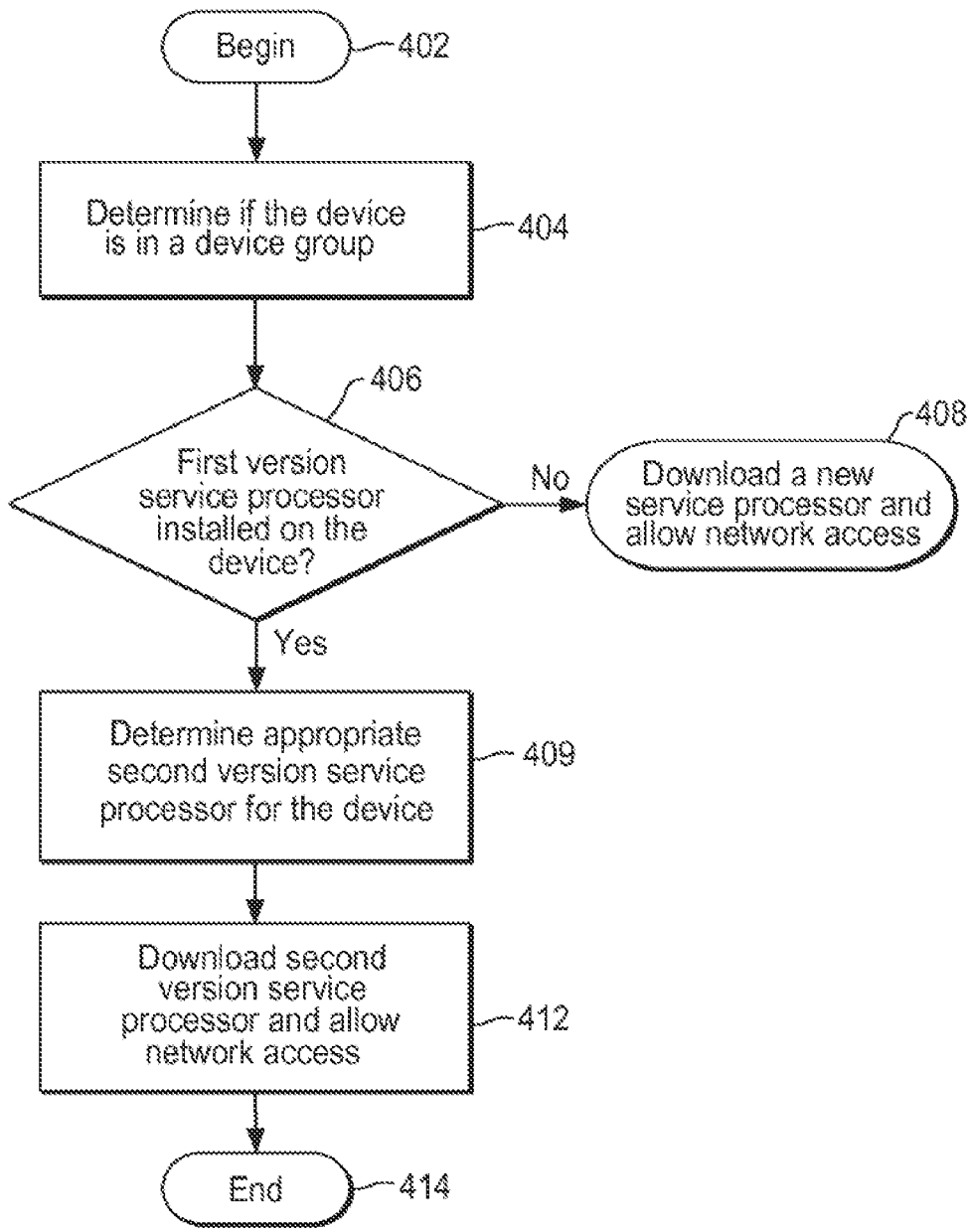
FIG. 4 illustrates another flow diagram for DAS install techniques in accordance with some embodiments.

FIG. 4 illustrates another flow diagram for DAS install techniques in accordance with some embodiments. At 402, the process begins. At 404, whether a device (e.g., mobile device 100) is in a device group is determined (e.g., or other list that indicates that this device includes an installed, up to date, and/or validated service processor, and, for example, to also verify that the SIM, ESN, or other unique device identifier is registered, such as in an HLR/NIR database, as associated with service settings/policies for that device for service access). At 406, whether the device includes a first version service processor is determined. If not (e.g., the device does not have an installed first version service processor), at 408, then a new service processor is downloaded (e.g., as similarly discussed above with respect to FIG. 3) and network access is allowed (e.g., managed/monitored by the installed new service processor according to the associated service plan for the device). Otherwise (e.g., the device includes an installed first version service processor), then at 409, an appropriate second version service processor for the device is determined (e.g., based on the device type and version, such as hardware/software platform, device group, an associated service plan, service provider, and/or any other criteria or settings). At 412, the second version service processor (e.g., secured for the device, using various techniques, as described herein) is downloaded and installed (e.g., using bootstrapping or other/similar techniques, as described herein), or in some embodiments, the first version of the service processor is updated to provide a second version service processor uniquely associated with the device, and network access is allowed (e.g., managed/monitored by the installed second version service processor according to the associated service plan for the device). At 414, the process is completed.

Figure 5:
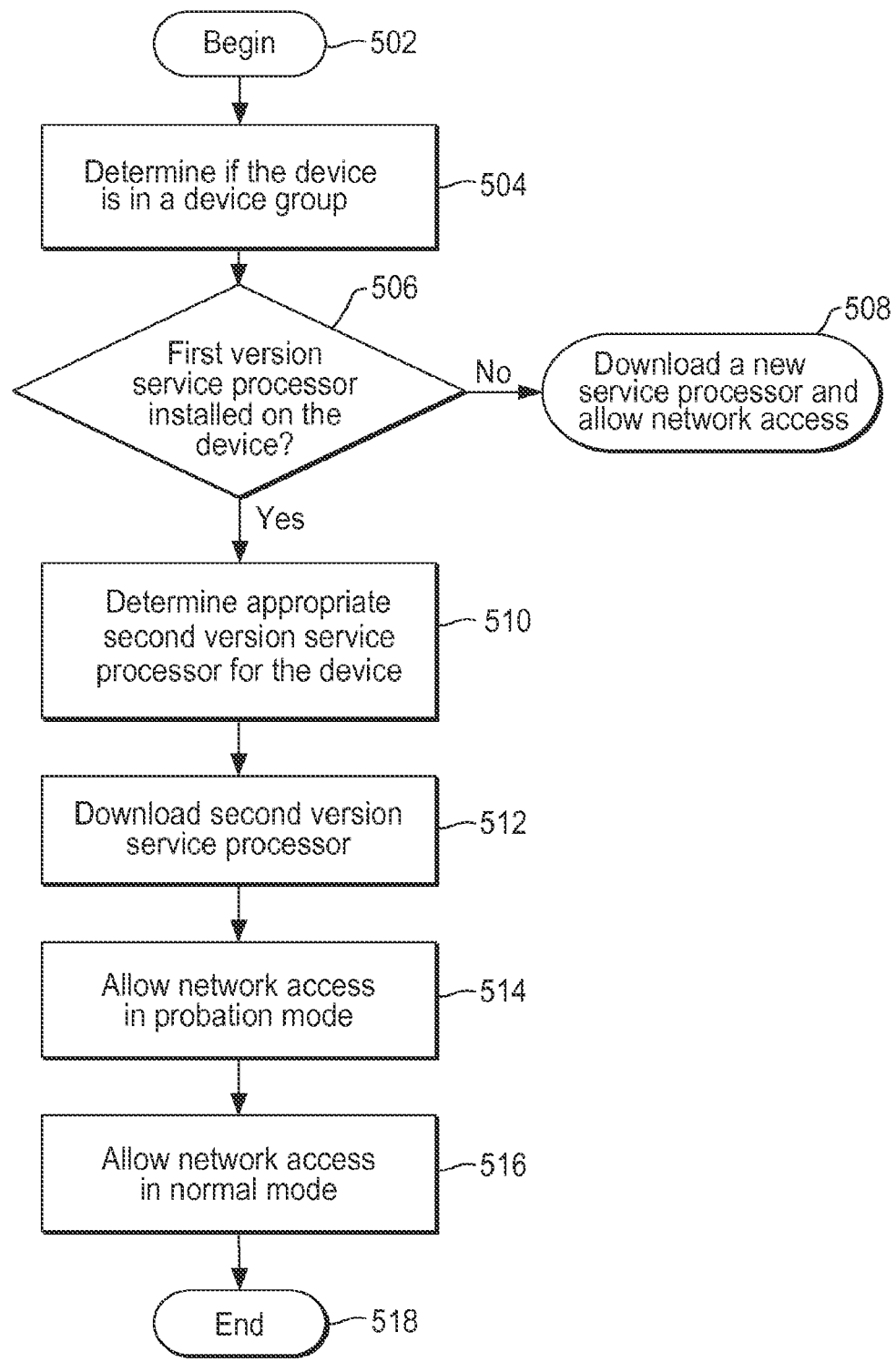
FIG. 5 illustrates another flow diagram for DAS install techniques in accordance with some embodiments.

FIG. 5 illustrates another flow diagram for DAS install techniques in accordance with some embodiments. At 502, the process begins. At 504, whether a device (e.g., mobile device 100) is in a device group is determined (e.g., as similarly described above with respect to FIG. 3). At 506, whether the device includes a first version service processor is determined. If not (e.g., the device does not have an installed first version service processor), at 508, then a new service processor is downloaded (e.g., as similarly discussed above with respect to FIG. 3) and network access is allowed (e.g., managed/monitored by the installed new service processor according to the associated service plan for the device). Otherwise (e.g., the device includes an installed first version service processor), at 510, then an appropriate second version service processor for the device is determined (e.g., based on the device type and version, such as hardware/software platform, device group, an associated service plan, service provider, and/or any other criteria or settings). At 512, the second version service processor (e.g., secured using various techniques, as described herein) is downloaded and installed (e.g., using a bootstrap process or other/similar techniques, as described herein). At 514, network access is allowed in probation mode, as described herein with respect to various embodiments. For example, the device can be managed in probation mode after the new/second version service processor install (e.g., service control communication can be limited to a particular set of probation mode IP addresses that can be used for the service controller or other network element for service control instead of the secured service controller IP addresses reserved for validated and non-probation mode service processors, which, for example, can reduce the risks of various security risks, such as DoS. DDS, or other mass or other security attacks against publicly or other more easily accessible service controller or download servers). In some embodiments, while in probation mode, the service processor executes more robust service monitoring techniques (e.g., more frequent and/or more robust service integrity checks and/or more frequent heartbeats, for example, to monitor actual device/user behavior with the associated expected behavior). At 516, after the probation period is completed (e.g., based on time, monitored activities, and/or any other criteria), network access is allowed in normal mode (e.g., the device is no longer operating in the probation mode, as described herein). For example, after a probation period is completed (e.g., based on time, monitored activities, and/or any other criteria), the device is provided access based on the associated service plan, which is managed, at least in part, by the service processor in communication with, for example, a service controller or other network element for service control. At 518, the process is completed.

In some embodiments, the device OS requires a pre-registered and signed version of the service processor software in order for the OS to allow the service processor to be installed or updated. In such embodiments, a sequence of pre-registered, pre-signed service processor software versions that have differing security parameters (e.g., encryption, signature, obfuscation, differences in code sequences, information for query-response sequences, and/or other security parameters) are provided. In some embodiments, the pre-registered service processors are used to regularly update the service processor software for a portion of devices connected to the network, or for all devices connected to the network. In some embodiments, a specific version of the service processor is assigned to a given device, and other versions with other security parameters will not be allowed to obtain service from the network. For example, more than one version of the software can be registered and distributed at any one time so that a hacker cannot create code that works for all devices. A sequence of service processor versions can be held in reserve and deployed when a successful software hack version is detected in the field for one or more previous service processor versions, and the new versions that have been held in reserve can be used to update devices in the field. As the reserved versions have not yet been distributed prior to the detection of a successful hack, it is not possible for a hacker to have a hacked version of the new software, and by refreshing new versions on a frequent basis it can become impossible for a hacker to successfully hack the new versions before additional new versions are deployed. Such embodiments can buy time by keeping successful software hacks out of the devices in the field until the successful software hack can be analyzed and a systematic security solution implemented to prevent the hack from remaining effective.

In some embodiments not all of the service processor software is modified into pre-registered modified security configuration versions that are regularly refreshed, but instead a portion of the service processor software that includes unique security information (e.g., security keys, signatures and/or responses to secure queries, and/or other security information, and/or the capability to analyze the integrity of the other service processor software). In this manner, when a device is suspected of being hacked the new service processor software portion with different security configuration can be updated and used to ascertain the integrity of the existing service processor configuration, which makes the update process shorter and lower bandwidth.

Clause 1: A system, comprising a processor of a network device configured to: determine if a communications device in communication with a wireless network includes a service processor for assisting control of the communications device use of a service on the wireless network, wherein the service processor includes a service profile that includes a plurality of service policy settings, and wherein the service profile is associated with a service plan that provides for access to the service; and verify the service processor; and a memory of the network device coupled to the processor and configured to provide the processor with instructions.

The system recited in clause 1, wherein the service policy settings include one or more of the following: access control settings, traffic control settings, billing system settings, user notification with acknowledgment settings, user notification with synchronized service usage information, user privacy settings, user preference settings, authentication settings, admission control settings, application access settings, content access settings, transaction settings, and network or device management communication settings.

Although the foregoing embodiments have been described in some detail for purposes of clarity of understanding, the invention is not limited to the details provided. There are many alternative ways of implementing the invention. The disclosed embodiments are illustrative and not restrictive.

INCORPORATION BY REFERENCE

This application incorporates by reference the following U.S. patent applications for all purposes:

Application Ser. No. 12/694,455, entitled DEVICE ASSISTED SERVICES INSTALL, filed Jan. 27, 2010; application Ser. No. 12/380,780, entitled AUTOMATED DEVICE PROVISIONING AND ACTIVATION, filed Mar. 2, 2009; provisional Application No. 61/206,354, entitled SERVICES POLICY COMMUNICATION SYSTEM AND METHOD, filed Jan. 28, 2009; provisional Application No. 61/206,944, entitled SERVICES POLICY COMMUNICATION SYSTEM AND METHOD, filed Feb. 4, 2009; provisional Application No. 61/207,393, entitled SERVICES POLICY COMMUNICATION SYSTEM AND METHOD filed Feb. 10, 2009; provisional Application No. 61/207,739, entitled SERVICES POLICY COMMUNICATION SYSTEM AND METHOD filed Feb. 13, 2009; and provisional Application No. 61/264,120, entitled DEVICE ASSISTED SERVICES INSTALL filed Nov. 24, 2009.

What is claimed is:

1. A system comprising:
a processor of a network device configured to:
determine if a wireless device in communication with a wireless network includes a service processor for assisting control of the wireless device use of a service on the wireless network, wherein the service processor includes a service profile that includes a plurality of service policy settings, and wherein the service profile is associated with a service plan that provides for access to the service;
securely connect, via a service control device link using the wireless network, the network device to the service processor of the wireless device;
receive service provider information from the wireless device;
determine, based on the service provider information, that the wireless device is associated with a particular service provider, wherein the service provider information is one of a user selection indicating the particular service provider or a credential of the wireless device associated with the particular service provider; and
provide, based on the determined association of the wireless device with the particular service provider, via the service control device link using the wireless network, the wireless device with a branding specific to the particular service provider, wherein the branding updates a user interface characteristic of the wireless device to be specific to the particular service provider;
a memory of the network device coupled to the processor and configured to provide the processor with instructions.

2. The system of claim 1, wherein providing the wireless device with a branding specific to the particular service provider includes providing a software update or an additional software download.

3. The system of claim 2, wherein the software update or the additional software download includes:
a version based on a device type,
a version based on a device group,
a version based on a service type,
an encrypted version,
a version that includes a service plan setting or capability associated with the device group,
a version that includes marketing material,
a version for offering a service plan option,
a version with an ambient service setting, or
a version with an ambient service option.

4. The system of claim 2, wherein the software update or the additional software download further includes a feature or a functionality for the particular service provider.

5. The system of claim 1, wherein the service provider information is the credential of the wireless device and includes information derived from a subscriber information module (SIM), an international mobile subscriber identity (IMSI), an electronic serial number (ESN), a media access control (MAC) address, or a unique device identifier.

6. The system of claim 1, wherein the processor of the network device is further configured to:
provide the wireless device with a policy setting for assisting the wireless device in connecting to a particular wireless access network.

7. The system of claim 6, wherein the policy setting is for assisting in presenting a notification, obtaining or presenting service usage information, obtaining an acknowledgment, obtaining or implementing a user preference, or obtaining or implementing a privacy setting.

8. The system of claim 6, wherein the policy setting includes an authentication setting, an admission control setting, a network or device management communication setting, an application access setting, a content access setting, or a transaction setting.

9. The system of claim 6, wherein the policy setting assists in directing or controlling traffic or billing for a service.

10. The system of claim 1, wherein the processor of the network device is further configured to:
modify the service profile of the wireless device based on association of the wireless device with one of a plurality of device groups.

11. A method for use by a processor of a network device, the method comprising:
- determining if a wireless device in communication with a wireless network includes a service processor for assisting control of the wireless device use of a service on the wireless network, wherein the service processor includes a service profile that includes a plurality of service policy settings, and wherein the service profile is associated with a service plan that provides for access to the service;
- securely connecting, via a service control device link using the wireless network, the network device to the service processor of the wireless device;
- receiving service provider information from the wireless device;
- determining, based on the service provider information, that the wireless device is associated with a particular service provider, wherein the service provider information is one of a user selection indicating the particular service provider or a credential of the wireless device associated with the particular service provider; and
- providing, based on the determined association of the wireless device with the particular service provider, via the service control device link using the wireless network, the wireless device with a branding specific to the particular service provider, wherein the branding updates a user interface characteristic of the wireless device to be specific to the particular service provider.

12. The method of claim 11, wherein providing the wireless device with a branding specific to the particular service provider includes providing a software update or an additional software download.

13. The method of claim 12, wherein the software update or the additional software download includes:
- a version based on a device type,
- a version based on a device group,
- a version based on a service type,
- an encrypted version,
- a version that includes a service plan setting or capability associated with the device group,
- a version that includes marketing material,
- a version for offering a service plan option,
- a version with an ambient service setting, or
- a version with an ambient service option.

14. The method of claim 12, wherein the software update or the additional software download further includes a feature or a functionality for the particular service provider.

15. The method of claim 11, wherein the service provider information is the credential of the wireless device and includes information derived from a subscriber information module (SIM), an international mobile subscriber identity (IMSI), an electronic serial number (ESN), a media access control (MAC) address, or a unique device identifier.

16. The method of claim 11, further comprising:
- providing the wireless device with a policy setting for assisting the wireless device in connecting to a particular wireless access network.

17. The method of claim 16, wherein the policy setting is for assisting in presenting a notification, obtaining or presenting service usage information, obtaining an acknowledgment, obtaining or implementing a user preference, or obtaining or implementing a privacy setting.

18. The method of claim 16, wherein the policy setting includes an authentication setting, an admission control setting, a network or device management communication setting, an application access setting, a content access setting, or a transaction setting.

19. The method of claim 16, wherein the policy setting assists in directing or controlling traffic or billing for a service.

20. The method of claim 11, further comprising:
- modifying the service profile of the wireless device based on association of the wireless device with one of a plurality of device groups.

* * * * *